(12) United States Patent
Bullock et al.

(10) Patent No.: US 10,665,444 B2
(45) Date of Patent: May 26, 2020

(54) SAMPLE HANDLING SYSTEMS, MASS SPECTROMETERS AND RELATED METHODS

(71) Applicant: bioMerieux, Inc., Durham, NC (US)

(72) Inventors: Jared Bullock, Saint Louis, MO (US);
Scott Collins, Westford, MA (US); Ian MacGregor, Merrimack, NH (US);
Mark Talmer, Pepperell, MA (US)

(73) Assignee: bioMérieux, Inc., Durham, NC (US)

( * ) Notice: Subject to any disclaimer, the term of this patent is extended or adjusted under 35 U.S.C. 154(b) by 0 days.

(21) Appl. No.: 16/272,016

(22) Filed: Feb. 11, 2019

(65) Prior Publication Data
US 2019/0252169 A1    Aug. 15, 2019

Related U.S. Application Data

(60) Provisional application No. 62/648,973, filed on Mar. 28, 2018, provisional application No. 62/629,746, filed on Feb. 13, 2018.

(51) Int. Cl.
| | |
|---|---|
| *H01J 49/04* | (2006.01) |
| *H01J 49/00* | (2006.01) |
| *G01N 35/00* | (2006.01) |
| *G01N 35/04* | (2006.01) |
| *H01J 49/40* | (2006.01) |

(52) U.S. Cl.
CPC .... *H01J 49/0413* (2013.01); *G01N 35/00029* (2013.01); *G01N 35/0099* (2013.01); *G01N 35/04* (2013.01); *H01J 49/0031* (2013.01); *H01J 49/0495* (2013.01); *G01N 2035/00049* (2013.01); *G01N 2035/00138* (2013.01); *G01N 2035/0441* (2013.01); *H01J 49/0418* (2013.01); *H01J 49/40* (2013.01)

(58) Field of Classification Search
CPC ............... H01J 49/0413; H01J 49/0031; H01J 49/0495; H01J 49/0418; H01J 49/40; G01N 35/0029; G01N 35/0099; G01N 35/04; G01N 2035/00138; G01N 2035/0441
USPC ................ 250/440.11, 441.11, 442.11, 443.1
See application file for complete search history.

(56) References Cited

U.S. PATENT DOCUMENTS

| | | | |
|---|---|---|---|
| 4,699,555 | A | 10/1987 | Guarino |
| 5,498,545 | A | 3/1996 | Vestal |
| 5,625,184 | A | 4/1997 | Vestal et al. |
| 5,627,369 | A | 5/1997 | Vestal et al. |

(Continued)

OTHER PUBLICATIONS

Biomerieux "VITEK MS expanded database" Product brochure, https://www.biomerieux-diagnostics.com/vitekr-ms-0 (3 pages) (date unknown, but prior filing date of the present application).

(Continued)

*Primary Examiner* — Nicole M Ippolito
(74) *Attorney, Agent, or Firm* — Myers Bigel, P.A.

(57) ABSTRACT

Slide analysis a gripper with three sensors for controlling a slide grip sequence and at least one rotatable carousel with a slide receiving channel. The systems also include a robot with a robot arm that holds a slide gripper residing inside the housing in communication with the rotatable carousel. The systems also include a load lock chamber and a door sealably coupled to the second end portion and an acquisition vacuum chamber with an X-Y stage and a slide holder with a vacuum seal.

31 Claims, 47 Drawing Sheets

(56) References Cited

U.S. PATENT DOCUMENTS

| | | |
|---|---|---|
| 5,760,393 A | 6/1998 | Vestal et al. |
| 5,969,348 A | 10/1999 | Franzen |
| 6,002,127 A | 12/1999 | Vestal et al. |
| 6,057,543 A | 5/2000 | Vestal et al. |
| 6,090,176 A | 7/2000 | Yoshitake et al. |
| 6,281,493 B1 | 8/2001 | Vestal et al. |
| 6,541,765 B1 | 4/2003 | Vestal |
| RE39,353 E | 10/2006 | Vestal |
| 7,405,396 B2 | 7/2008 | Cygan et al. |
| 7,564,028 B2 | 7/2009 | Vestal |
| 8,752,873 B2 | 6/2014 | Hajrovic |
| 9,214,323 B1 | 12/2015 | Vestal et al. |
| 9,362,095 B1 | 6/2016 | Hayden et al. |
| 9,536,726 B2 | 1/2017 | VanGordon et al. |
| 2002/0024642 A1* | 2/2002 | Zemel .................... G03B 27/32 355/26 |
| 2006/0050376 A1 | 3/2006 | Houston et al. |
| 2006/0216207 A1* | 9/2006 | Lehto .................... G01N 35/109 422/510 |
| 2008/0216590 A1 | 9/2008 | Blanton et al. |
| 2015/0198681 A1* | 7/2015 | Chintalapati ........ G01R 33/307 324/321 |
| 2017/0316928 A1 | 11/2017 | Hunter et al. |
| 2017/0341873 A1 | 11/2017 | Vivet et al. |
| 2018/0119137 A1* | 5/2018 | Matsuguchi ....... C12N 15/1072 |

OTHER PUBLICATIONS

Vestal et al. "High Performance MALDI-TOF mass spectrometry for proteomics" International Journal of Mass Spectrometry, 268(12):83-92 (2007).

Vestal et al. "Resolution and Mass Accuracy in Matrix-Assisted Laser Desorption Ionization-Time-of-Flight" Journal of the American Society for Mass Spectrometry, 9:892-911 (1998).

Vestal, Marvin L. "Modern MALDI time-of-flight mass spectrometry" Journal of Mass Spectrometry, 44:303-317 (2009).

Wiley et al. "Time-of-Flight Mass Spectrometer with Improved Resolution" The Review of Scientific Instruments, 26 (12):1150-1157 (1955).

International Search Report and the Written Opinion of the International Searching Authority corresponding to International Patent Application No. PCT/US2019/017469 (11 pages) (dated Jun. 14, 2019).

* cited by examiner

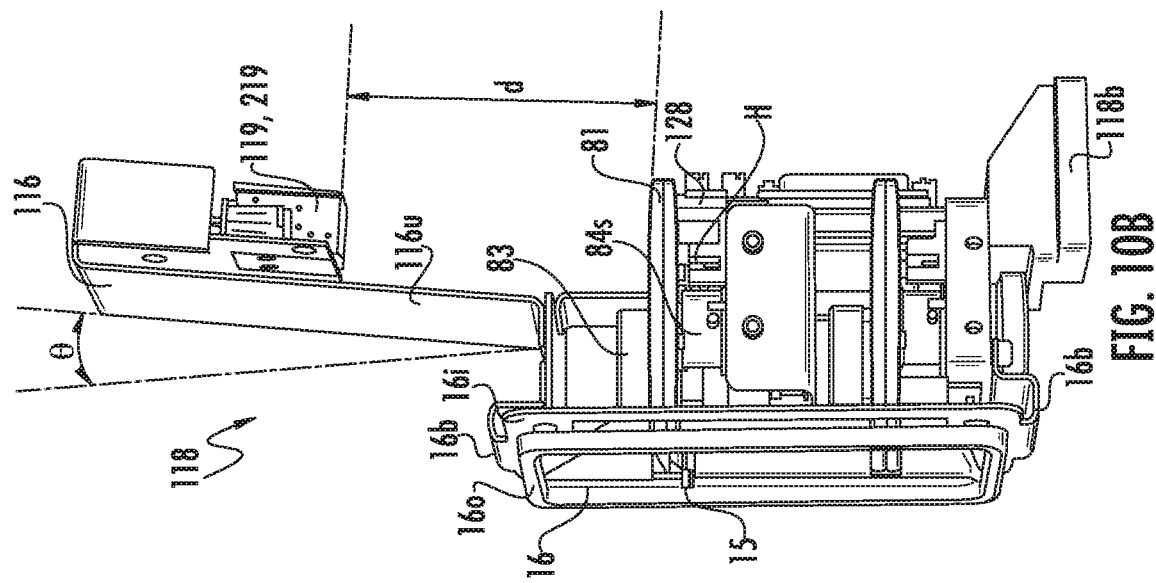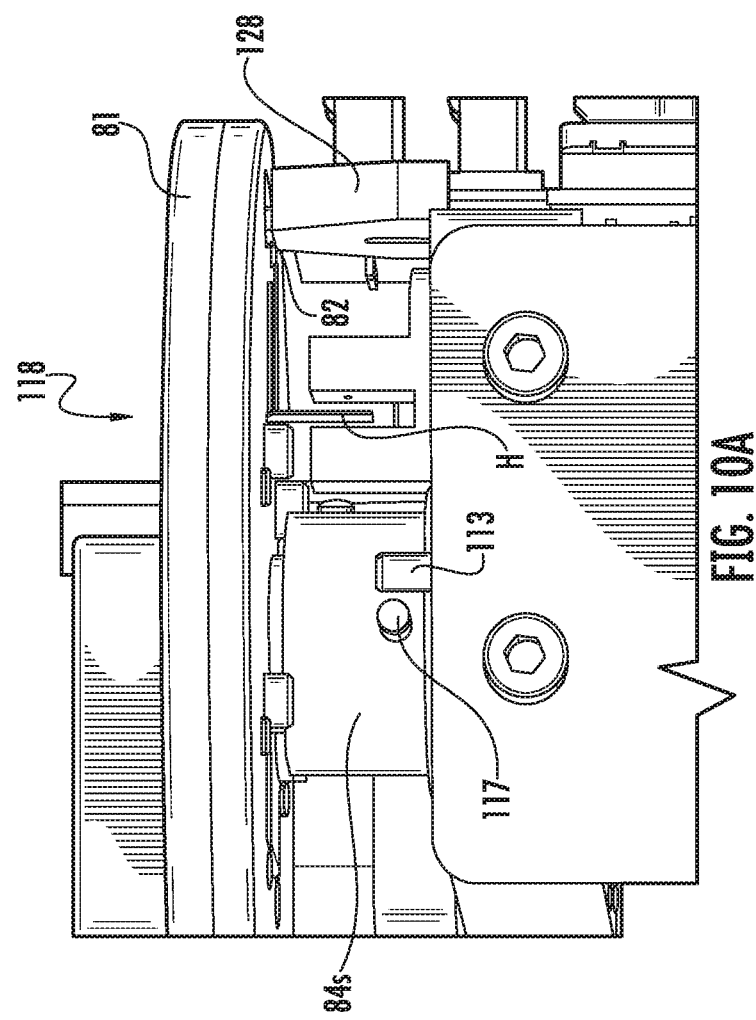

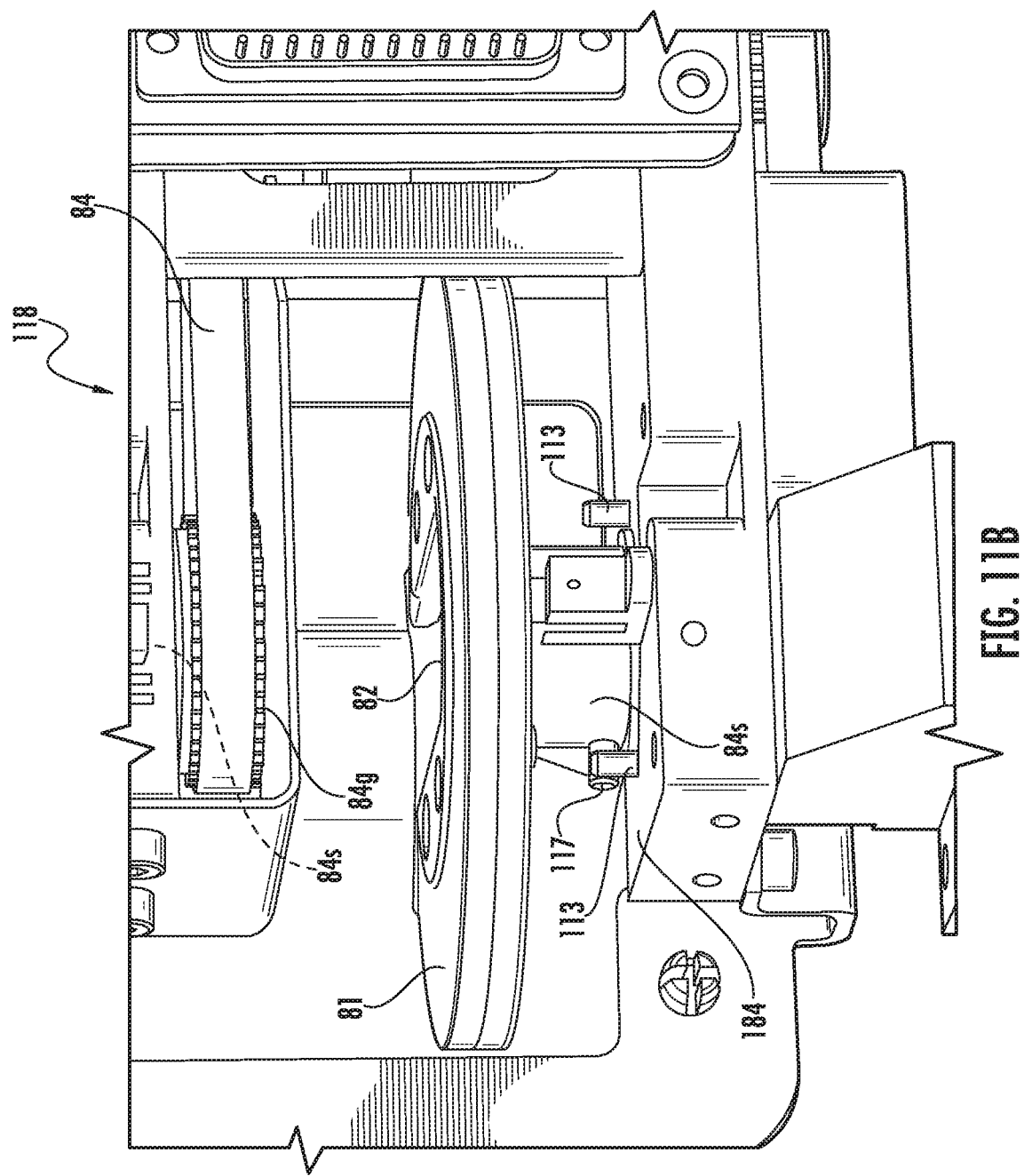

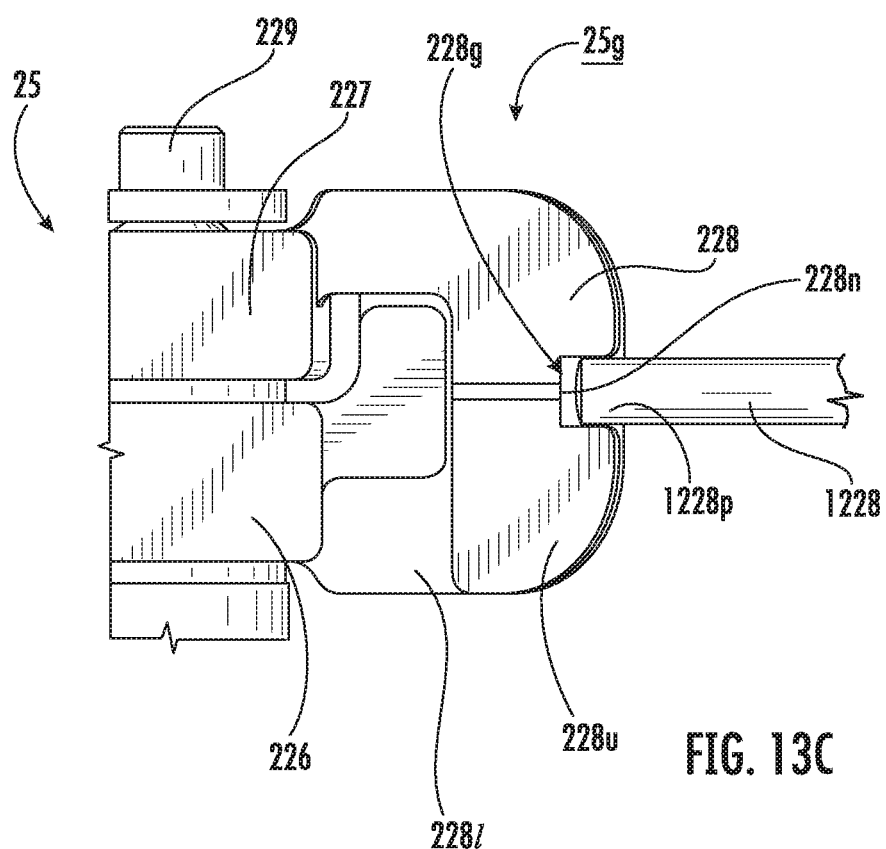

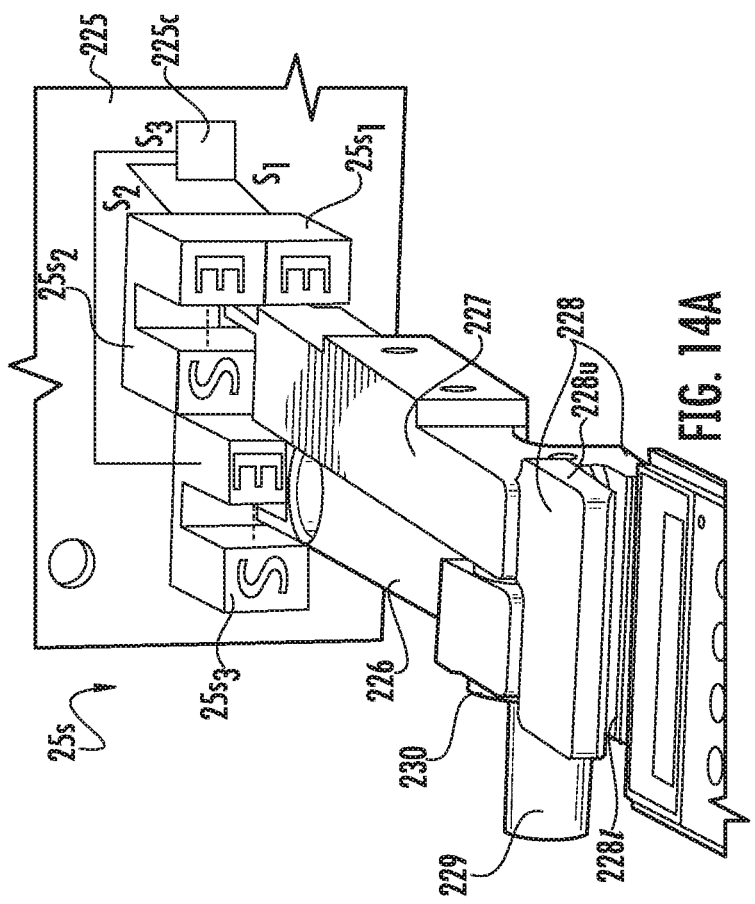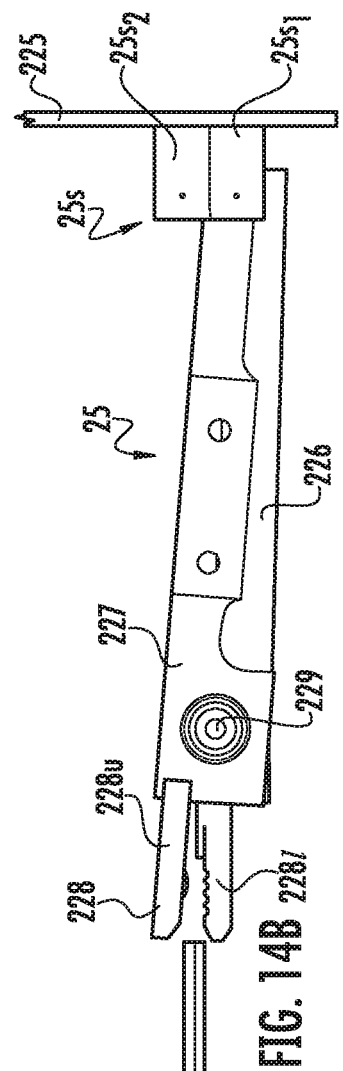

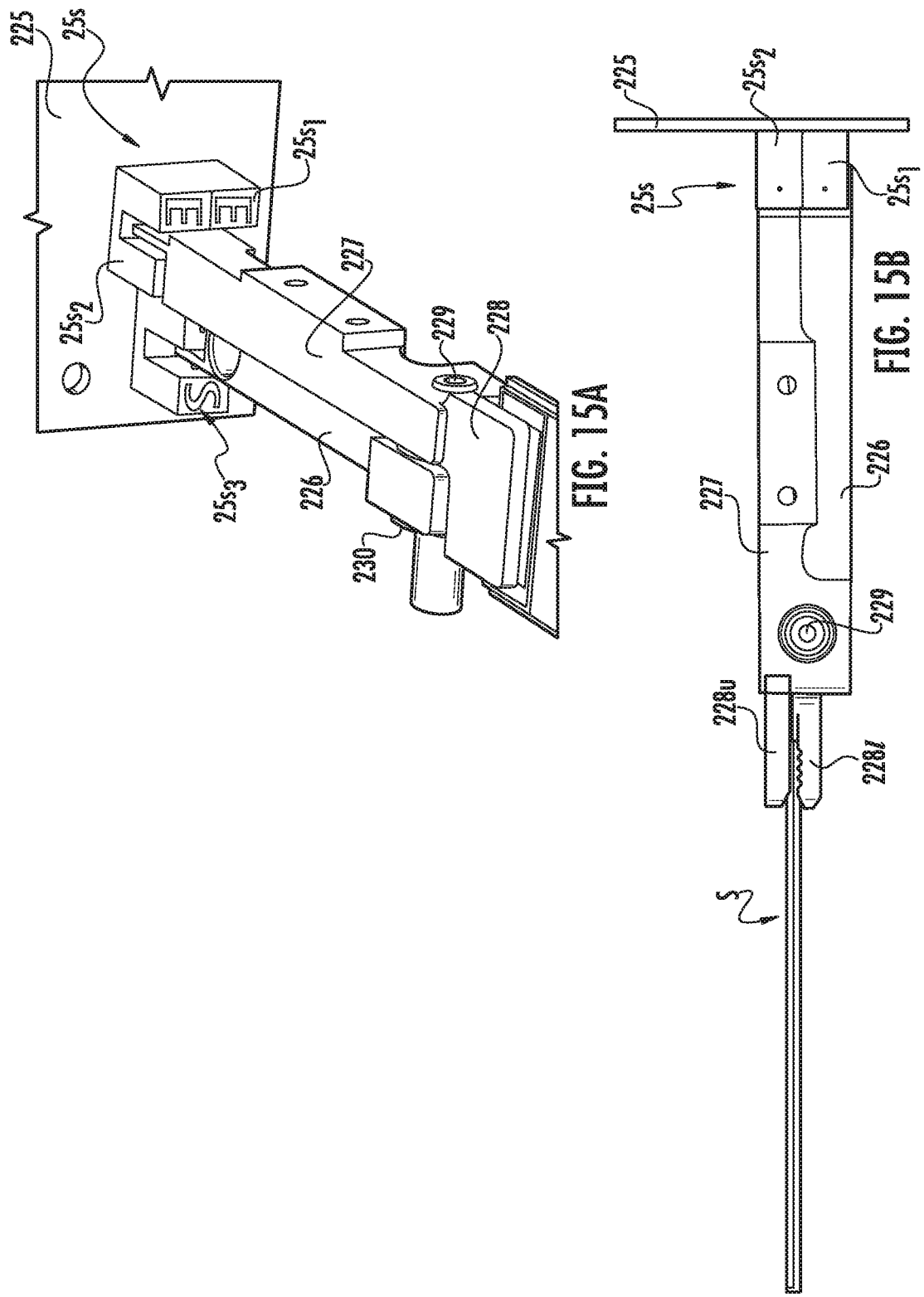

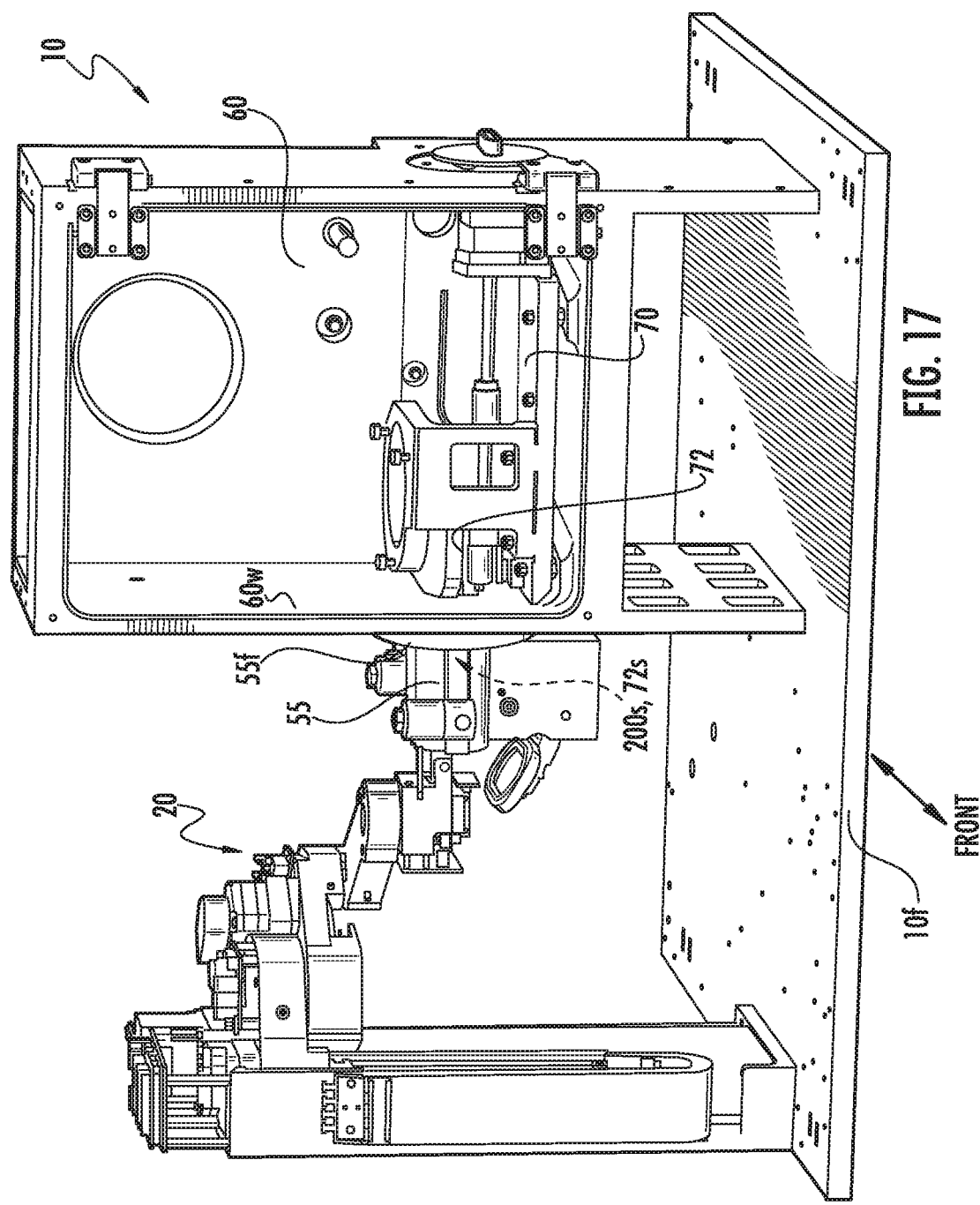

SAMPLE HANDLING SYSTEMS, MASS SPECTROMETERS AND RELATED METHODS

RELATED APPLICATIONS

This application claims the benefit of and priority to U.S. Provisional Patent Application Ser. No. 62/629,746, filed Feb. 13, 2018, and to U.S. Provisional Patent Application Ser. No. 62/648,973, filed Mar. 28, 2018, the contents of which are hereby incorporated by reference as if recited in full herein.

FIELD OF THE INVENTION

The present invention relates to sample handling systems and is particularly suitable for samples analyzed by mass spectrometers.

BACKGROUND OF THE INVENTION

Mass spectrometers are devices which ionize a sample and then determine the mass to charge ratios of the collection of ions formed. One well known mass analyzer is the time-of-flight mass spectrometer (TOFMS), in which the mass to charge ratio of an ion is determined by the amount of time required for that ion to be transmitted under the influence of electric fields (pulsed and/or static) from the ion source to a detector. The spectral quality in TOFMS reflects the initial conditions of the ion beam prior to acceleration into a field free drift region. Specifically, any factor which results in ions of the same mass having different kinetic energies and/or being accelerated from different points in space will result in a degradation of spectral resolution, and thereby, a loss of mass accuracy. Matrix assisted laser desorption ionization (MALDI) is a well-known method to produce gas phase biomolecular ions for mass spectrometric analysis. The development of delayed extraction (DE) for MALDI-TOF has made high resolution routine for MALDI-based instruments. In DE-MALDI, a short delay is added between the ionization event, triggered by the laser, and the application of the accelerating pulse to the TOF source region. The fast (i.e., high-energy) ions will travel farther than the slow ions thereby transforming the energy distribution upon ionization to a spatial distribution upon acceleration (in the ionization region prior to the extraction pulse application).

See U.S. Pat. Nos. 5,625,184, 5,627,369 and 5,760,393. See also, Wiley et al., *Time-of-flight mass spectrometer with improved resolution*, Review of Scientific Instruments vol. 26, no. 12, pp. 1150-1157 (2004); M. L. Vestal, *Modern MALDI time-of-flight mass spectrometry*, Journal of Mass Spectrometry, vol. 44, no. 3, pp. 303-317 (2009); Vestal et al., *Resolution and mass accuracy in matrix-assisted laser desorption ionization-time-of-flight*, Journal of the American Society for Mass Spectrometry, vol. 9, no. 9, pp. 892-911 (1998); and Vestal et al., *High Performance MALDI-TOF mass spectrometry for proteomics*, International Journal of Mass Spectrometry, vol. 268, no. 2, pp. 83-92 (2007). The contents of these documents are hereby incorporated by reference as if recited in full herein.

SUMMARY OF EMBODIMENTS OF THE INVENTION

Embodiments of the present invention are directed to sample handling systems for instruments configured for sample analysis.

Embodiments of the present invention are directed to mass spectrometer systems with sample handling systems that include a 3-D robot assembly and a load lock chamber in fluid communication with a vacuum chamber.

Embodiments of the invention are directed to a slide handling assembly. The assembly includes a slide gripper comprising first and second gripper arms that are parallel and side-by-side and pivotably held by a laterally extending shaft adjacent an upper jaw and lower jaw of the slide gripper, the first arm coupled to the upper jaw of the slide gripper and the second arm coupled to the lower jaw of the slide gripper.

The assembly can further include a gripper motor coupled to the first and second gripper arms.

The assembly can also include a home sensor, a grip sensor and a slide presence sensor, and each sensor each can be coupled to at least one of the first and second gripper arms. The assembly can also include a control circuit in communication with the gripper motor and the home sensor, the grip sensor and the slide presence sensor. The control circuit can receive sensor data from the home sensor, the grip sensor and the slide presence sensor to identify an open or closed state of the upper jaw and lower jaw, and, if the upper and lower jaw are in the closed state, to identify whether a slide is present.

The first gripper arm can reside adjacent to but at a height above the second gripper arm.

The home sensor and the grip sensor can be aligned, one above another, and may reside on a printed circuit board that can be coupled to an end of the first gripper arm.

An end of the second gripper arm can be coupled to the slide presence sensor. The slide presence sensor can be held by the printed circuit board adjacent but spaced apart from the home sensor and the grip sensor.

Yet other embodiments are directed to slide sample handling and/or analysis systems. The systems include a housing having a front wall with a slide port and an input/output module with at least one rotatable carousel that includes a slide receiving channel. The carousel rotates between first and second positions. The first position is a slide intake position that positions an open end of the slide receiving channel outward, aligned with the slide port to be able to slidably receive a slide. The second position places the open end of the slide channel facing into the housing. The systems also include a robot with a robot arm that holds a slide gripper residing inside the housing in communication with the rotatable carousel. The robot arm can move in three-dimensions in the housing. The systems also include a load lock chamber having longitudinally opposing first and second end portions, a through channel, and a door sealably coupled to the second end portion. The systems further include an acquisition vacuum chamber with an X-Y stage and a slide holder with a vacuum seal interface that can extend into the load lock chamber to seal the first end portion of the load lock chamber and retract with a slide transferred to the slide holder from the slide gripper of the robot into the acquisition vacuum chamber, after the door of the load lock chamber is closed.

The carousel can be configured to have a single one of the slide receiving channel that may have a length that extends over greater than a major portion of a diameter of the carousel across a center of the carousel.

The open end of the slide channel can have a perimeter that is recessed inward relative to an outer diameter of the carousel.

The slide gripper can have first and second gripper arms that are parallel and side-by-side and can be pivotably held by a laterally extending shaft adjacent an upper jaw and lower jaw of the slide gripper. The first arm can be coupled to the upper jaw of the slide gripper and the second arm can be coupled to the lower jaw of the slide gripper.

The upper jaw can have a notch that cooperates with an alignment member for calibrated robot movement in the unit housing for accurate movement to and from defined operational positions.

The system can further include a gripper motor coupled to the first and second gripper arms and a home sensor, a grip sensor and a slide presence sensor. Each sensor can be coupled to at least one of the first and second gripper arms. The system can further include a control circuit in communication with the gripper motor and the home sensor, the grip sensor and the slide presence sensor. The control circuit can receive sensor data from the home sensor, the grip sensor and the slide presence sensor to identify an open or closed state of the upper jaw and lower jaw, and, if the upper and lower jaw are in the closed state, to identify whether a slide is present.

The first gripper arm can reside adjacent to but at a height above the second gripper arm. The home sensor and the grip sensor can be aligned, one above another and each may be held on a printed circuit board coupled to an end of the first gripper arm.

An end of the second gripper arm can be coupled to the slide presence sensor. The slide presence sensor can be held by the printed circuit board adjacent but spaced apart from the home sensor and the grip sensor.

The printed circuit board can be attached to a pivotable arm segment of the robot arm of the robot The system can have a first vacuum pump connected to the acquisition vacuum chamber and a second vacuum pump connected to the load lock chamber. The first vacuum pump can reside above the second vacuum pump in the housing.

The system can further include a removable bezel face plate providing the slide port. The bezel face plate can be held by a bevel bracket with an open window that is coupled to an upper bracket member that resides inside the housing and angles inwardly at an angle between 5-45 degrees from a location adjacent the bezel face plate to an upper segment thereof.

The bezel face plate can have a width between 4-6 inches and a height between 6-10 inches.

The housing can be a table-top housing configured with a width, length and height of about: 0.7 m×0.7 m×1.1 m.

The housing can include an internal sample storage space with a width, length and height size that is about 0.25 m×0.3 m by 0.3 m.

The removable bezel face plate can be attached to an internal bezel bracket plate that has an upper bracket member that can hold a camera. The upper bracket member can extend inwardly from a segment proximate the bezel face plate to an upper segment thereof at an angle between 5-45 degrees. The camera can have a field of view that covers at least an end portion of the slide when the carousel is in the second position.

The input/output module can have a drive motor coupled to a drive shaft under the carousel that rotates the carousel between the first and second positions. When the removable bezel face plate is detached from the housing to expose an access window, the carousel can be removed from the access window of the housing for cleaning.

The system can further include a plurality of spaced apart intake vents in fluid communication with intake fans with filters on a back of the housing and a plurality of output vents in fluid communication with output fans on a top of the housing. The intake and output fans can cooperate to provide a positive pressure inside the housing with passive and/or fan-driven airflow out of the housing to inhibit contaminants from entering the housing.

The home sensor and the grip sensor can be separately triggerable by a position of a first end of the first arm. The slide presence sensor can be triggerable by a position of a first end of the second arm.

The system can include a laser coolant path that extends from an inlet on a front of the housing (over a laser and/or laser heat sink) to an outlet on top of the housing.

The robot can have a base that is mounted to a floor of the housing. The input/output module can have a base that is mounted to the floor of the housing adjacent the robot base, closer to the front of the housing than the robot base.

The port can be oblong in a lateral dimension with laterally opposing arcuate ends.

The through channel of the load lock chamber can have a lateral width that is greater than a height and can have a volume that is between 1 cc and 100 cc.

Embodiments of the invention are directed to methods of operating a slide gripper assembly. The methods can include: providing a slide gripper assembly with first and second adjacent arms, one attached to a lower jaw and one attached to a cooperating upper jaw; and electronically directing a closing and opening of the upper and lower jaws whereby a state of one or more of a first home sensor, a second grip sensor and a third slide presence sensor correlates to a position of the gripper jaws.

The directing a closing and opening of the upper and lower jaws can optionally be in response to a signal input from one or more of a first home sensor, a second grip sensor and a third slide presence sensor.

The home sensor and the second grip sensor can be separately triggerable by a position of a first end of the first arm. The third slide presence sensor can be triggerable by a position of a first end of the second arm.

The first arm can be an upper arm that that is above the second arm and can be attached to the lower jaw. The first and second arms can be attached together by a laterally extending shaft adjacent the upper and lower jaws. The method can include pivoting the lower shaft to have a horizontal orientation only when a slide is present between the upper and lower jaws which can then trigger the third slide presence sensor to identify a slide present state.

When the upper and lower jaws are closed, the first end of the first arm can move up to trigger the second grip sensor to report a closed state for the electronically directing step.

Yet other embodiments are directed to methods of handling a sample for analysis. The methods include: providing a housing with a mass spectrometer, a load lock chamber with opposing first and second end portions, and an acquisition vacuum chamber. The first end portion of the load lock chamber is in or adjacent the acquisition vacuum chamber and the second end portion is spaced apart from the first end portion and has a sealably attachable door. The methods also include: providing a positive pressure inside the housing outside the acquisition vacuum chamber; receiving a slide for analysis in a slide receiving channel of a carousel via a port at a front of the housing; rotating the carousel; gripping an end portion of the slide with a slide gripper held by an arm of a robot; moving the slide in three-dimensions in the housing from the carousel toward the load lock chamber or a storage rack; inserting a slide holder of an X-Y stage into the load lock chamber from the vacuum chamber while the door is sealably closed to the second end portion of the load lock chamber; automatically sealing the first end portion of the load lock chamber from the vacuum chamber upon engagement of the slide holder with a seal interface of the first end portion of the load lock chamber; venting the load lock chamber to atmosphere; opening the door; inserting the slide from the slide gripper into the load lock chamber from the second end portion of the load lock chamber to transfer the slide to the slide holder in the load lock chamber; closing the door to seal the load lock chamber; evacuating the load lock chamber to a vacuum pressure; and retracting the slide holder with the slide into the vacuum chamber while the door is closed and the load lock chamber is under vacuum.

The methods can further include analyzing a sample in or on the slide. The sample can be analyzed to identify one or more microorganisms by analyzing a mass range between about 2000 to about 20,000 Dalton.

The providing the positive pressure can create a passive airflow path that includes a path out of a top of the housing (optionally with active intake/outlet fan drive).

The methods can also include generating a laser coolant air flow path from a front of the housing over a heat sink of a laser then and up and out of the top of housing.

The method can include removing a detachable bezel plate from a front wall of the housing which holds the port on the front of the housing, then allowing a user to remove the carousel through the front of the housing.

Embodiments of the invention are directed to delayed extraction (DE) matrix assisted laser desorption ionization (MALDI) time-of-flight mass spectrometers (TOF MS) with onboard sample handling systems. The flight tube can have a length that is between about 0.4 m and about 1 m. However, longer or shorter lengths may optionally be used.

The sample can be undergoing analysis to identify one or more microorganisms are present by analyzing a mass range of between about 2000 to about 20,000 Dalton.

The sample can be undergoing analysis to identify one or more different types of bacteria and/or fungi that may be present by analyzing a mass range that is between about 2000-20,000 Dalton.

The method can include identifying a microorganism or protein in the sample based on the signal.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 10A is an enlarged side perspective view of a portion of the slide I/O module shown in FIG. 8A according to embodiments of the present invention.

FIG. 10B is a side perspective view of the module shown in FIG. 8A oriented to show the home sensor shown in FIG. 10B.

FIG. 11B is an enlarged, internal perspective view of a lower portion of the module shown in FIG. 11A according to embodiments of the present invention.

FIG. 13C is an enlarged top view of another embodiment of the slide-gripper sub-assembly shown in FIG. 12 and shown with a cooperating alignment member according to embodiments of the present invention.

FIG. 14A is a side perspective view of components of the device shown in FIG. 12 with a first sensor status mode according to embodiments of the present invention.

FIG. 14B is a side view of the components shown in FIG. 14A illustrating the associated gripper configuration.

FIG. 15A is a side perspective view of components of the device shown in FIG. 12 with a second sensor status mode according to embodiments of the present invention.

FIG. 15B is a side view of the components shown in FIG. 15A illustrating the associated gripper configuration.

FIG. 17 is a front, partial perspective view of internal components of an instrument with a load lock chamber coupled to an X-Y stage according to embodiments of the present invention.

DETAILED DESCRIPTION OF EMBODIMENTS OF THE INVENTION

Figure 1A:
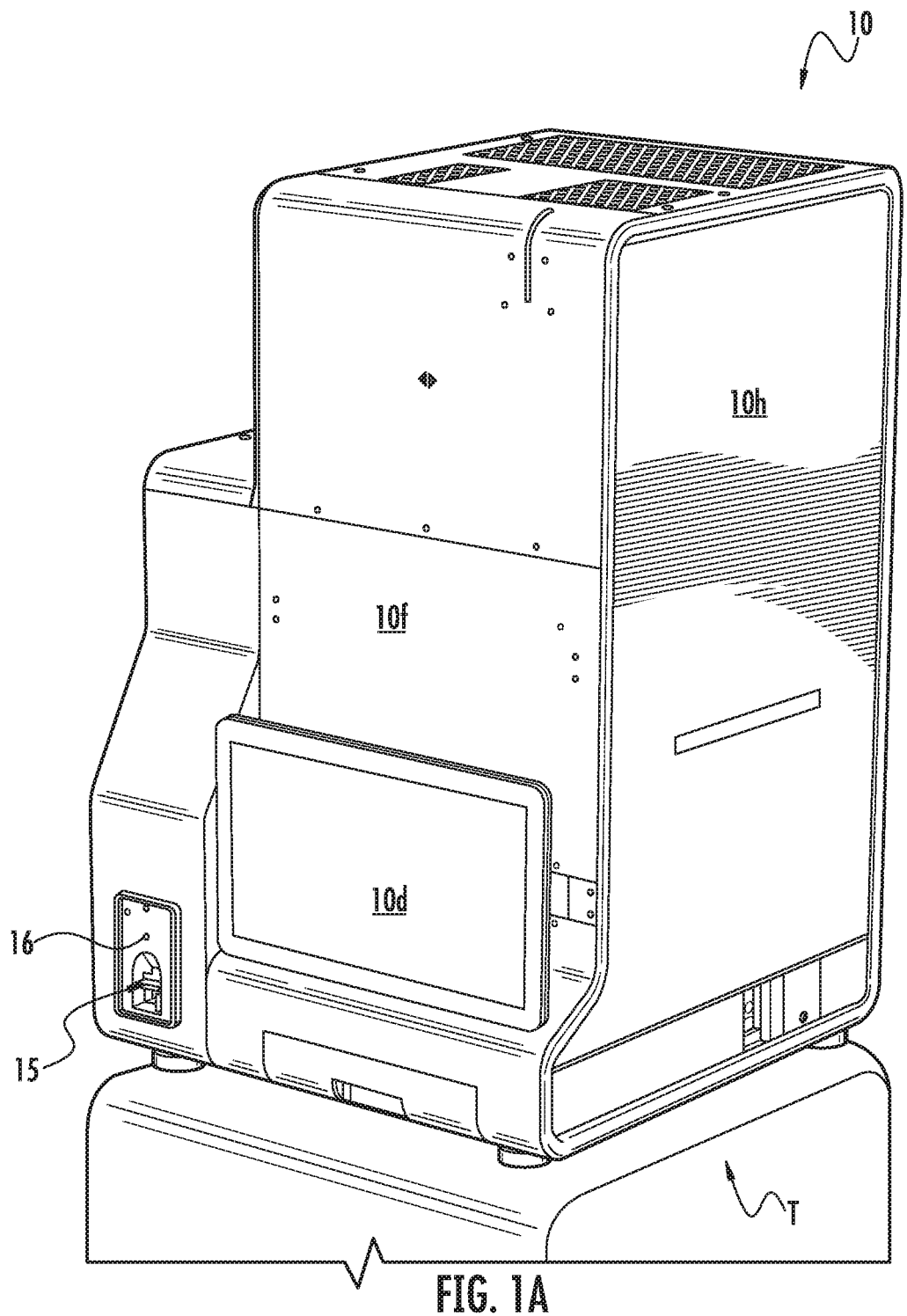
FIG. 1A is a front, side perspective view of an exemplary mass spectrometry system according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the figures, certain layers, components or features may be exaggerated for clarity, and broken lines illustrate optional features or operations unless specified otherwise. The terms "FIG." and "FIG." are used interchangeably with the word "Figure" in the application and/or drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "bottom", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass orientations of above, below and behind. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The term "signal acquisition time" refers to the time that a digital signal of mass spectra of a single sample is collected or acquired from a detector of a mass spectrometer for analysis of the sample.

The terms "time delay" and "delay time" are used interchangeably and refer to a time between laser pulse (firing/transmission) and extraction pulse, i.e., between ionization and acceleration, for delayed extraction.

In some embodiments, the mass spectrometer is configured to obtain ion signal from a sample that is in a mass range of about 2,000 to about 20,000 Dalton.

The term "pass" refers to the collection of spectra across a single sample spot, e.g., one full sweep across a spot. The term "shot" refers to the generation and collection of a single spectrum.

The term "sample" refers to a substance undergoing analysis and can be any medium within a wide range of molecular weights. In some embodiments, the sample is being evaluated for the presence of microorganisms such as bacteria or fungi. However, the sample can be evaluated for the presence of other constituents including toxins or other chemicals.

The term "substantially the same" when referencing the peak resolution means that the spectra over a target range, typically between 2 kDa to 20 kDa, between 3 kDa to 18 kDa, and/or between about 4 kDa to 12 kDa, have a resolution that is within 10% of a defined focus mass peak resolution. Examples of focus masses are 4 kDa, 8 kDa, 12 kDa and 18 kDa.

The term "table top" with respect to a sample analysis apparatus refers to a relatively compact unit that can fit on a standard table top or counter top and/or occupy a footprint equivalent to a table top, such as a table top that has width by length dimensions of about 1 foot by 6 feet, for example, and which typically has a height dimension that is between about 1-4 feet. In some embodiments, the system resides in an enclosure or housing of 14-28 inches (W)×14-28 inches (D)×28-38 inches (H).

The term "module" refers to hardware or firmware, hardware and firmware or hardware (e.g., computer hardware) or software components that carry out defined functionality.

Figure 1C:
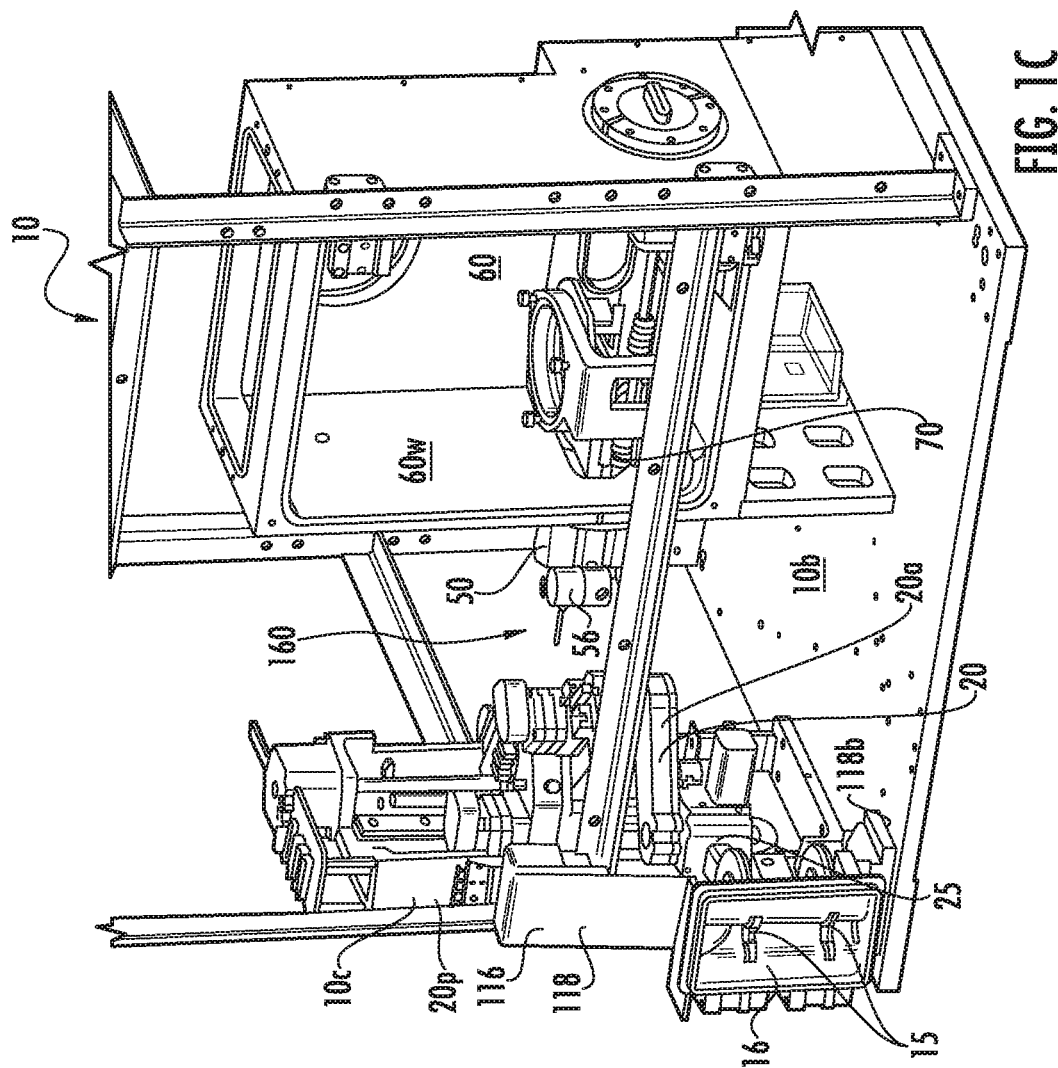
FIG. 1C is a front perspective partial view of the mass spectrometry system shown in FIG. 1A with the external walls removed to illustrate internal components according to embodiments of the present invention.
Figure 1B:
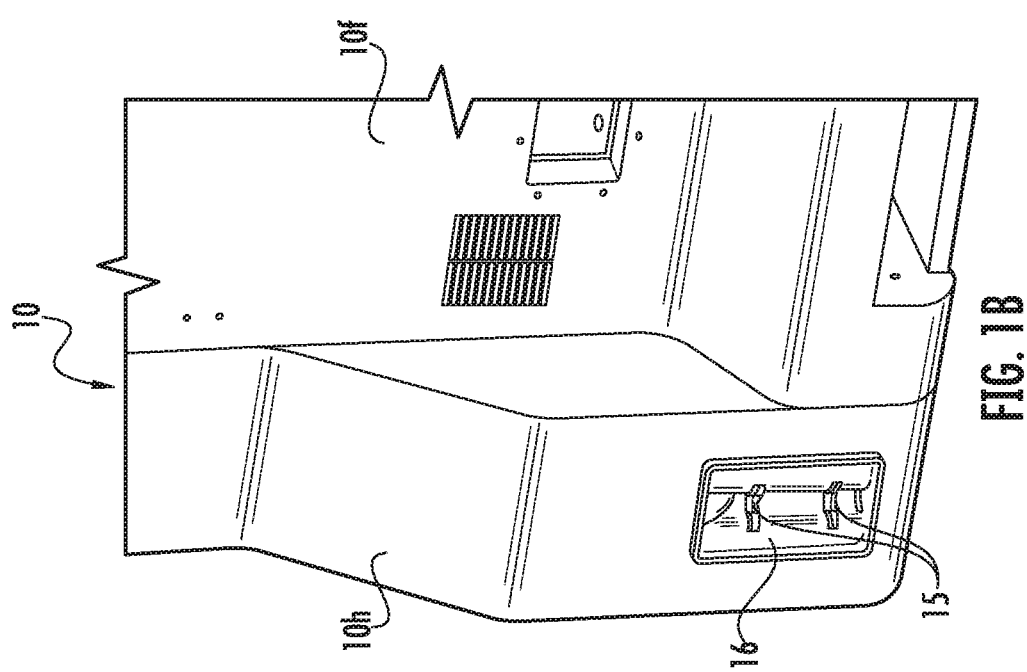
FIG. 1B is a partial front perspective view of the exemplary mass spectrometry system shown in FIG. 1A according to embodiments of the present invention.

FIG. 1A and FIG. 1B illustrate an exemplary system 10 which may be a mass spectrometer system, or other sample analysis instrument or unit. As shown, the system 10 includes a housing 10h with a front wall 10f with a display 10d with a user interface and at least one sample specimen port 15, shown as a single port in FIG. 1A and as dual aligned ports in FIG. 1B, sized and configured to serially receive and/or output slides but more than two ports may be used. A respective port 15 can be configured as entry only, exit only, or as both an entry and exit port for specimen slides "S" (FIG. 3A) for analysis. As shown in FIG. 1A, the system 10 can be sized and configured as a table top unit that can reside on a table top T.

FIG. 1C illustrates some internal components of the system 10, shown without the analyzer components (i.e., ionizer, TOF tube (where used) and detector). As shown, the system 10 can include a robot 20 with a slide holder 25, a load lock chamber assembly 50 coupled to a wall 60w of a vacuum chamber 60 and an X-Y stage 70. The term "robot" is used broadly and refers to an electro-mechanical system with multiple degrees of freedom that can automatically move a respective slide S along various positions in the mass spectrometer system 10. The robot 20 can have an arm 20a that carries out the defined positional movements and is typically affixed to a mounting bracket 20p at a front corner 10c location inside of the housing 10h as shown in FIG. 1B.

Figure 2:
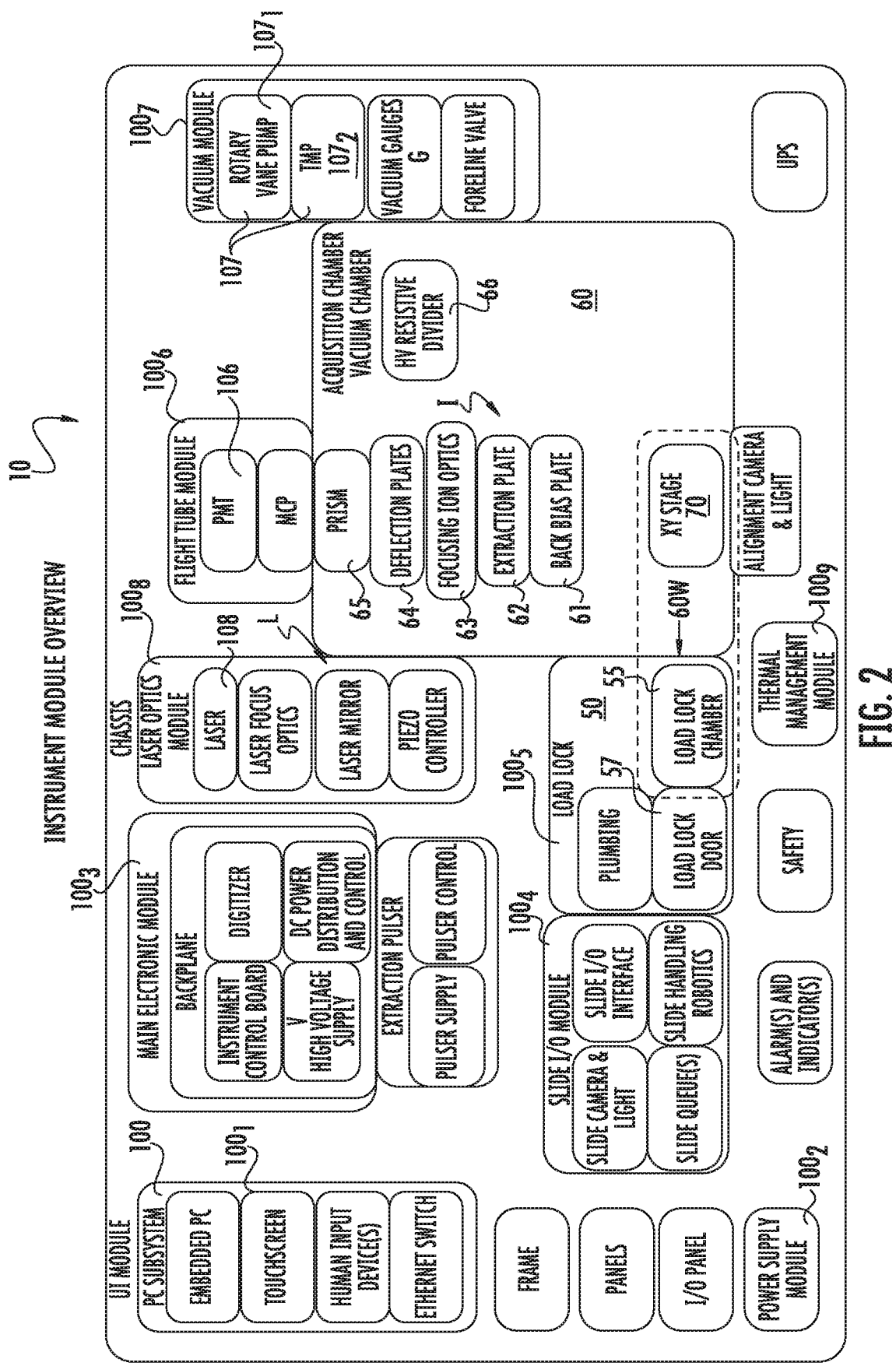
FIG. 2 is a block diagram of a mass spectrometry system illustrating operational modules according to embodiments of the present invention.

FIG. 2 illustrates exemplary operational modules 100 (identified as modules 100n with n being a numerical identifier) that can be included in or on the mass spectrometry system 10. The modules 100 can include a User Interface (UI) module $100_1$, a power supply module $100_2$, a main electronics module $100_3$ (with one or more high voltage supplies V, a digitizer, and an extraction pulser), a slide I/O module $100_4$, a load lock module $100_5$, a flight tube module $100_6$, a vacuum module $100_7$ with at least one vacuum pump 107, a laser optics module $100_8$ with at least one laser 108, and a thermal management module $100_9$. The at least one vacuum pump 107 can include a roughing vacuum pump $107_1$ and a turbo pump $107_2$. The turbo pump $107_2$ may only be directly connected to the acquisition vacuum chamber 60 while the roughing pump $107_1$ can be directly connected to the load lock chamber 55c and also, optionally, the acquisition vacuum chamber 60.

The roughing pump $107_1$ can reside below the turbo vacuum pump $107_2$ in a relatively compact interior space.

As will be discussed further below with respect to FIG. 21, the system or instrument 10 can be held at a positive pressure (outside the acquisition vacuum chamber 60 and load lock chamber 55 when under vacuum) to inhibit unfiltered external air from entering the instrument and/or inhibit contamination of samples from external sources while in the unit 10. The term "positive pressure" refers to a pressure that is above atmospheric pressure external to the housing 10h of the system 10 so that air flows out of ventilation vents and/or any openings in the skin or casing of the housing instead of in. Spaced apart fans 195 (FIG. 21) in the housing 10h of the system 10 can be used to generate the positive pressure and desired outflow air paths. Each fan

195 can include a filter to inhibit the ingress of any debris that may be in the incoming air.

As shown in FIGS. 1C and 2, for example, the load lock chamber 55 is attached to the wall 60w of the vacuum chamber 60. The X-Y stage 70 is in the vacuum chamber 60 along with electronic operational components that guide generated ions or a laser beam, such as a back bias plate 61, an extraction plate 62, focusing ion optics 63, deflection plates 64, and a prism 65. The vacuum chamber 60 may also contain a high voltage (HV) divider 66. The prism 65 can guide the laser beam and one or more (typically all) of the plates 61, 62, 63, 64 can guide the generated ions as is well known to those of skill in the art. In FIG. 2, the laser optics are generally referred to as "L" and the ion optics are generally referred to as "I".

As shown, for example, in FIG. 3H, and as will be discussed further below, the load lock chamber assembly 50 has a load lock chamber 55 with an open channel 55c that can slidably receive a slide S and that can be sealably closed. The load lock chamber 55 can be placed under vacuum (or vented) via one or more valves 56 in fluid communication with the channel 55c and allow a slide S to be input into (and removed from) the acquisition vacuum chamber 60 without the vacuum chamber 60 losing vacuum or with a small amount of pressure loss. In the embodiment shown in FIG. 3H, for example, there are two dedicated valves 56, one for venting and one for connection to the vacuum source 107 (FIG. 20B, for example $107_1$, a roughing pump). However, a two-way or three-way valve can be used to carry out the venting and evacuation (not shown).

FIGS. 3A-FIG. 3H illustrate the robot 20 and slide holder 25 at various positions for intake of a sample slide S and transfer to a vacuum chamber 60, typically via a load lock chamber 55.

Figure 3A:
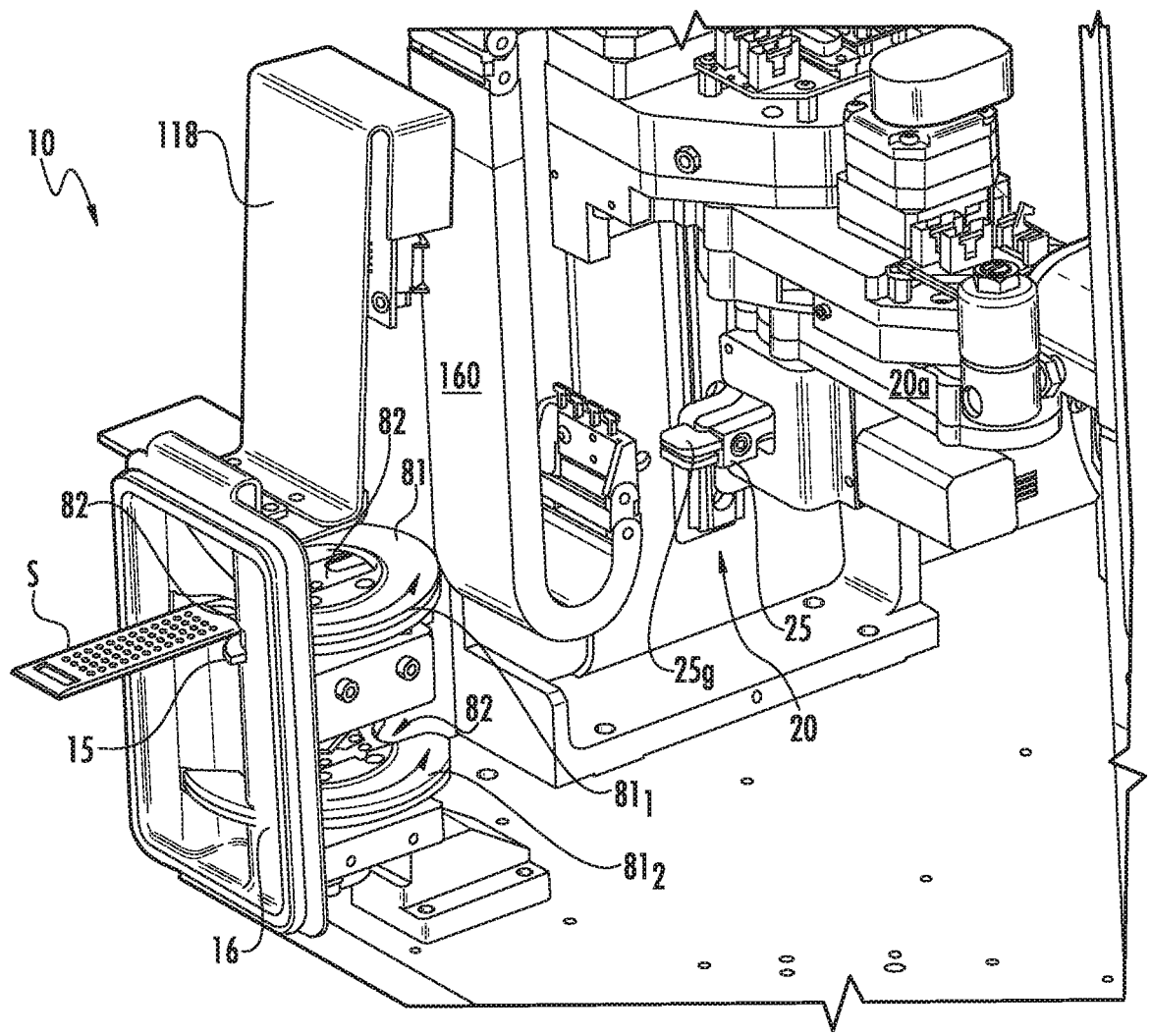
FIGS. 3A-3H are partial side perspective views of a slide handling system according to embodiments of the present invention.
Figure 3B:
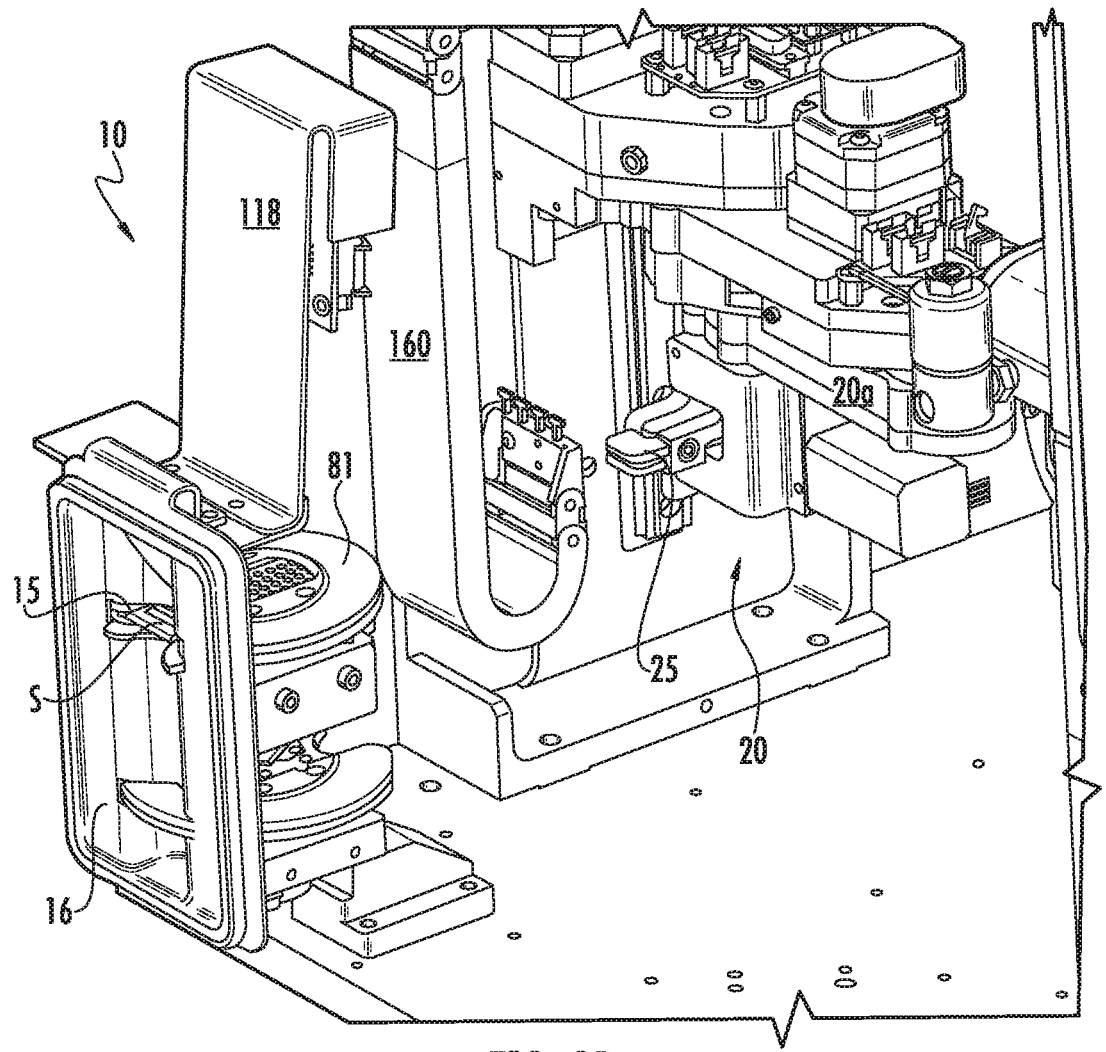

FIG. 3A illustrates an intake of a slide S into port 15 which may be carried out automatically via an external mechanism or via a user's manual insertion. The port 15 can be aligned with a channel 82 in a rotatable carousel 81. There can be a plurality of ports 15, shown as vertically aligned first and second ports in FIG. 3A (but again a single port per FIG. 1A or more than two ports 15 may be used). Referring to FIG. 3B, a slide presence sensor 128 (FIGS. 8A, 9A, 10A, 10B) detects the presence of a slide S in the channel 82 of the carousel 81 to activate the rotational intake of the carousel 81 and next sequence of actions.

The mass spectrometer system 10 (or other instrument) can be configured to have a slide input/output (I/O) interface module 118 that provides at least one rotatable carousel 81. As shown, the carousel 81 can have a single channel 82 for holding a single slide S at any one time. The slide holding channel 82 can have a length L (FIGS. 9A, 9B) that is between 50%-90% of the outer diameter of the carousel 81. This single channel configuration and length used with a rotational carousel 81 can allow for a relatively compact interface/input profile, advantageously reducing the footprint of the instrument 10.

Figure 3C:
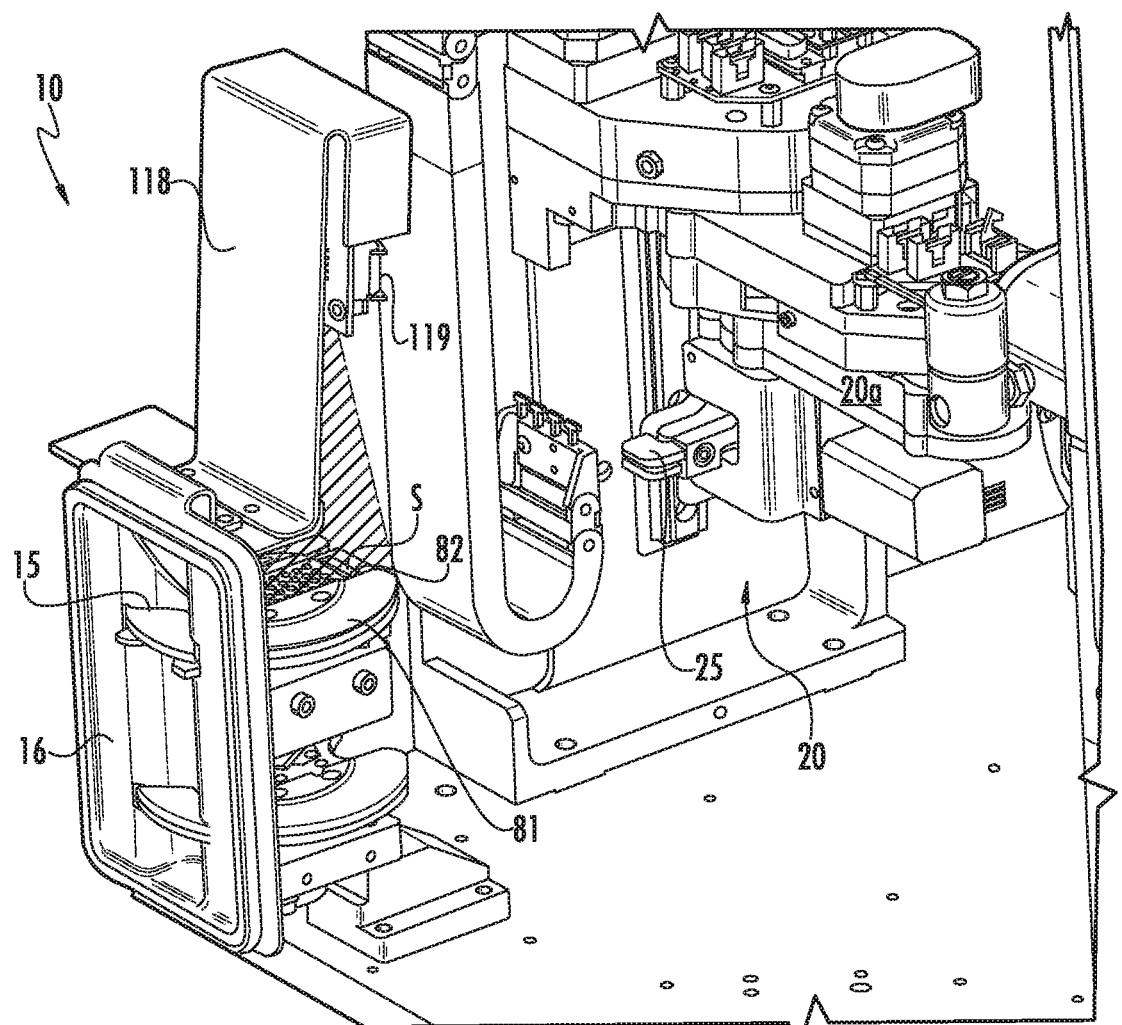

Referring to FIG. 3C, the carousel 81 can rotate about 180 degrees to place the slide S in an interior compartment 160 of the system 10 and a scanner 119 can scan the slide S for relevant data, typically via a machine readable optical label such as a 2-D matrix code (which may be a Quick Response "QR®" code) or a bar-code, for example.

Figure 3D:
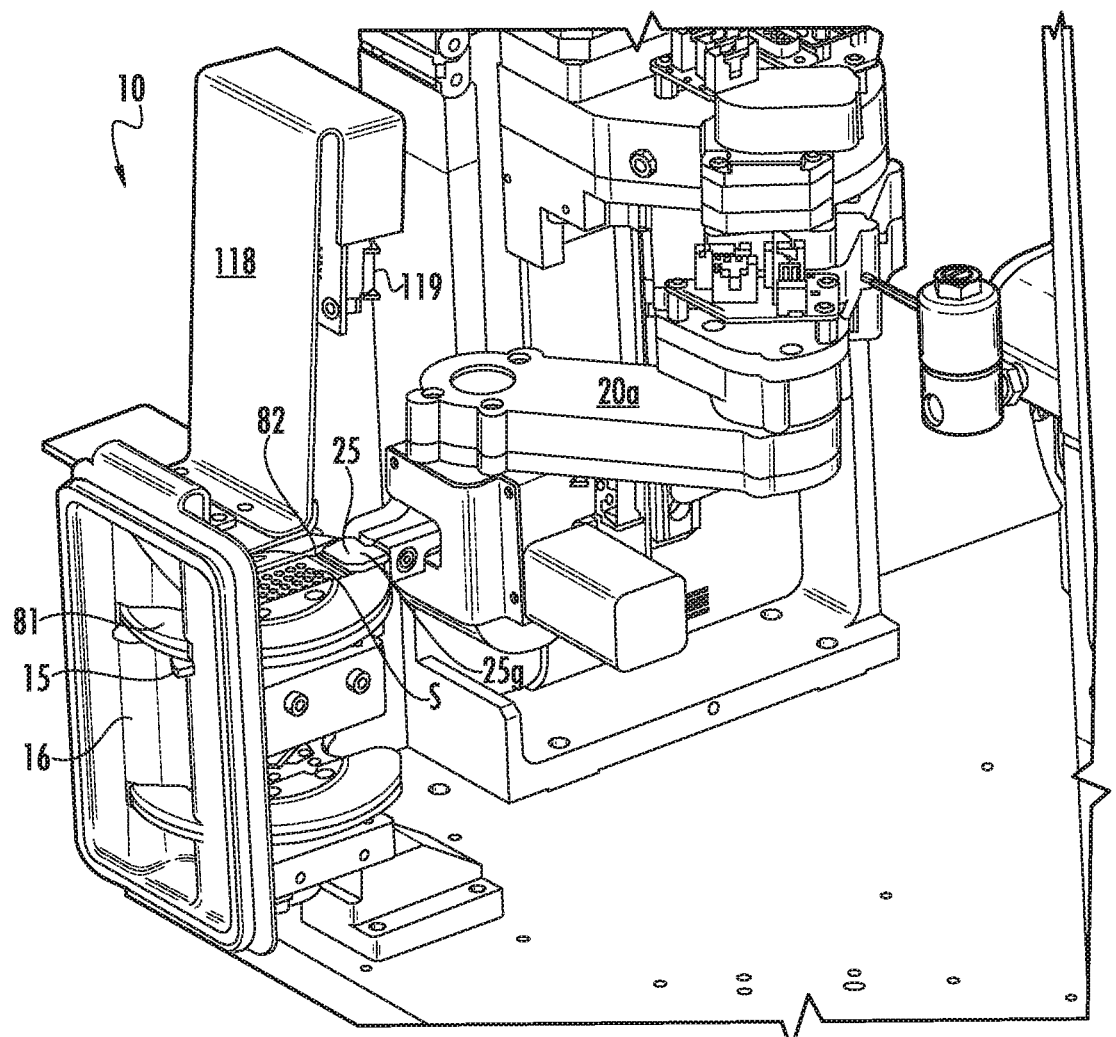

Referring to FIG. 3D, the robot 20 can extend and allow the slide holder 25 with grip 25g to engage an end portion of the slide S while held on the carousel 81.

Figure 3E:
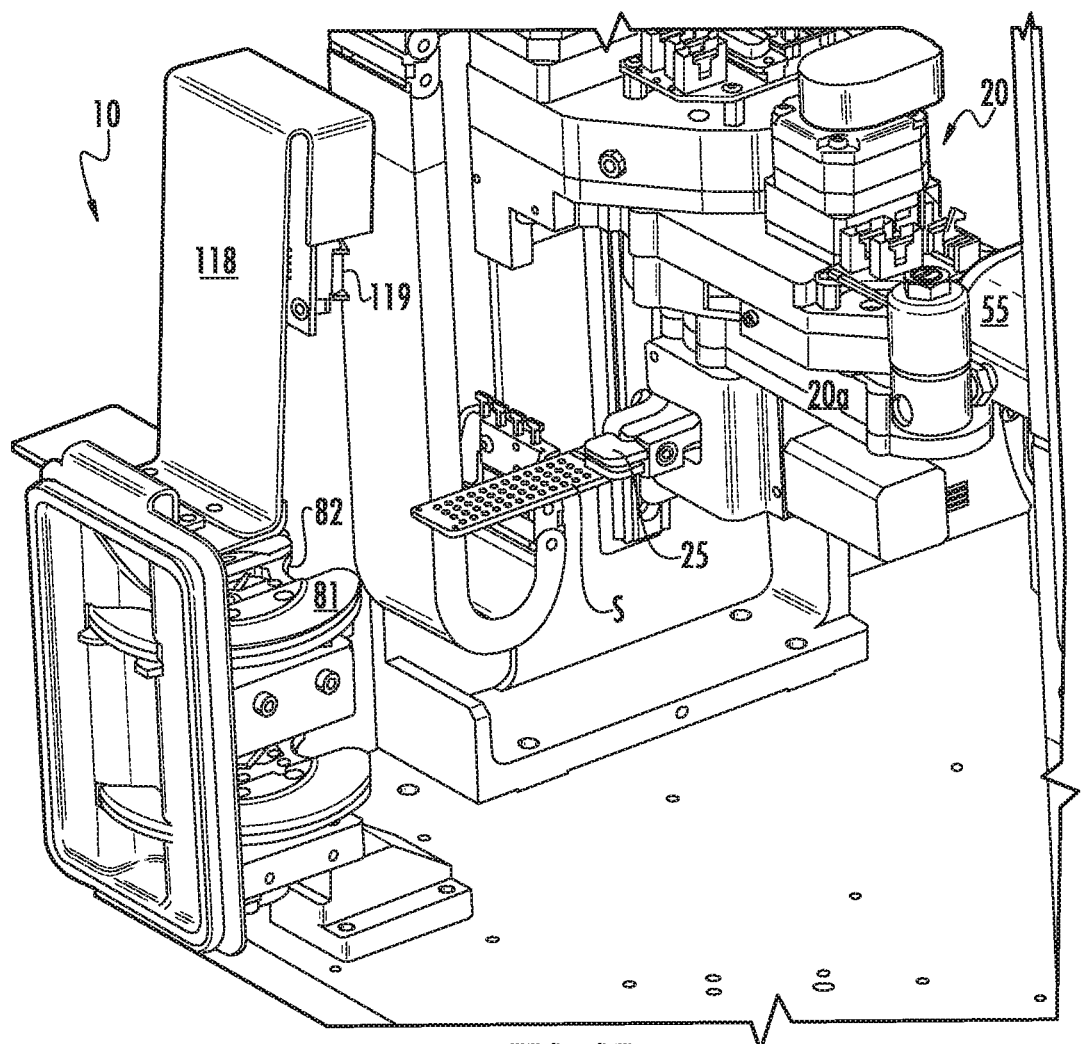

FIG. 3E illustrates that the robot 20 can then move the slide S off the carousel 81. Acquisition groups can be imaged. An acquisition group is a subset of sample spots on the slide. Each slide contains a plurality of groups of sample spots, typically between 10-100 spots in two-ten groups, such as about 48 sample spots, arranged in three groups of 16 spots each. Each group has a center spot, which can be identified as a QC spot that can be used for calibration and quality check. As the slide is removed from the input carousel, the robot pauses at predefined positions in order to image each group because the field of view may not contain the entire slide. The slide presence sensor 128 now identifies a "no slide" status on the carousel 81. The slide input into the instrument 10 is complete and the slide S can be moved to internal storage or directly to the load lock chamber 55. The internal compartment 160 can be held at a positive pressure during operation.

Figure 3F:
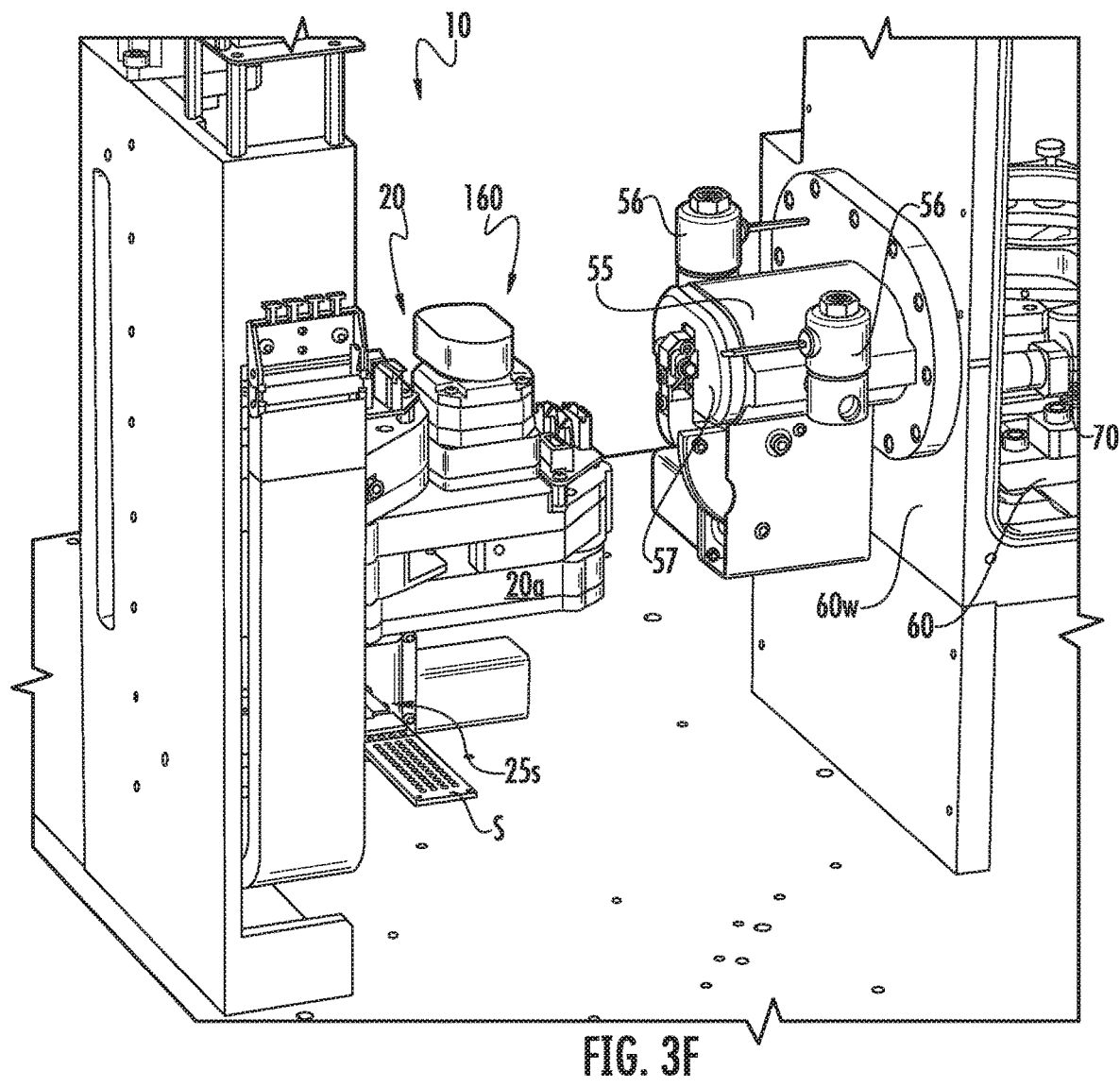
Figure 5A:
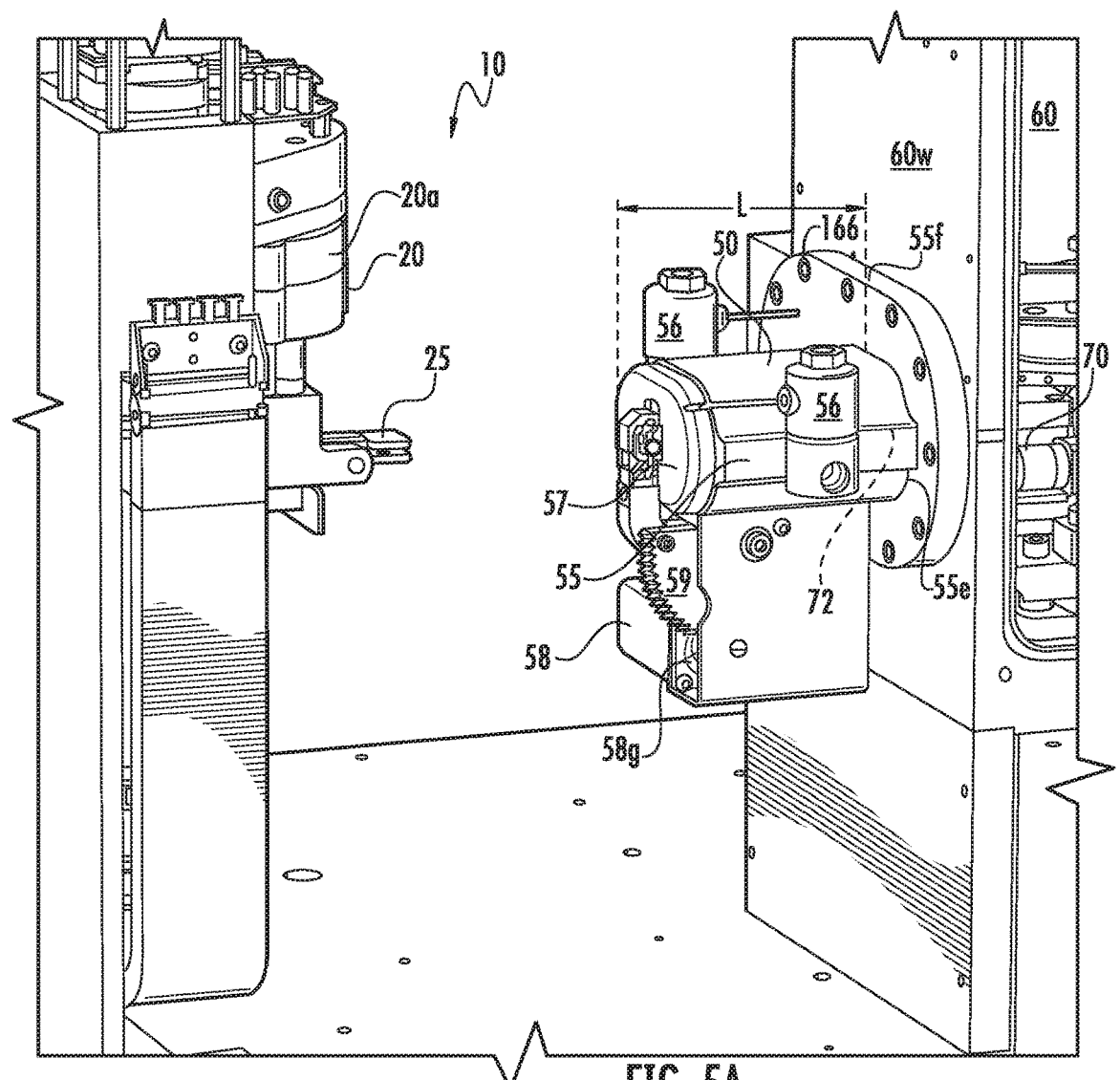
FIG. 5A is a side perspective view of the slide handling system and load lock chamber shown in FIG. 4A, shown with the slide transferred to an X-Y stage and with the load lock door closed configuration according to embodiments of the present invention.
Figure 5B:
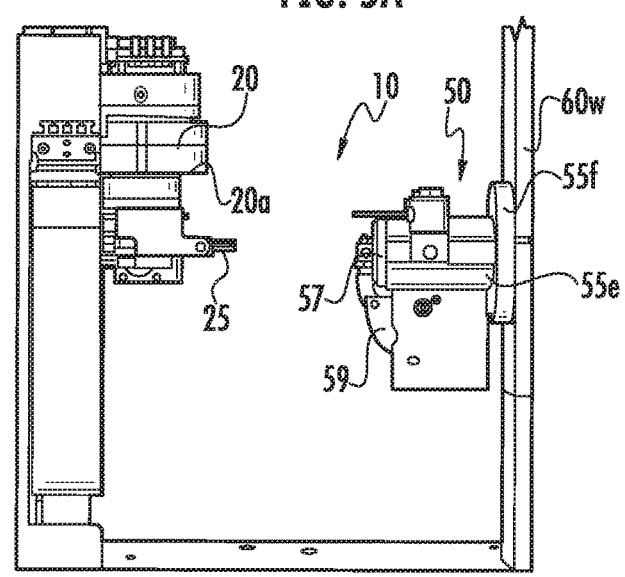
FIG. 5B is a side view of the components and configuration shown in FIG. 5A.
Figure 5C:
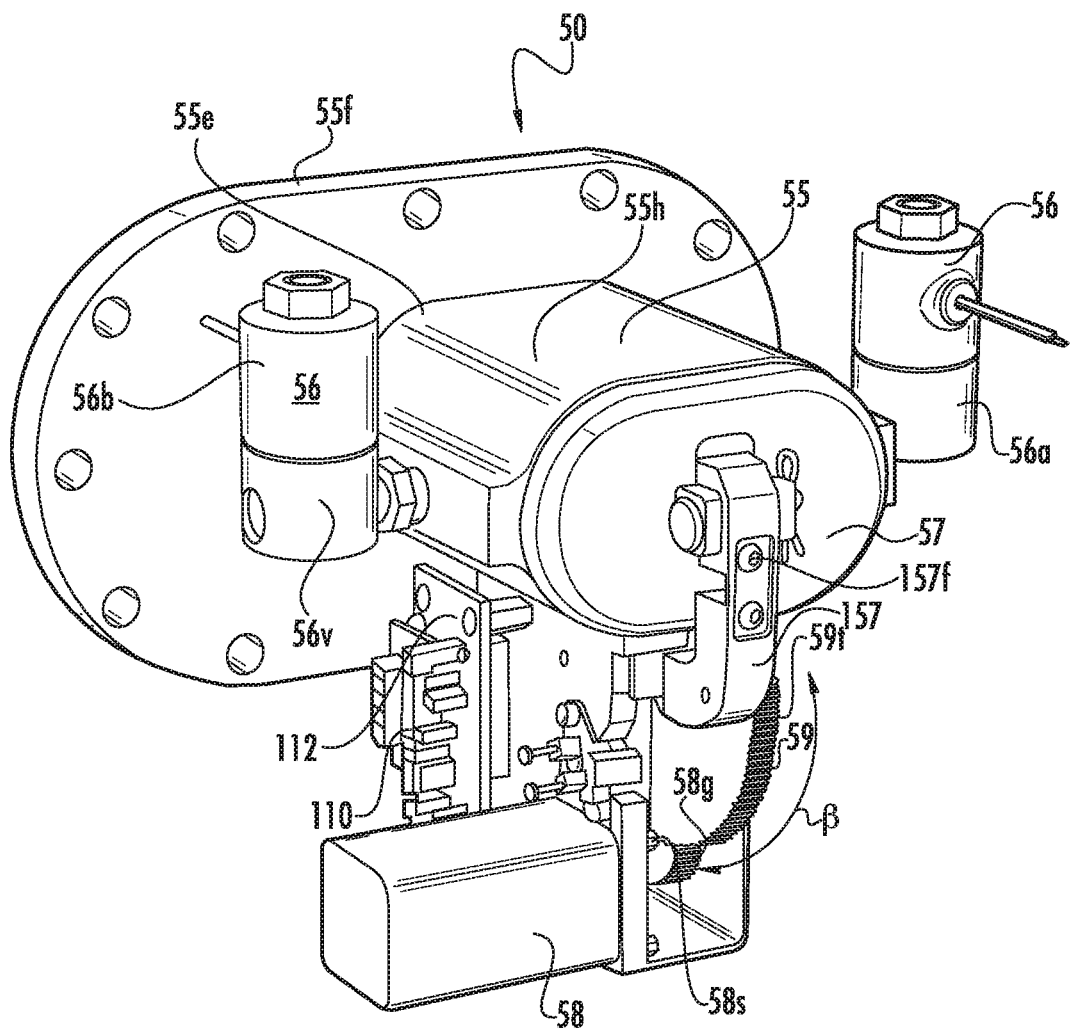
FIG. 5C is a front, left side perspective view (viewed facing the primary vacuum chamber) of the load lock chamber assembly shown in FIG. 5A according to embodiments of the present invention.
Figure 5D:
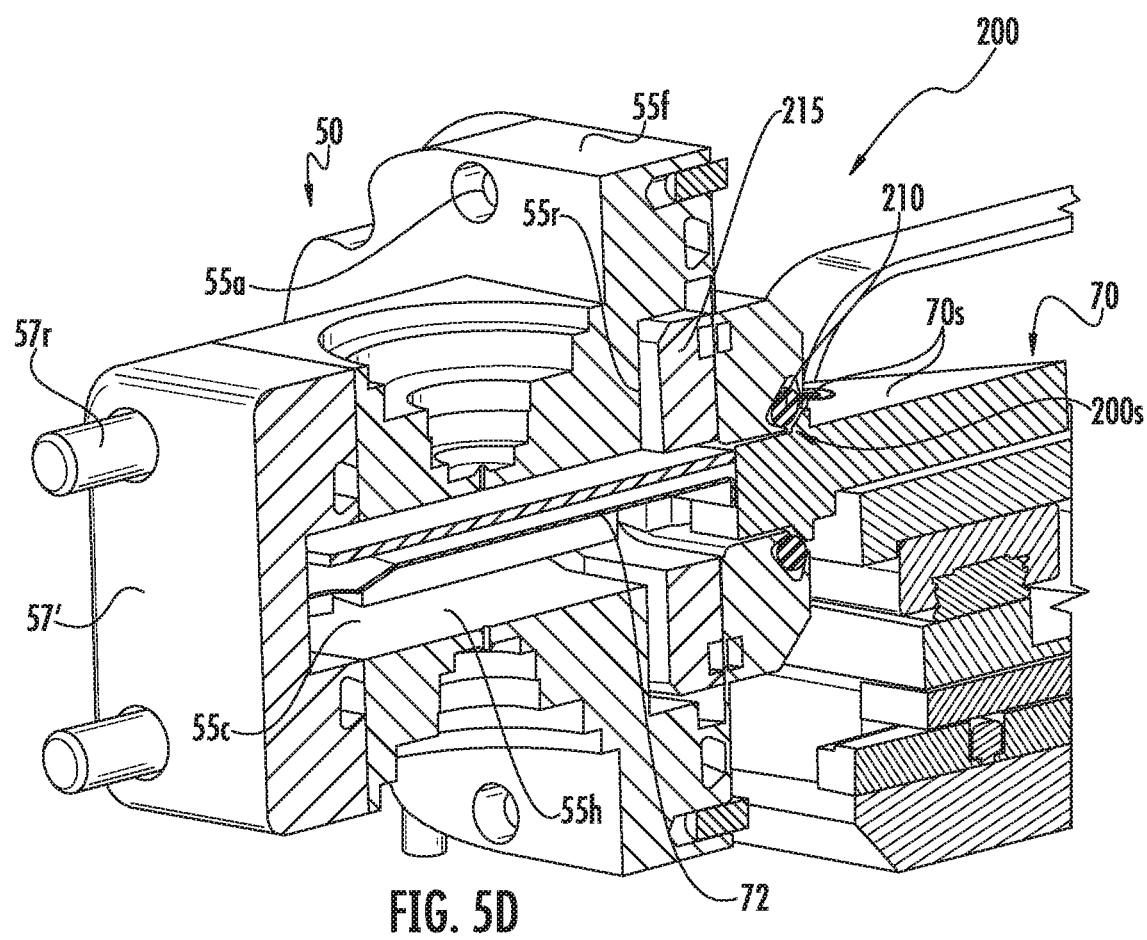
FIG. 5D is a partial section view of a load lock chamber assembly according to embodiments of the present invention.

As shown in FIG. 3F, and as will be discussed further below, the at least one grip sensor 25s can include first, second and third sensors, $25s_1$, $25s_2$, $25s_3$ (FIGS. 14A, 14B, for example) of the slide holder 25 can indicate a slide S is present and ready for subsequent transport in the instrument 10. The door 57 of the load lock chamber 55 may be closed as shown or open if ready for slide input, with the other side of the chamber 55 sealed by slide holder 72 of the X-Y stage 70 as shown in FIG. 3H (FIG. 5D shows the slide holder in the chamber 55).

Figure 3G:
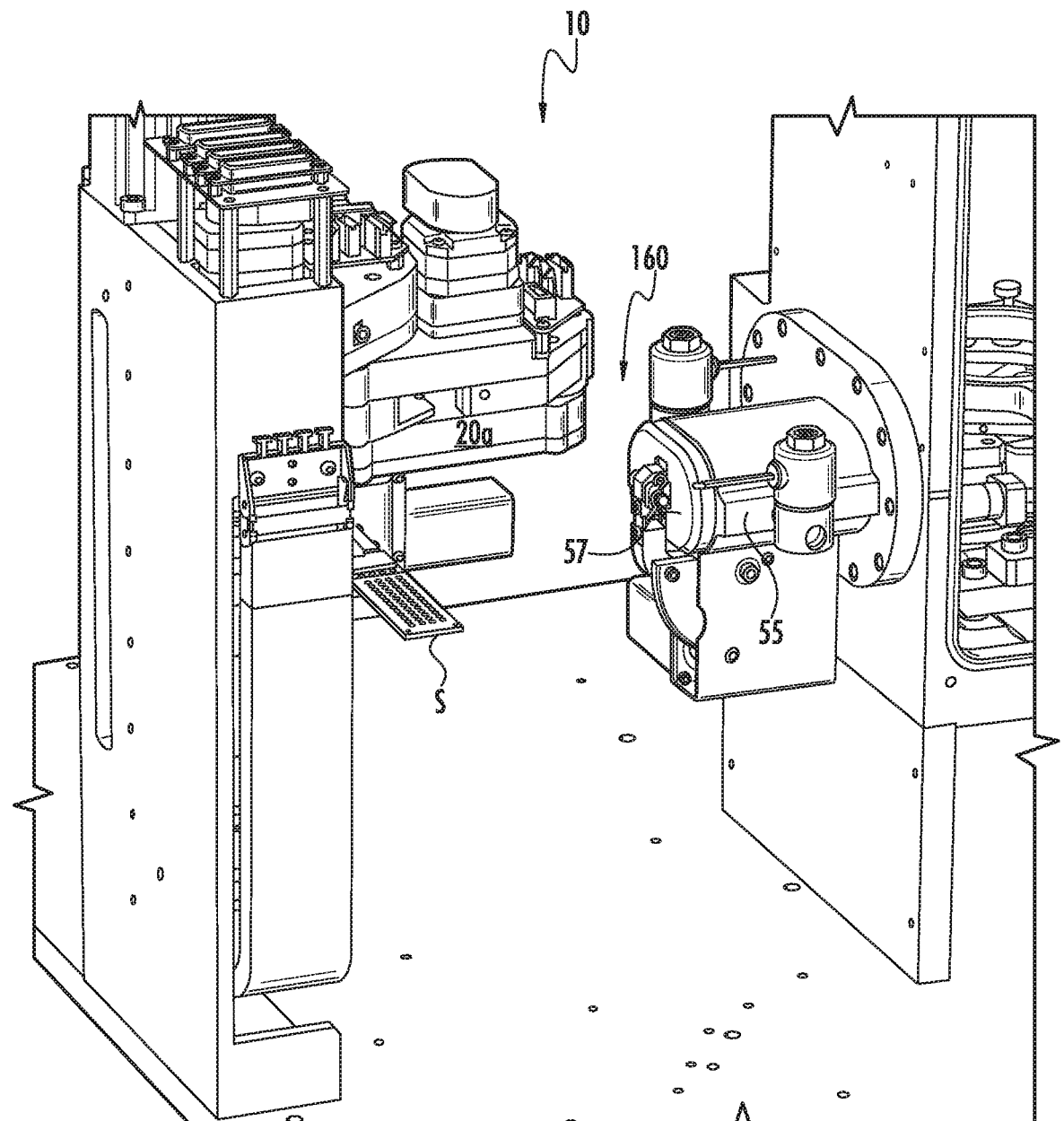

Referring to FIG. 3G, the arm 20a of the robot can be moved up as shown (or down) to a transfer position in line with the load lock chamber 55.

Figure 3H:
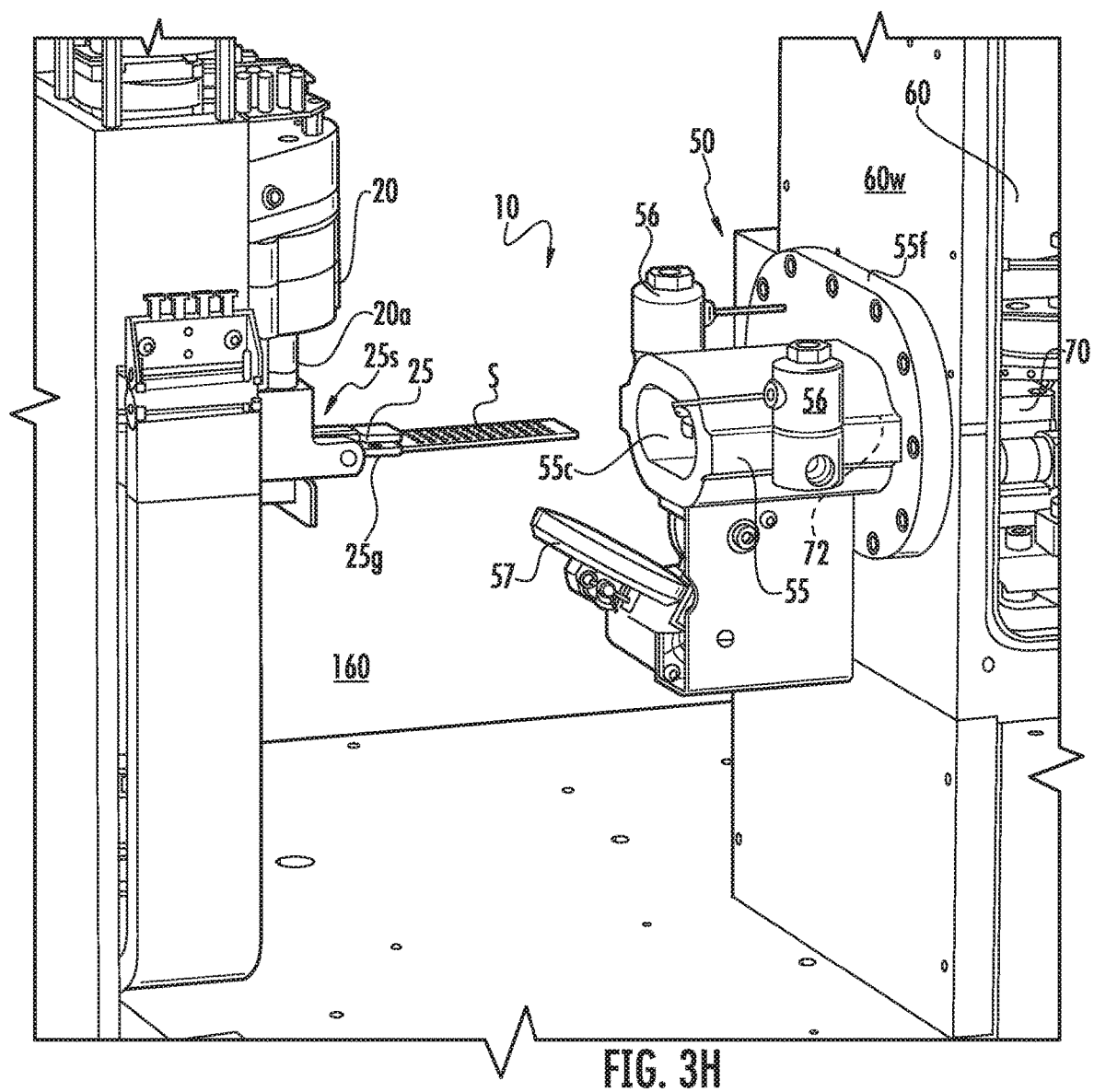
Figure 4A:
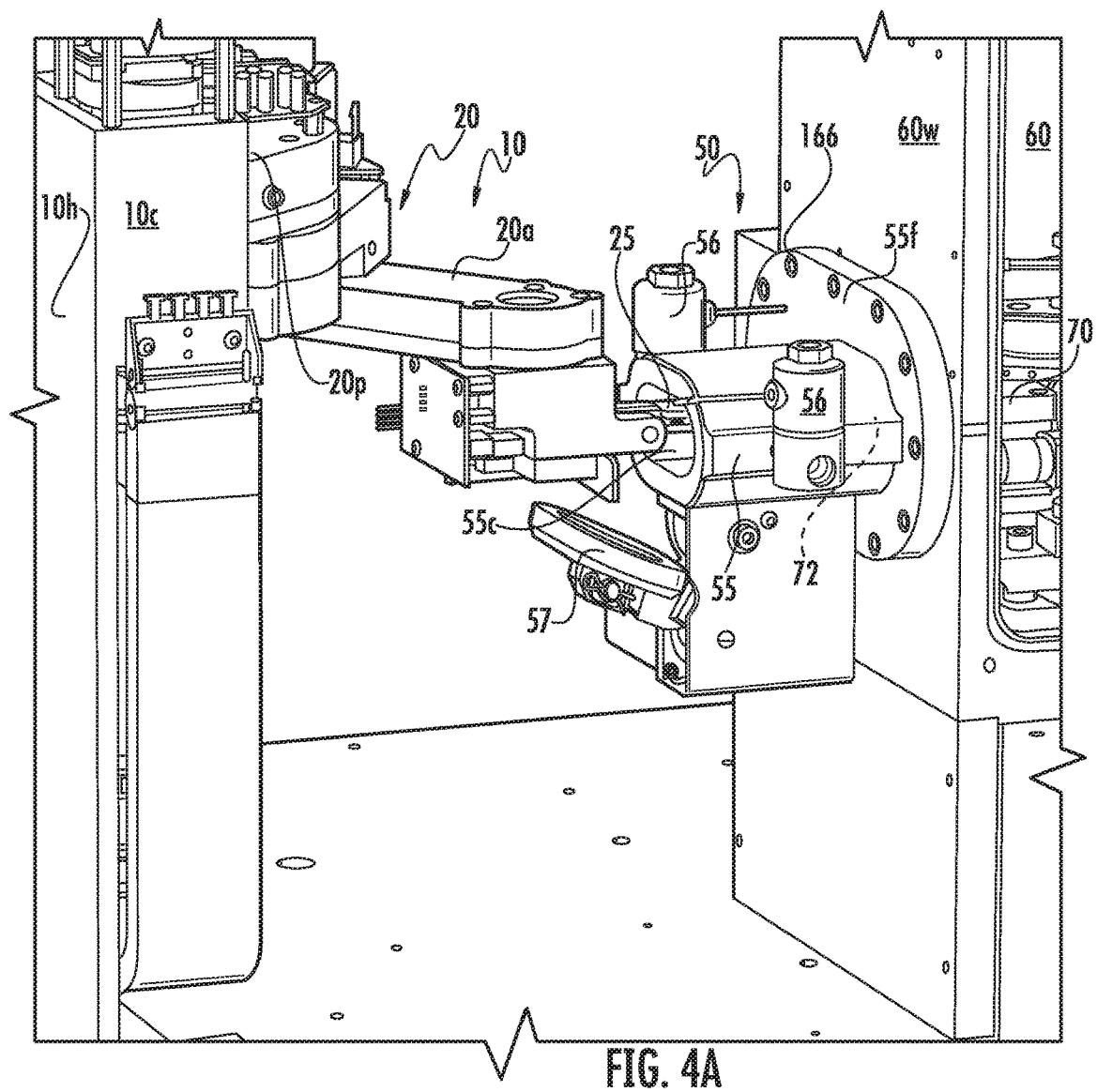
FIG. 4A is a side perspective view of the slide handling system and load lock chamber shown in a loading configuration according to embodiments of the present invention.
Figure 4B:
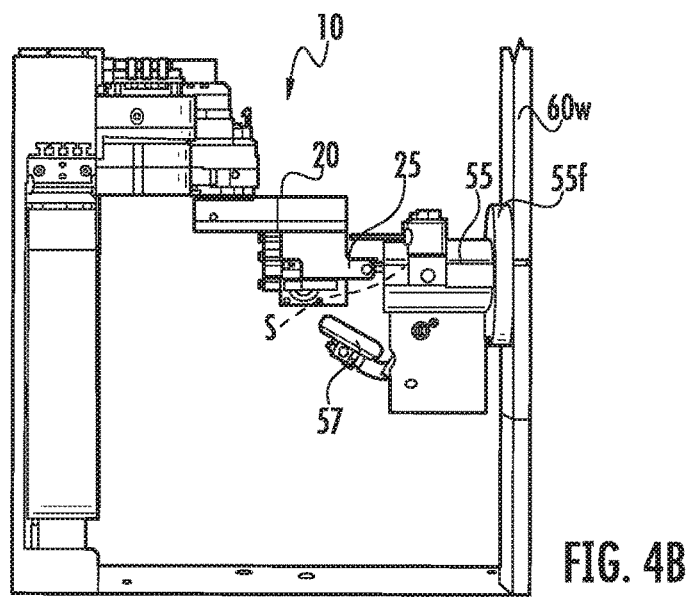
FIG. 4B is a side view of the components and configuration shown in FIG. 4A.

FIG. 3H illustrates the slide S at a transfer height ready for load lock handoff with a door 57 of the load lock member assembly 50 open, exposing the open channel 55c. The slide holder 72 of the X-Y stage 70 (FIGS. 19, 20A, 20B, for example) is already in position in the chamber 55, sealed to the load lock chamber assembly 50, to maintain the vacuum pressure in the vacuum chamber 60. The arm 20a of the robot 20 can be rotated and positioned at the transfer height in a z-axis direction relative to its input position for this operational configuration. The grip 25g of the slide holder 25 can hold the slide S such that at least a major length of the slide extends forward of the grip 25g and is free. This configuration can facilitate insertion of the slide S into the aligned slide holder 72 of the X-Y stage 70 (FIGS. 4A, 4B, 5D). The slide holder 25 (i.e., gripper 25g) can release the slide S to the X-Y stage slide holder 72 and retract to a home position (FIGS. 5A, 5B).

FIGS. 4A and 4B illustrate a slide transfer configuration/position of the robot arm 20a and slide holder 25. In operation, with the X-Y stage 70 in position for slide transfer and with the slide holder 72 extended into the channel 55c of the load lock chamber 55, a vacuum seal 200s (FIG. 5D) of a vacuum seal assembly cartridge 200 (FIG. 5D) attached to the load lock chamber is engaged with the seal interface 72s of the slide holder 72 and the door 57 is closed and sealed shut on the end of the chamber 55c facing the robot 20 and/or front of the housing 10f. A first one of the valves 56 can open and vent the load lock chamber 55 to atmosphere, the load lock door 57 can then open, and the slide handler arm 20a can extend the slide holder 25 into the chamber 55c and can release the slide S to the slide holder 72 (FIG. 11A) of the X-Y stage 70.

Referring to FIGS. 4A, 4B, 5A, 5B and 5D, for example, the load lock chamber 55 can have a relatively compact configuration with a length L extending between the slide insertion/extraction end adjacent the door 57 to the end 55e at the wall 60w of the vacuum chamber 60 (i.e., at the front or inner surface of the flange 55f facing the wall 60w) that is between about 75 mm and about 95 mm and a height H that is between about 40 mm and 60 mm. The open channel 55c can be oblong or elongate laterally with a height that is less than a width.

As shown in FIG. 5D, the seal assembly cartridge 200 can have at least one O-ring 210 and a seal housing 215 of the seal assembly cartridge 200 can reside in a recess 55r in the primary housing 55h of the load lock chamber 55. A flange 55f of the load lock housing 50h can extend about the chamber 55c and the recess 55r and attach to a wall 60w of the vacuum chamber 60 via fixation members 166 (FIGS. 4A, 5A) extending through apertures 55a in the flange 55f. The slide seal interface 72s can engage the O-ring 210 to form a vacuum tight seal with the seal interface 200s of the seal cartridge 200s (FIG. 17) when the slide holder 72 is in position in the load lock chamber 55. FIG. 5D also illustrates that the door 57' can be mounted on mounting members 57r which can comprise rails, threaded members such as thumbscrews and the like to be able to slide to sealably close.

FIGS. 5A and 5B illustrate another operational configuration of the robot 20, the slide holder 25 and the load lock chamber assembly 50. As shown, the arm 20a with the slide handler 25 is retracted away from the load lock chamber 55 and the door 57 is sealably closed against the load lock chamber 55. A second one of the valves 56 is opened and the load lock chamber 55 can be pumped/evacuated via vacuum pump (i.e., pump $107_2$, FIG. 22B) to a desired pressure, typically at a pressure within a suitable range of the vacuum chamber 60.

Vacuum gauges G (which can be in module $100_7$, FIG. 2A) can be used to automate the monitoring and cause the X-Y stage 70 to move the slide holder 72 into the vacuum chamber 60 when a desired load lock pressure is achieved. Once vacuum is at an appropriate level in the load lock chamber 55, the X-Y stage 70 can remove the slide holder 72 from the load lock chamber 55 into the vacuum chamber 60 while the door 57 remains sealably closed against the load lock chamber 55.

In some embodiments, there can be a step in vacuum pressure between the load lock chamber 55 in the load/seal position and the vacuum chamber 60. For example, a sample slide S is loaded into the load lock chamber 55 from outside while the load lock chamber 55 is open to atmosphere with the door 57 open and is also sealed from the acquisition vacuum chamber 60. The load lock chamber 55 is then sealed from the outside by closing the door 57 and roughing down (evacuating) to an intermediate pressure level by the opening of a valve 56 on the load lock chamber assembly 50 (which is typically lower than atmospheric pressure but higher than the pressure in the acquisition chamber 60). The valve 56 is then closed. The load lock chamber 55 is sealed from both outside and from the acquisition vacuum chamber 60 placing the load lock chamber 55 at an intermediate pressure, while acquisition chamber is at a lower operating pressure. The sample stage 70 is retracted into the acquisition chamber 60, breaking the seal between the load lock chamber 55 and the acquisition chamber 60. The two chambers 55, 60 are no longer fluidically separate, so there can be a momentary spike in pressure in the acquisition chamber 60 due to an inrush of air from the previously-sealed load lock chamber 55. After a relatively short amount of time, the pressure in the vacuum chamber 60 reaches an operating level once again.

However, in other embodiments, the load lock chamber 55 can be evacuated to a level matching or below the pressure acquisition chamber 60.

Referring again to FIGS. 5A-5D, the load lock chamber assembly 50 can be mounted to a wall 60w of the vacuum chamber 60 via the flange 55f. The flange 55f can extend outward a distance about a perimeter of an end 55e of the load lock chamber 55 facing the acquisition vacuum chamber 60. Typically, the flange 55f is mounted to the outer surface of the wall 60w, optionally directly mounted to the wall 60w. The wall 60w can face the front wall 10f of the housing 10h.

The door 57 of the load lock chamber assembly 50 can be an automatic door that is operated without requiring user input and/or manual force. As shown in FIGS. 5A-5C, for example, the door 57 and load lock chamber 55 can be elongated laterally relative to their height. The door 57 can have an inner surface with a seal member 57s such as an O-ring or gasket. The load lock chamber assembly 50 can include a stepper motor 58 with a shaft 58s that rotates a first gear 58g that engages a second gear 59 to automatically open and close the door 57.

As shown in FIG. 5C, a control circuit 110, which can be at least partially on a printed circuit board 112 that can be mounted adjacent the step motor 58 and can provide the automatic electronic control for opening and closing the at least one valve 56 and opening and closing the door 57. The stepper motor 58 can be a frame size NEMA 11 compact stepper motor (body length 2.01 inches with a holding torque of 0.12 N-m and a speed of between 10-22 rotations per second), optionally with a step angle of 1.8 degrees. The stepper motor 58 can be a compact stepper motor optionally model 211-20-02, available from Lin Engineering, LLC, Morgan Hill, Calif.

The gears 58g to 59 can have a 10-1 reduction. The door 57 can couple to a compliant flat blade spring or other compliant member (not shown) to facilitate that the door mates to the housing 55h of the load lock chamber 55 with sufficient force to seal. As shown, a first valve 56 is a vacuum valve 56v that is in fluid communication with a vacuum pump (107, FIG. 2C). The second valve 56 is an atmospheric vent valve 56a that can connect to a filter (not shown). In some embodiments, the valve bodies 56b can reside entirely external to the chamber housing 55h. The valve bodies 56b may be cylindrical.

As shown in FIG. 5C, the second gear 59 can reside above the first gear 58g and can have a semi-circular perimeter, typically with an angular extent β of between 45-180 degrees. In some embodiments, the second gear 59 has only three sides, two of which are perpendicular and with one of the three sides having gear teeth 59t on an outer perimeter thereof with an angular extent of between 60-120 degrees, more typically about 90 degrees, that can rotate between first and second positions to open and close the door. As shown, the angular extent β is about 90 degrees between first and second positions to open and close the door 57 with an appropriate force to form a sufficient seal. The door 57 can have an arm 157 that is affixed to the second gear 59 via one or more fixation members 157f.

It is noted that the example sequence shown in FIGS. 3A-3H, 4A and 5A can be altered as appropriate, such as, to remove a slide S after analysis to a storage rack 10r (FIG. 21) inside the housing 10h or to an exit port 15 (FIGS. 1A, 1B, for example).

Figure 6A:
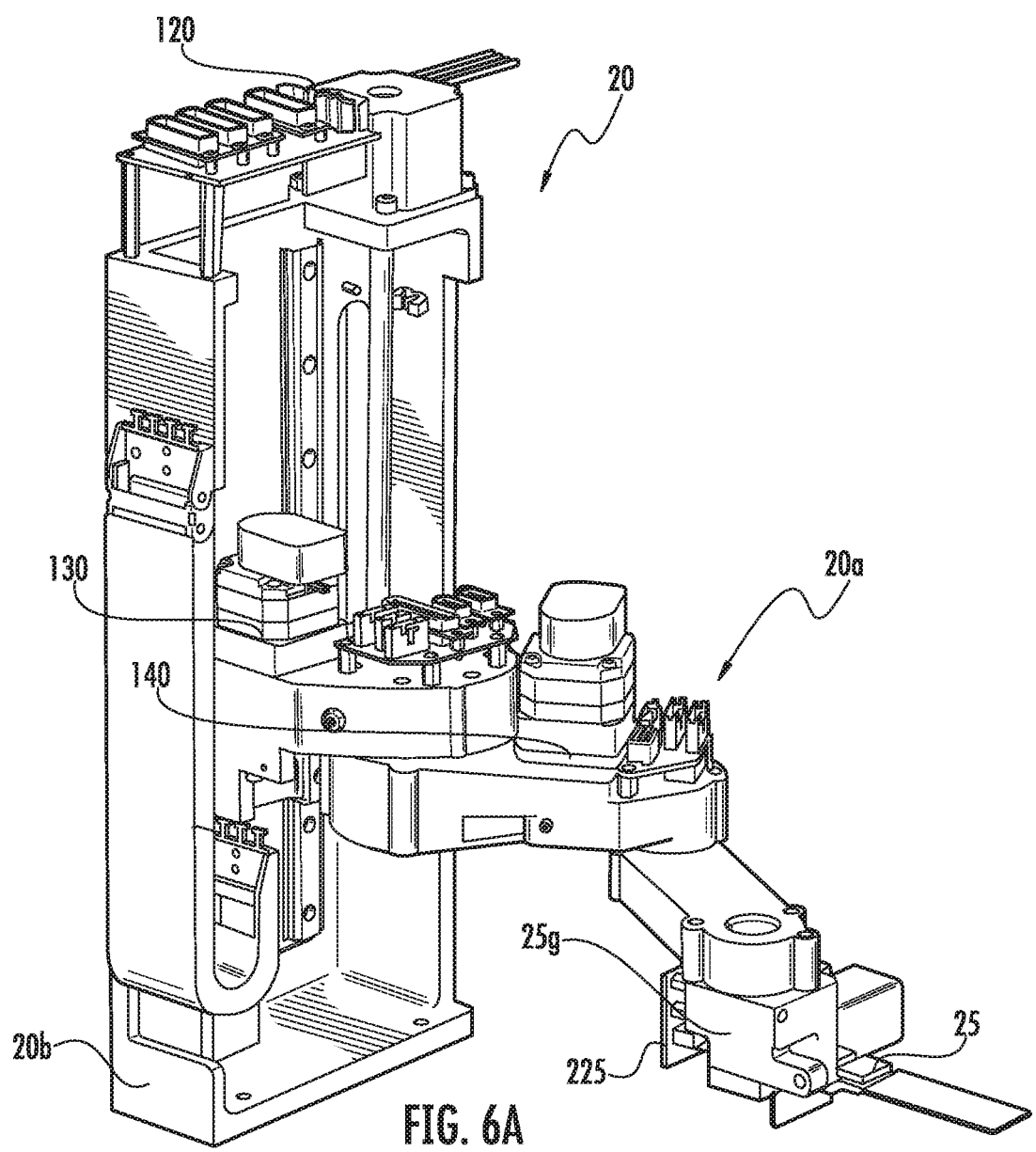
FIG. 6A is a side perspective view of an example slide handling robot assembly according to embodiments of the present invention.

FIG. 6A illustrates an example robot 20 with the robot arm 20a that includes a Z drive 120, a theta drive 130, an R-drive 140, a slide gripper 25g, and a mount 20b. As shown, the slide gripper 25g can be coupled to a PCB 225 that moves with the arm 20a and has grip sensors 25s that can be used to direct actions by the slide gripper 25g (see also, FIGS. 14A, 14B-16A, 16B).

Figure 6B:
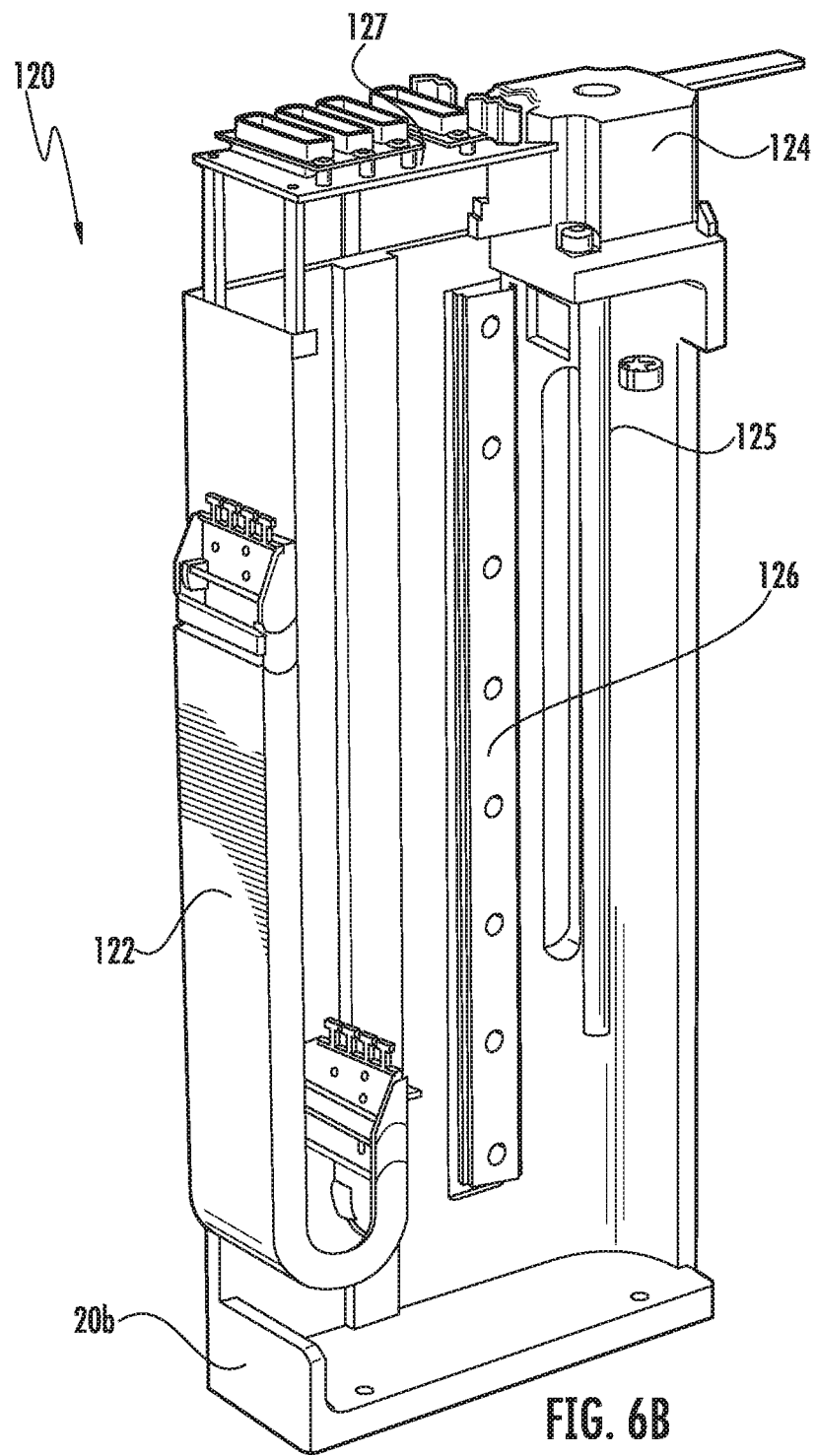
FIG. 6B is a side perspective view of components of a Z-axis sub-assembly of the slide handling robot assembly shown in FIG. 6A according to embodiments of the present invention.

FIG. 6B illustrates the Z drive 120. As shown, the Z-drive 120 can include a stepper motor 124 with a driven integrated leadscrew drive 125, a high moment stiffness bearing rail and carriage 126, a high-flex ribbon cable 122, an integrated robot mount 20b with Z-axis bearing mount, an interconnect PCB 127 on a top portion thereof, comprising electronic components such as optical encoders.

Figure 6C:
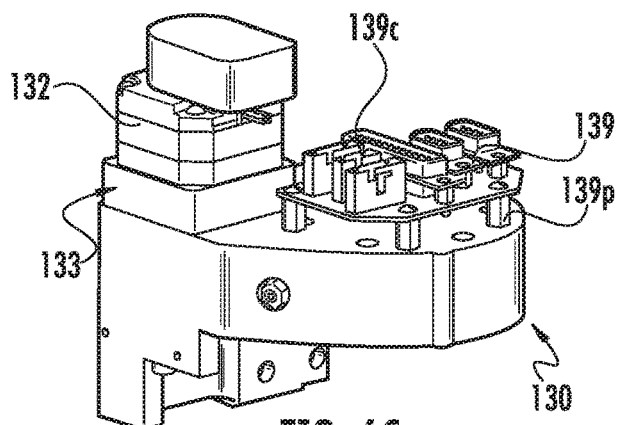
FIG. 6C is a side perspective view of components of a theta sub-assembly of the slide handling robot assembly shown in FIG. 6A according to embodiments of the present invention.
Figure 6D:
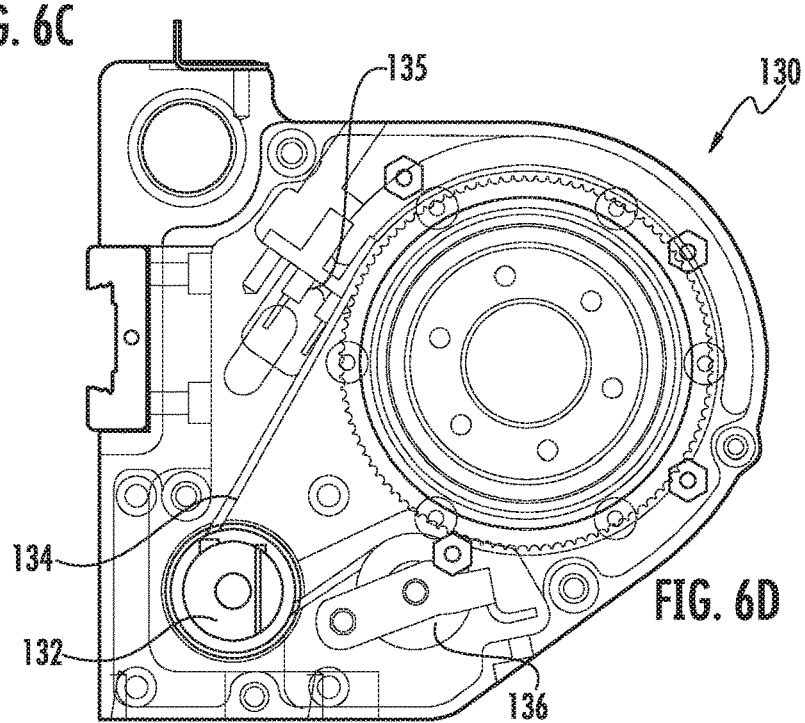
FIG. 6D is a top, partially transparent view of the theta sub-assembly shown in FIG. 6C.
Figure 6E:
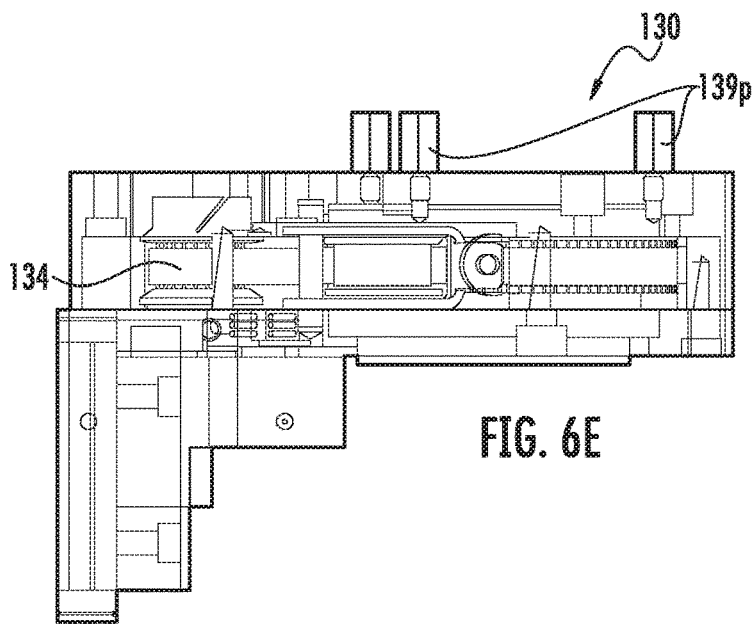
FIG. 6E is a side, partially transparent view of the theta sub-assembly shown in FIG. 6C.

FIGS. 6C-6E illustrate an exemplary theta drive 130 with a stepper motor 132, a planetary gearbox 133 (optionally a 5:1 gear reduction configuration), a belt drive 134, which can be a 6 mm GT2 belt, an optical encoder and/or sensor 135 for positional input (i.e., for a theta drive home position), an integrated belt tensioner 136 and an interconnect PCB 139 held on posts 139p. The interconnect PCB 139 can include electronic components 139c that provide a Z e-chain input, a T motor, encoder and sensor input, an R output and a gripper output.

Figure 6F:
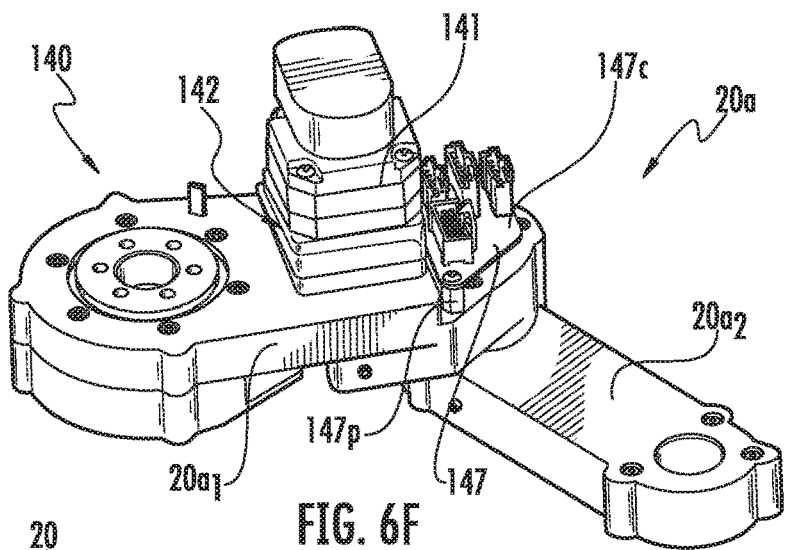
FIG. 6F is a side perspective view of an R sub-assembly of the slide handling robot assembly shown in FIG. 6A according to embodiments of the present invention.

FIG. 6F illustrates cooperating upper and lower arm links $20a_1$, $20a_2$ of the arm 20a. The R drive 140 can include a stepper motor 141, a planetary gearbox 142 (with the same gear reduction as the theta drive 130, optionally 5:1), an optical encoder 143 for positional input (i.e., R home and/or closed-loop position control), a belt drive 144, optionally also with an integrated belt tensioner), and an interconnect PCB 147 on posts 147p. The interconnect PCB 147 can include electronic components 147c which can provide a Z e-chain input, and an R motor, encoder and sensor and/or respective inputs. The upper arm $20a_1$ can work like a planet gear and rotates around pulley attached to the Theta drive 130. The motor 141 can rotate to extend the arm or retract the arm when the Theta drive 130 is held stationary by the Theta motor 132.

Figure 6G:
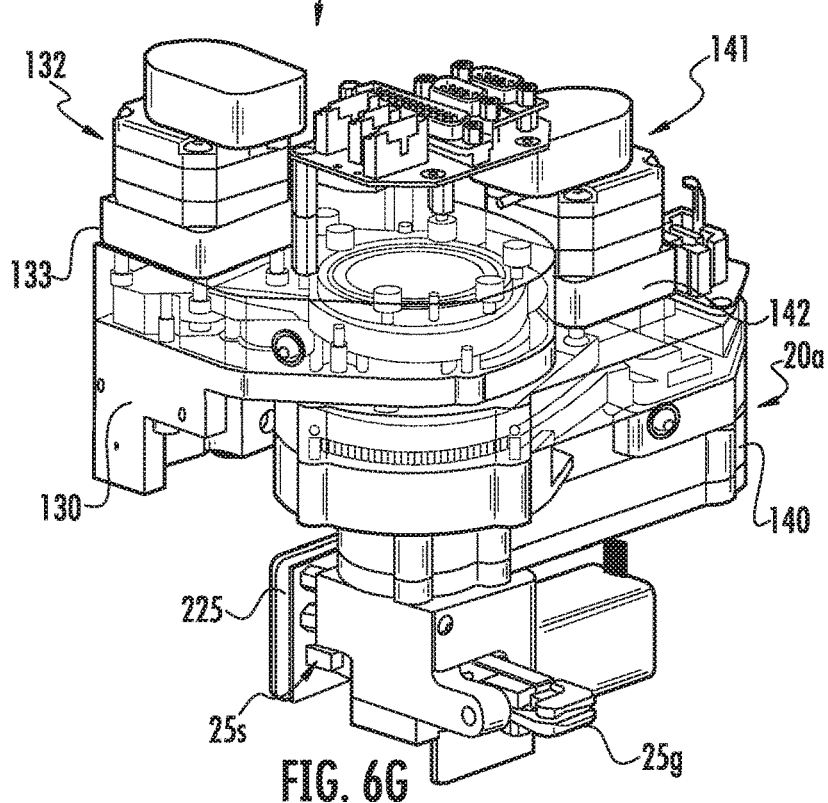
FIG. 6G is a sample handling arm sub-assembly of the slide handling robot assembly shown in FIG. 6A according to embodiments of the present invention.

FIG. 6G shows the robot 20 with the arm assembly R drive assembly 140 and the theta drive assembly 130 assembled with the arm assembly 20a.

Figure 6H:
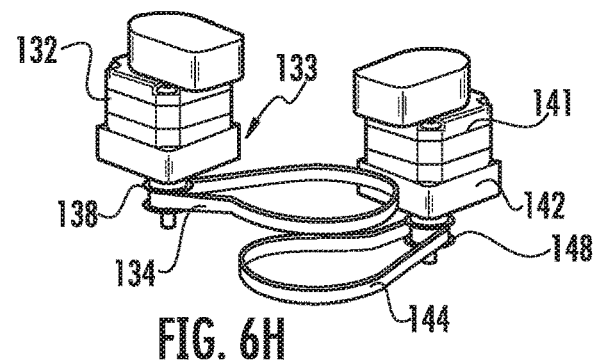
FIG. 6H is a perspective, partial exploded view of components of the sub-assembly shown in FIG. 6G.

FIG. 6H illustrates a sub-assembly of the robot 20 with the arm 20a and theta drive 130 and R drive 140. Each motor and gearhead 132, 133 and 141, 142 can be coupled to a respective timing pulley, 138, 148, such as a 22-tooth timing pulley. A hub can be mounted to the end of each gearhead assembly.

Figure 7A:
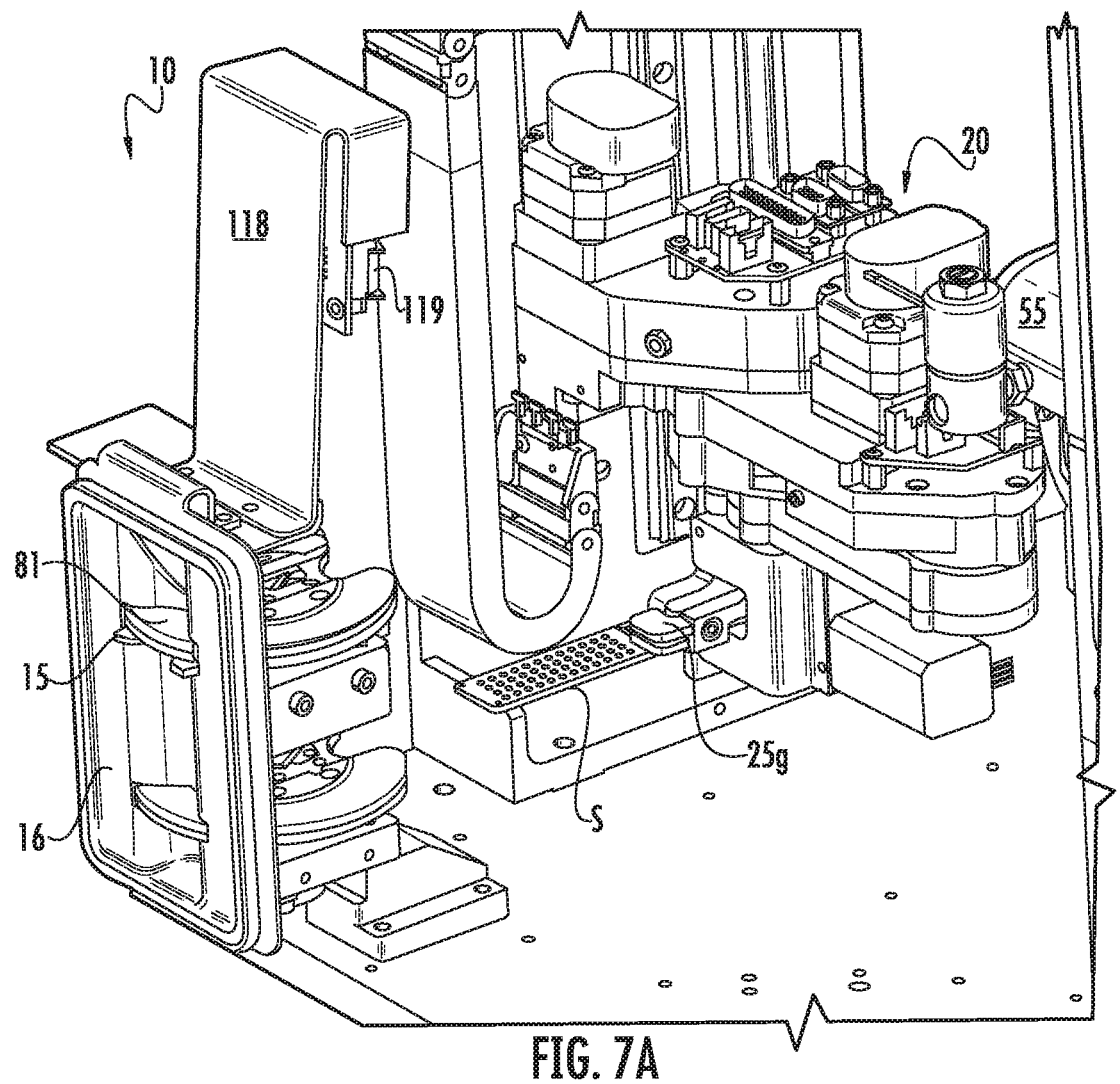
FIGS. 7A-7D are partial, side perspective views of an exemplary slide output sequence according to embodiments of the present invention.
Figure 7B:
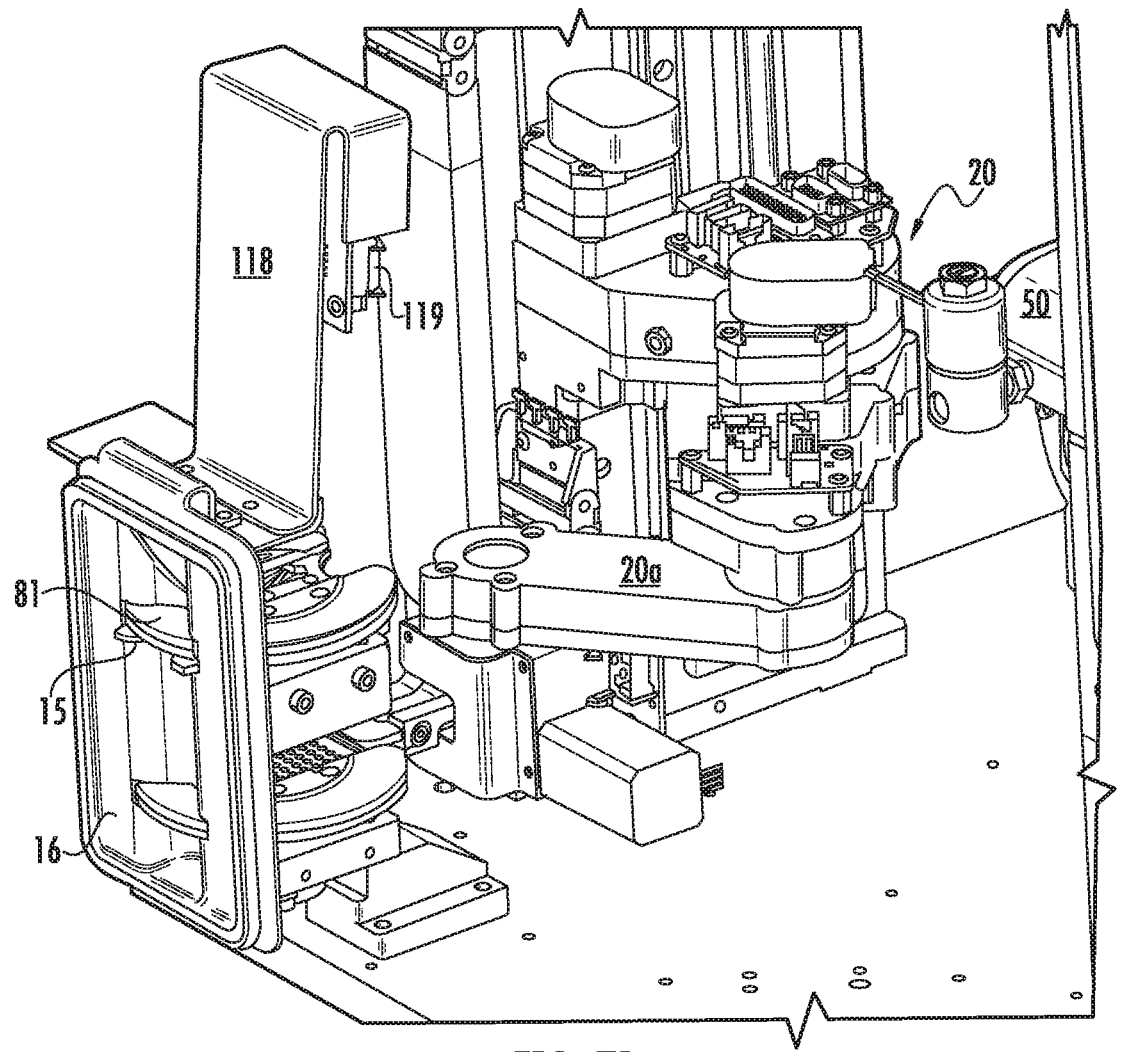
Figure 7C:
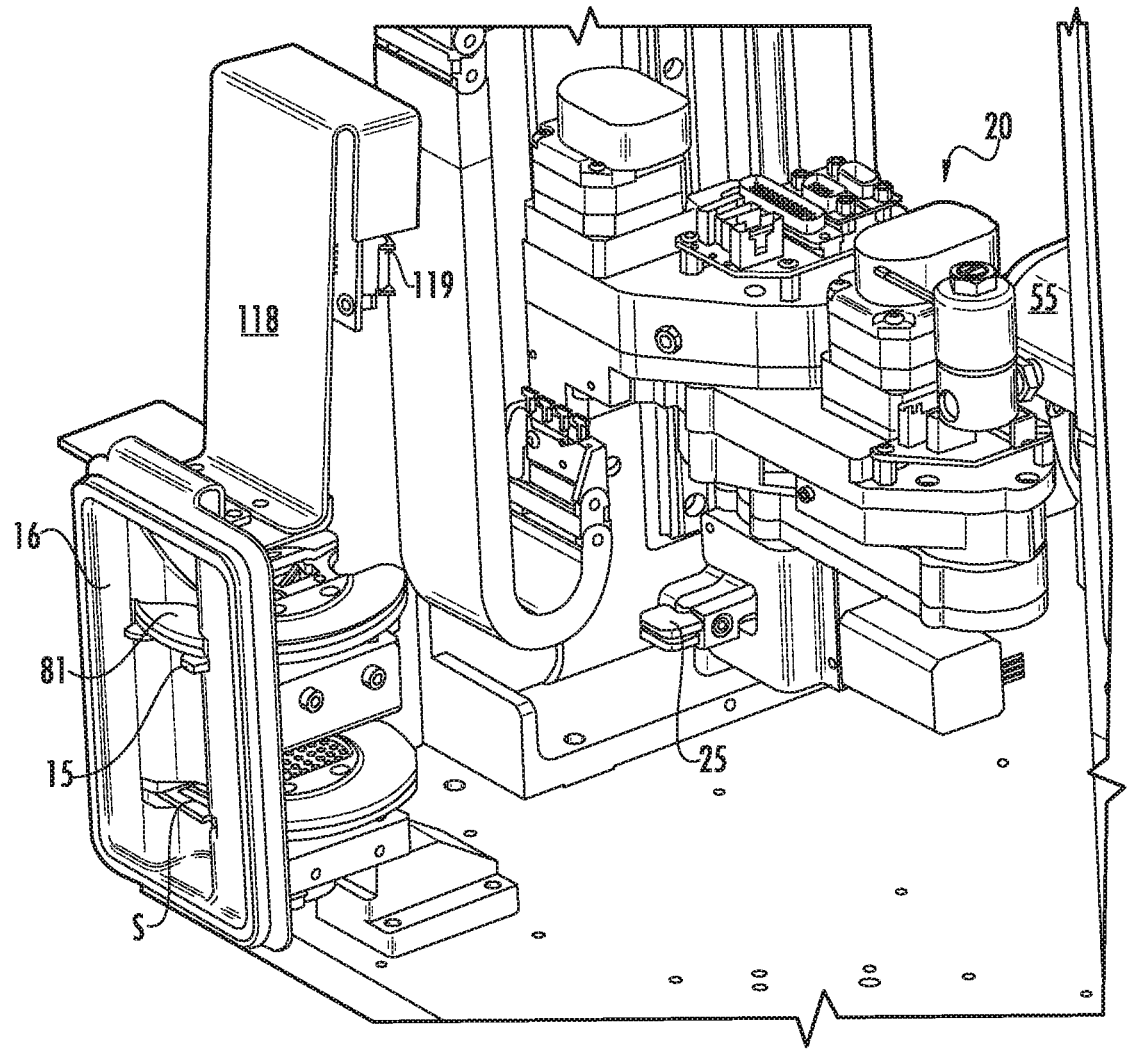
Figure 7D:
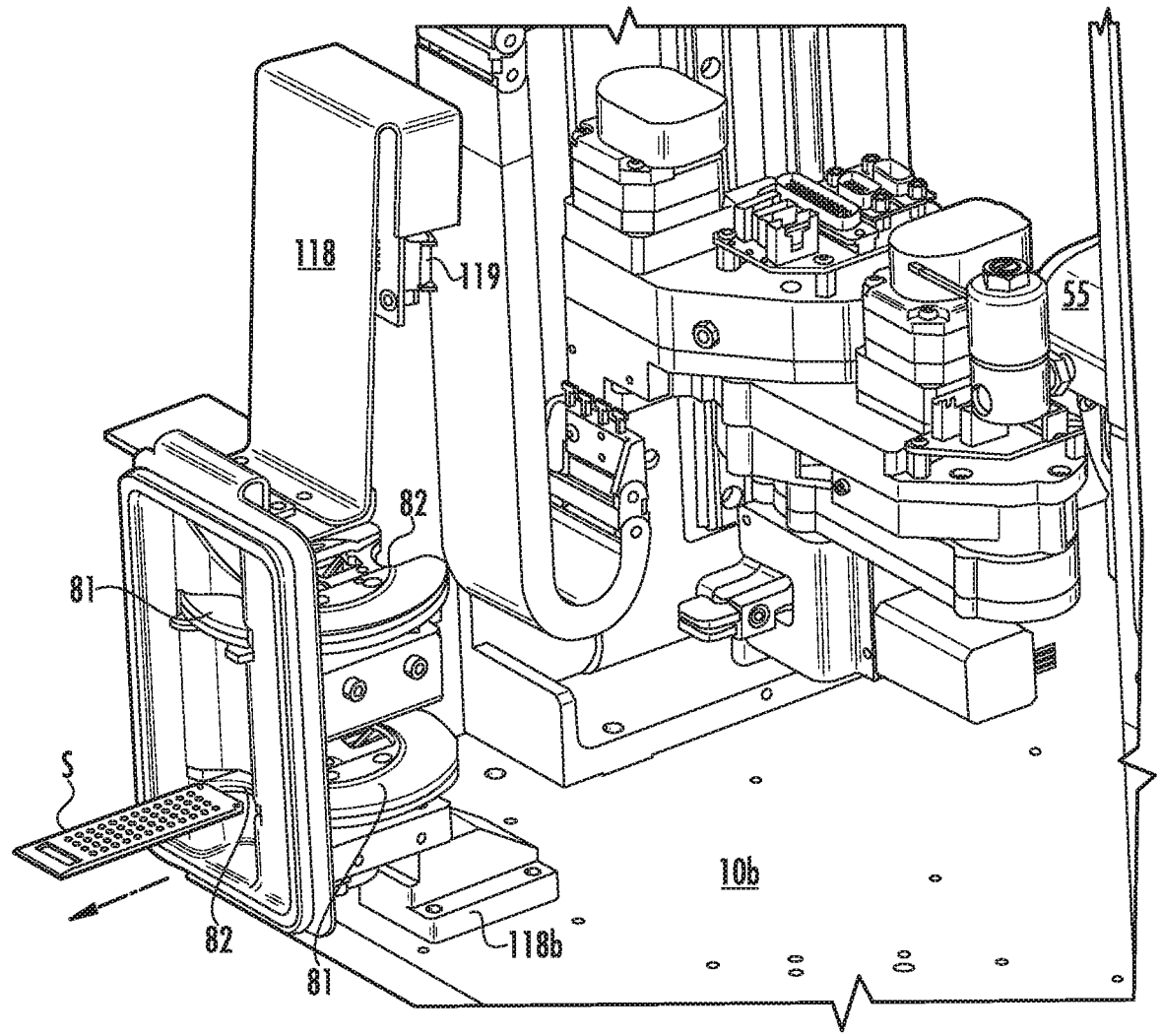

FIGS. 7A-7D illustrate an exemplary removal sequence of a respective slide S, post analysis using the at least one carousel 81 with the slide holding channel 82 of the slide input/output (I/O) interface module 118, and port 15 held by a removable bezel plate 16 on the front of the instrument 10f. The carousel 81 can rotate about 180 degrees from the intake position with the open end of the slide holding channel 82 facing inward shown in FIGS. 7A, 7B to allow the analyzed slide S to exit the instrument (FIGS. 7C, 7D). The robot 20 can move the robot arm 20a independent of the action of the carousel 81.

Figure 8A:
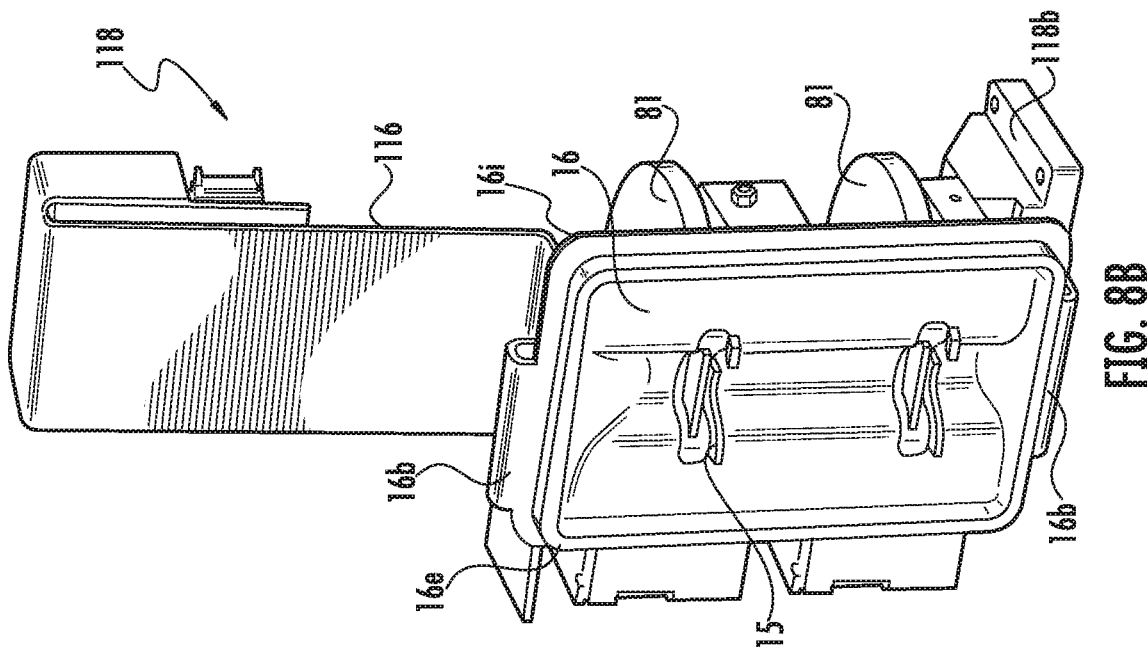
FIG. 8A is an internal side perspective view of a slide interface I/O module (assembly) according to embodiments of the present invention.
Figure 8B:
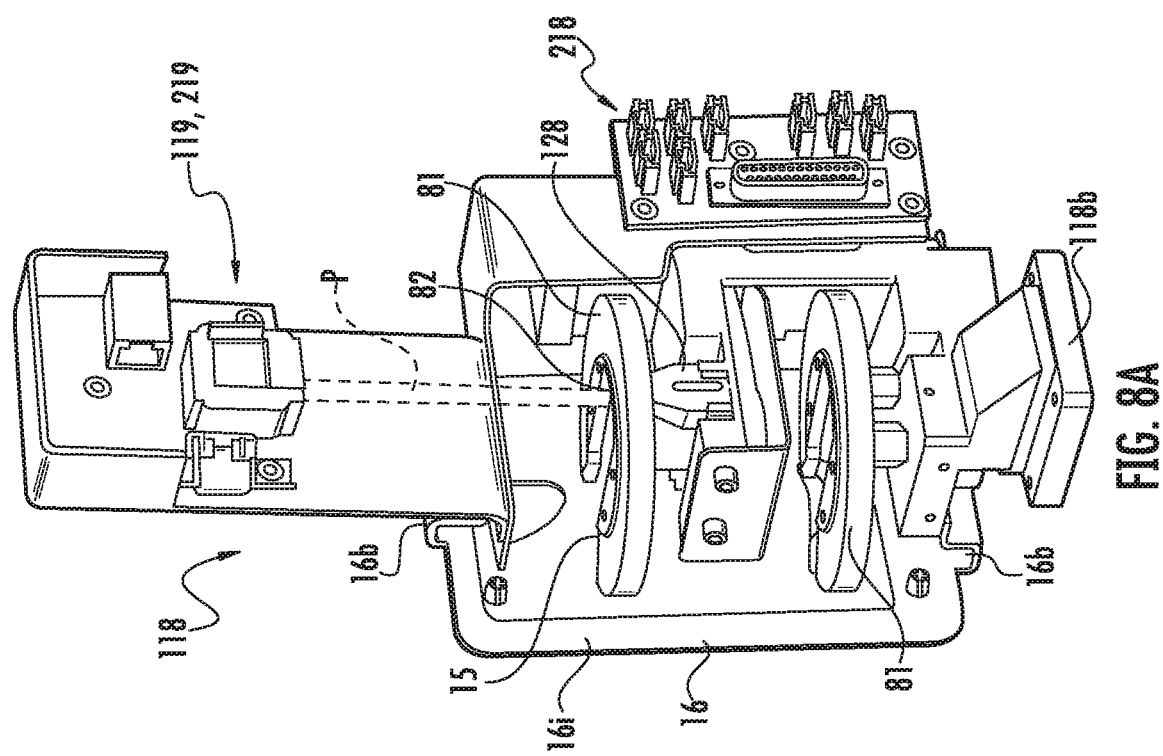
FIG. 8B is an external side perspective view of the slide interface I/O module shown in FIG. 8A.
Figure 9A:
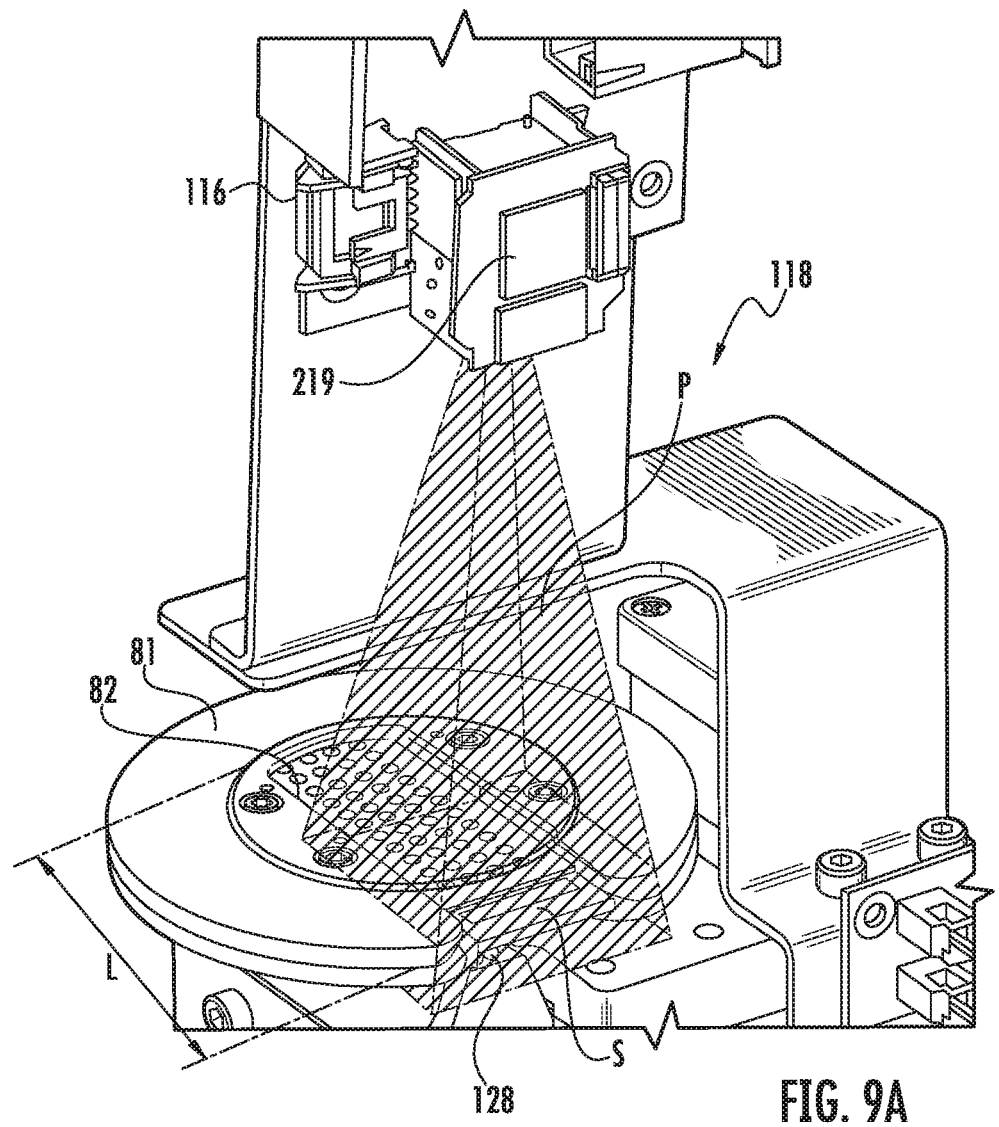
FIG. 9A is an enlarged internal side perspective view of a portion of the slide I/O module shown in FIG. 8A.

FIGS. 8A, 8B and 9A illustrate an example slide input/output (I/O) module 118. FIG. 8A illustrates that the module 118 can include at least one carousel 81, a slide presence sensor 128, a scanner 119, which can be a camera 219, and an interconnect PCB 218. The camera 219 can be held above the at least one carousel 81 and can have a downwardly extending optic path P that can include an internal end portion of the slide holding channel 82 of the carousel 81. FIG. 9A illustrates that the camera 219 can image a major portion of a length and width dimension of a respective slide S with the slide S oriented with the open end facing inward under the camera 219. The field of view of the camera 219 can be sufficient to image both slide-specific data (i.e., bar-code or QR-code) and slide acquisition group data.

Figure 9B:
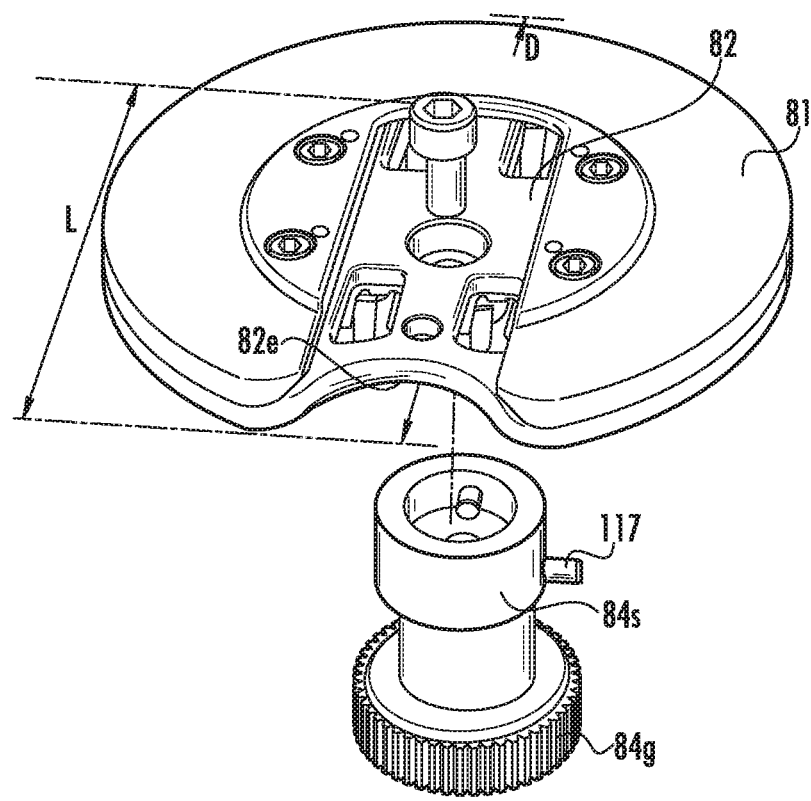
FIG. 9B is a top perspective exploded view of a slide I/O carousel according to embodiments of the present invention.
Figure 9C:
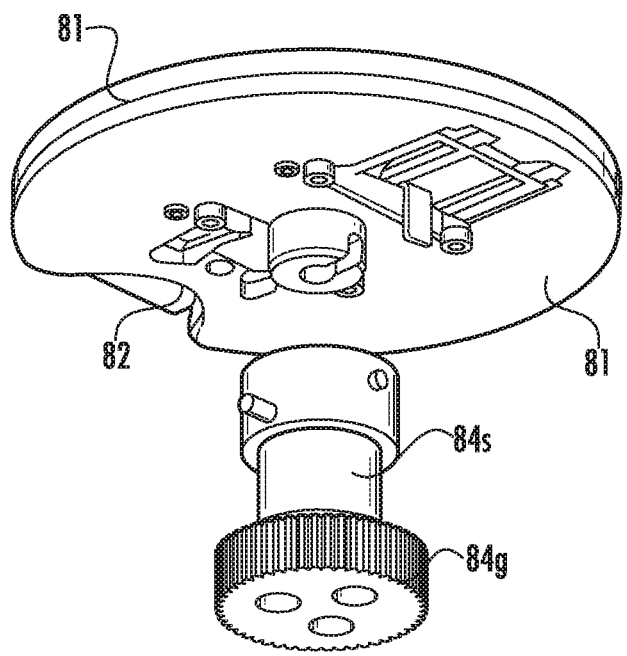
FIG. 9C is a bottom perspective exploded view of the slide I/O carousel shown in FIG. 9B.

FIGS. 9B and 9C are enlarged views of the carousel 81 with the drive shaft 84s and drive gear 84g. As will be discussed below, the shaft 84s can have a hard-stop pin 117. The channel 82 can have a length L that is more than a major portion of the diameter of the carousel 81. The channel 82 can have an open end 82e that slidably receives respective slides S and the open end 82e can have an inwardly extending arcuate shape. The channel 82 can be a single channel that extends from one edge across a center of the carousel to a diametrically opposing side portion, extending over the drive shaft 84s.

Referring to FIGS. 10A, 10B, 11A, and 11B, the I/O module 118 can include at least one drive motor 83 that is attached to a drive belt 84. The drive belt 84 is connected to the gear 84g that is attached to the drive shaft 84s that is attached to the carousel 81. The slide presence sensor 128 can reside under or over (shown as under in FIG. 10A) an inner end portion of the carousel 81. The module 118 can include a home sensor H.

As show in FIGS. 10A and 11B, the carousel drive shaft 84s can include a laterally outwardly extending pin 117 and the carousel drive plate 184 can include upwardly extending pins 113 that cooperate with pin 117 to physically limit the rotational motion of the carousel 81 to be in a range of 180-190 degrees, typically about 188 degrees.

Figure 11A:
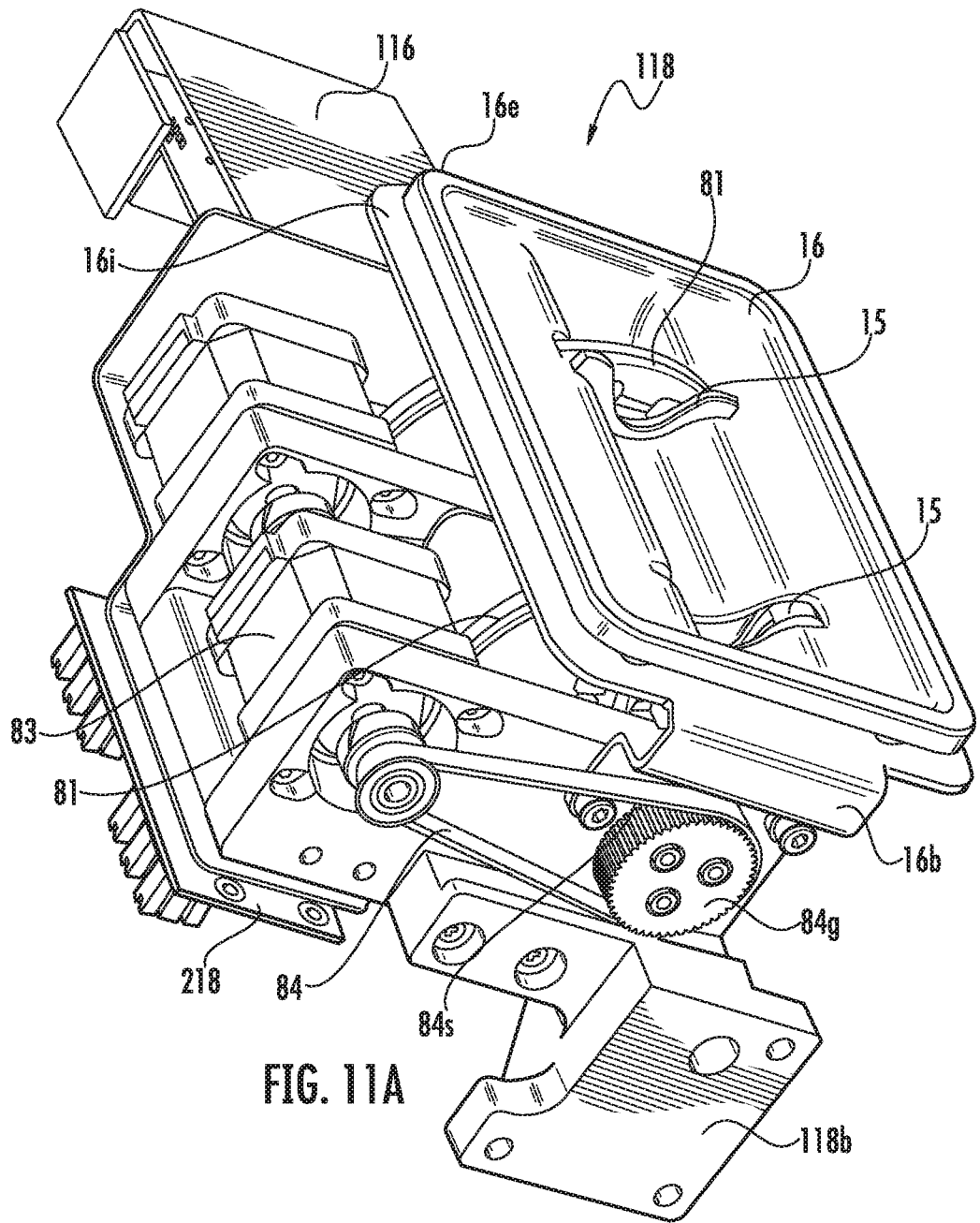
FIG. 11A is a bottom, side perspective view of the module shown in FIG. 8A illustrating a carousel drive assembly according to embodiments of the present invention.

Referring to FIGS. 10B and 11A, the module 118 and/or components thereof can be releasably attached to the housing 10h (FIG. 1B) to allow for ease of maintenance and repair. In operative position as shown in FIGS. 1B and 1C (without the front housing in FIG. 1C), the module 118 can reside at a front corner of the housing 10h with the bezel face plate 16 external to the housing 10h. As shown, the module 118 can include an upper bracket θ attached to the bezel face plate 16 that, in position, is inside the front 10f of the housing 10h.

Figure 11C:
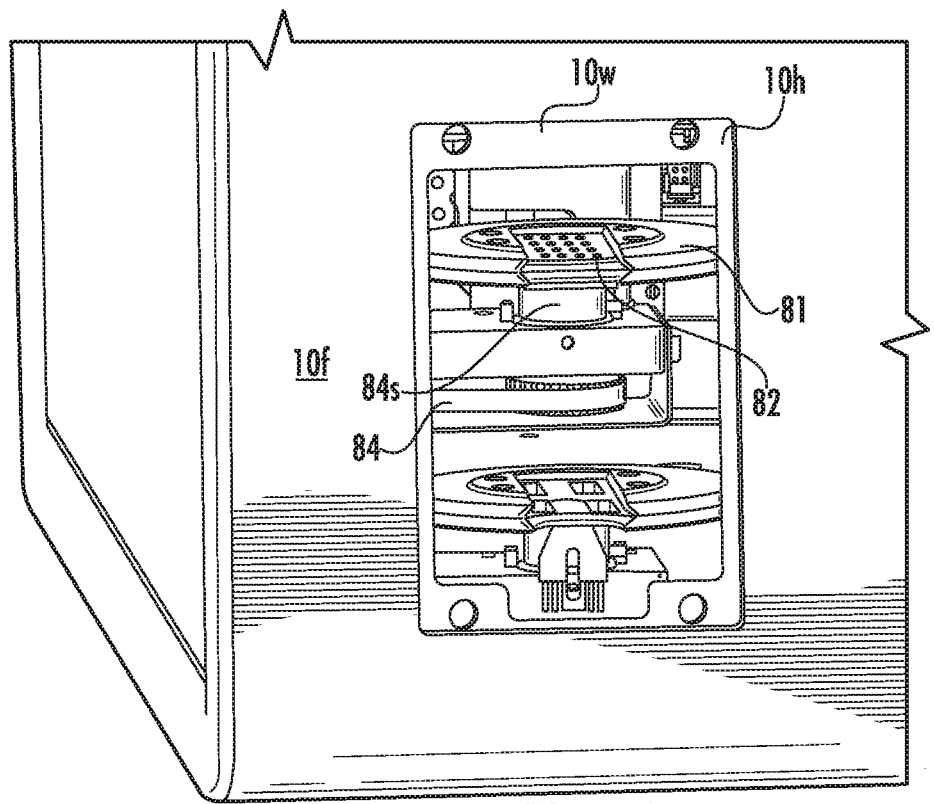
FIG. 11C is a partial front perspective view of an instrument with the slide I/O module shown in FIG. 11A illustrating the removable bezel faceplate removed according to embodiments of the present invention.
Figure 11D:
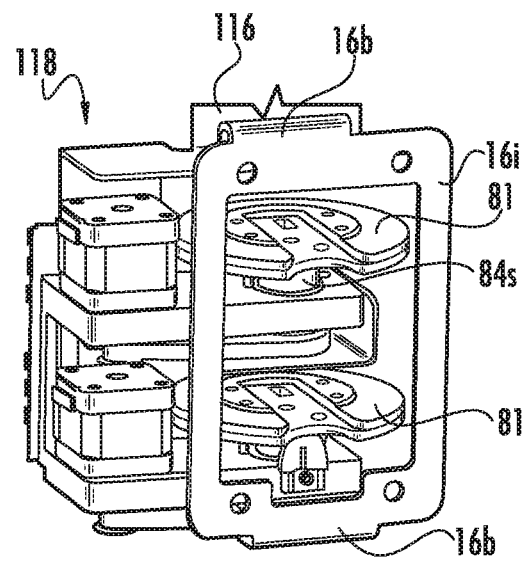
FIG. 11D is a partial front perspective view of the housing of the instrument with the bezel faceplate removed illustrating the removable carousel through the open space of the removed bezel faceplate according to embodiments of the present invention.

Referring to FIGS. 10B and 11D, the bezel face plate 16 can be held by a bracket 16i that is coupled to an upper bracket member or segment 116 that can extend inwardly at an angle from vertical, theta (θ) that is between 5-45 degrees, more typically 10-30 degrees. The upper bracket or segment 116 can have a height sufficient to place the lower end of the camera 219 a distance "d" from the slide channel 82 of the carousel 81 that is between 3-6 inches. This angle and/or distance can help position the scanner 119 and/or camera 219 at a desired position to be able to capture the data from slides at intake, for example. The module 118 can be configured to allow the carousel(s) 81 to be removed for cleaning via a front opening in the housing under the bezel faceplate 16. The bezel face plate 16 can detachably attach to the front 10f of the housing 10h.

As shown in FIGS. 8A, 8B, 10B and 11A, the bezel plate 16 can be an external rectangular bezel face plate 16e with one or more slide ports 15 coupled to the bracket 16i which is shown as an adjacent (internal) rectangular bracket. The bracket 16i can have inwardly extending upper and lower curvilinear bracket segments 16b that reside above and below, respectively, the external bezel plate 16. The bracket segments 16b can attach the bezel plate 16 to the module 118. The base of the module 118b can reside directly or indirectly on the floor 10b of the enclosure (FIGS. 1C, 7D, for example).

FIG. 11C illustrates the housing 10h of the instrument 10 with the bezel face plate 16 removed. The mounting members (i.e., screws) for the carousel 81 can be removed via the open access window 10w once the bezel face plate 16 is removed. The carousel 81 can be lifted off of the shaft/ spindle 84s and the carousel 81 can be turned and removed out the front of the housing 10f for cleaning, refurbishment, repair or replacement.

FIG. 11D illustrates the module 118 without the bezel face plate 16. The internal bracket 16i can have an open medial window 10w which can be a rectangular space/region. The bezel faceplate 16 can have a width between 4-8 inches and a height between 5-10 inches, typically with the height being greater than the width and the open window 10w can be (slightly) smaller in both dimensions. The bezel bracket 16i can reside flush with the front wall of the housing, typically adjacent and inside the instrument with the housing 10h and window 10w between the internal bracket 16i and the bezel face plate 16.

Figure 12:
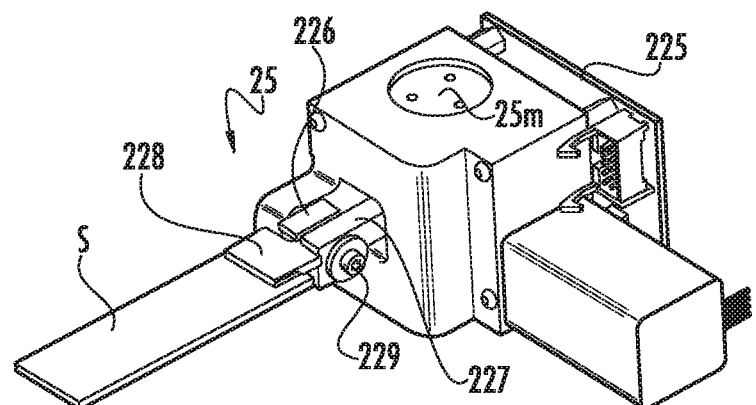
FIG. 12 is a top, side perspective view of an exemplary slide gripper sub-assembly according to embodiments of the present invention.
Figure 13A:
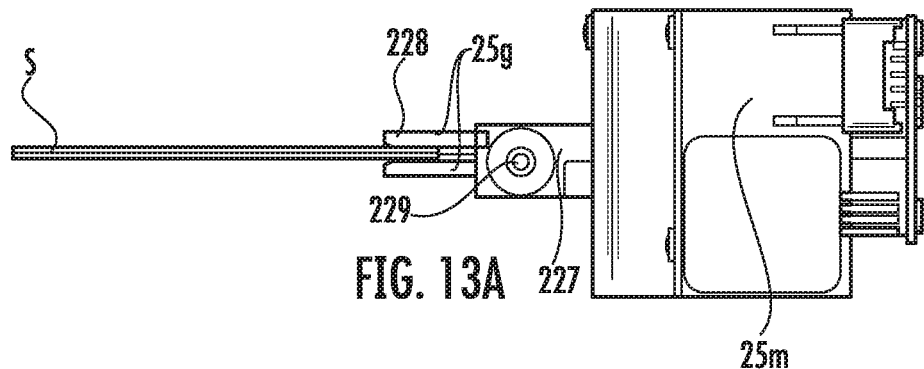
FIG. 13A is a side view of the device shown in FIG. 12.
Figure 13B:
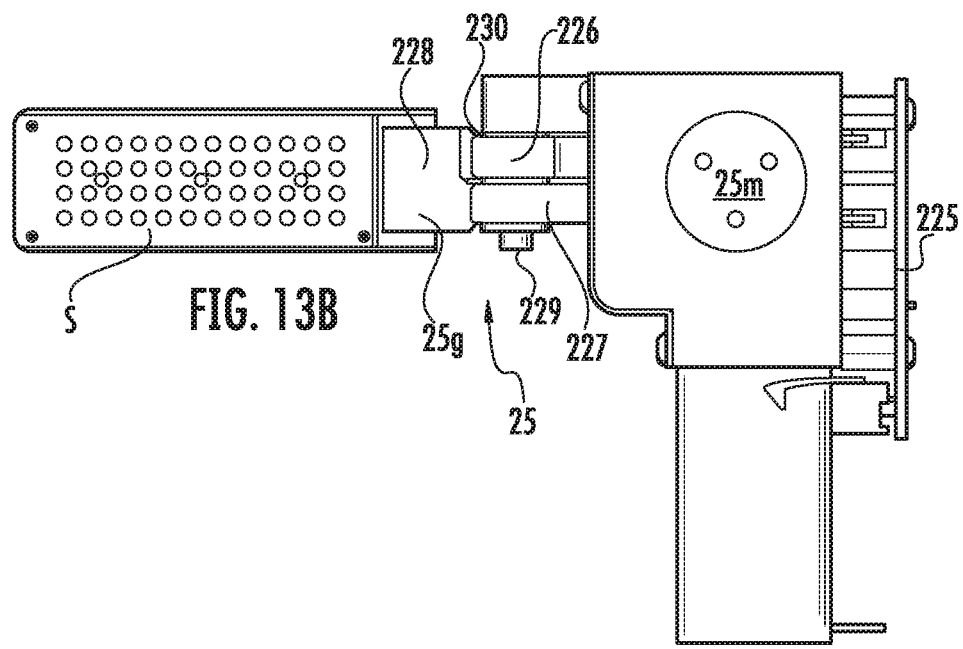
FIG. 13B is a top view of the device shown in FIG. 12.
Figure 13D:
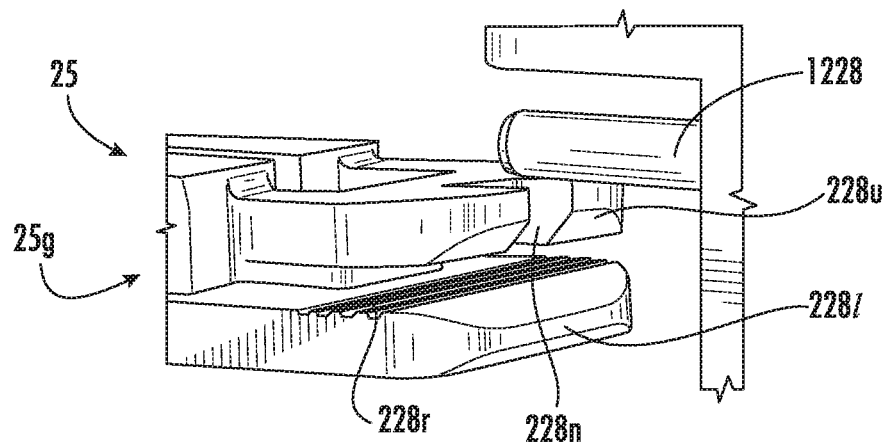
FIG. 13D is a side perspective view of the devices shown in FIG. 13C.

Referring now to FIGS. 12, 13A and 13B, an exemplary slide holder 25 with slide gripper 25g is shown. The gripper 25g can include first and second parallel slide gripper arms 226, 227 that are coupled to a gripper mouth 228 with upper and lower jaws 228u, 228l (FIG. 14B) that can securely grip and release a respective slide S. The gripper arms 226, 227 are coupled to one or more sensors 25s which are typically coupled to the PCB 225 to control the grip and release actions of the gripper 25g. The gripper arms 226, 227 can be held by a laterally extending shaft 229 that allow the gripper arms 226, 227 to pivot to open and close the gripper jaws 228u, 228l. One arm 226 is attached to the lower jaw 228l and the other arm 227 is attached to the upper jaw 228u.

FIGS. 13C-13H illustrate another embodiment of the slide holder 25 with the gripper arms 226, 227 and the gripper mouth 228 with the upper and lower jaws 228u, 228l. The slide holder 25 can cooperate with an alignment member 1228 to define an origin position whereby a known feature located on the robot 20 (shown as the gripper 25g) can be aligned to a known feature located elsewhere. As shown, the upper jaw 228u can include a notch 228n at an outer front facing perimeter edge as the gripper 25 alignment feature. The lower jaw 228l can comprise ridges 228r for a secure grip of a respective slide. The alignment member 1228 can comprise a pin 1228p that can be slidably received in the notch 228n. The alignment member 1228 can reside at a stationary position in the housing 10h (FIG. 1A). An alignment protocol defined by computer code in a processor of a module (100₄, FIG. 2) that is in communication with the robot 20 can direct the robot 20 (FIG. 1C) (to which the gripper 25g is attached) to move until a desired alignment is achieved. Other robot positions may then be determined from this "origin" position. This is an example embodiment for aligning a known feature located on the robot/gripper to a known feature located elsewhere. The alignment method can use this aligned position as a starting point for calculating other positions at which the robot is aligned to other desired features or locations based on known spatial relationships between the "feature located elsewhere" and the "other desired features".

More generally, this alignment system can be described as an alignment scheme comprising a pair of corresponding fiducial alignment features, one having a static position within the range of motion of the robot and the other residing somewhere upon the robot 20, and a multidimensional set of defined relations between the position at which these two features are aligned and a plurality of other important positions of the robot and/or gripper 25g within the system 10.

Figure 19:
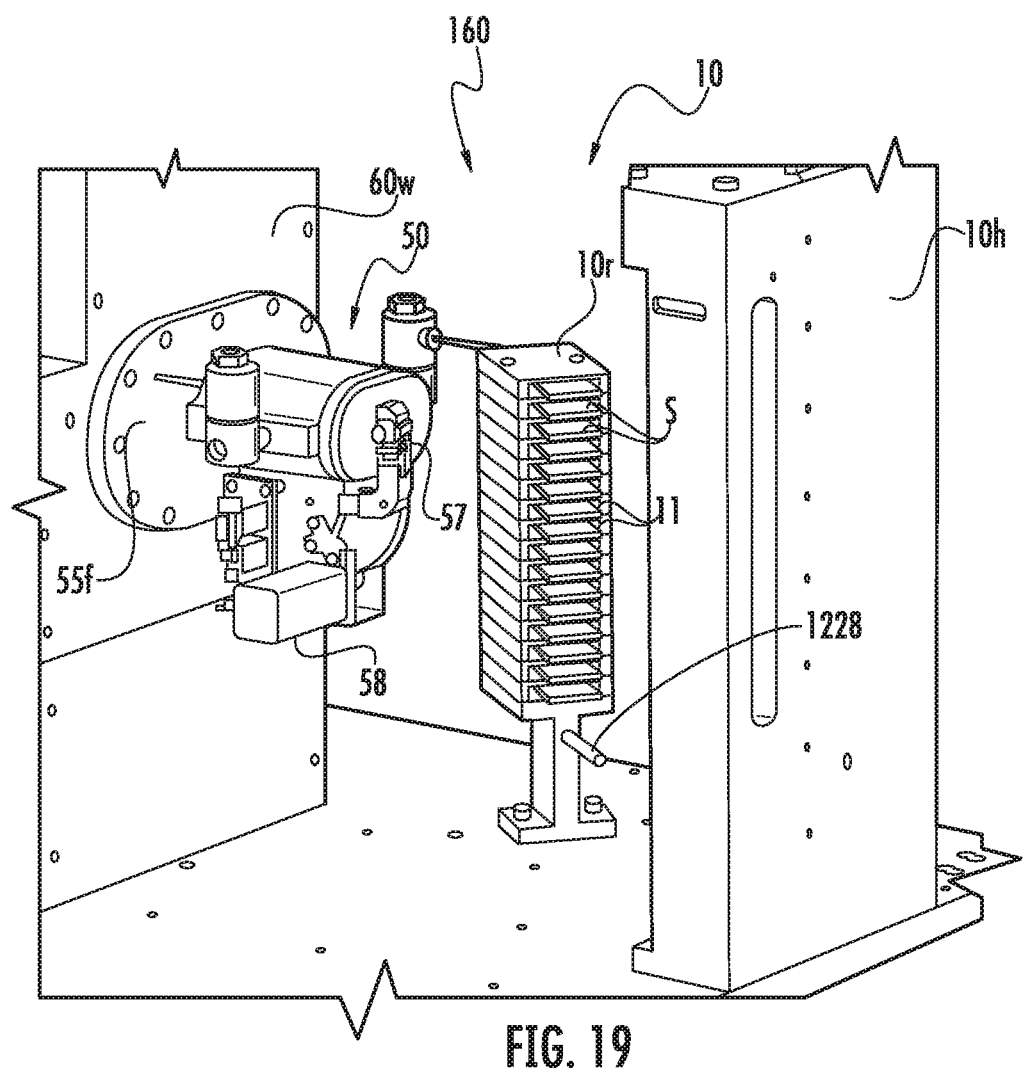
FIG. 19 is a side perspective view of the load lock chamber assembly adjacent a storage rack of slides in an instrument such as a mass spectrometer according to embodiments of the present invention.

The alignment member 1228 can be held at any suitable location inside the housing 10h of the sample analysis system 10 to aid in robot alignment. In some embodiments, the alignment member 1228 can be coupled to the slide storage queue 11 (FIG. 19). This alignment system can facilitate a faster alternative to the tedious and often subjective process of individually "teaching" each operational robot position. The position at which the gripper notch 228n is aligned (in all three axes, X, Y, Z) to the alignment member 1228 (FIG. 13H) can be stored and/or entered into the operational (i.e., service) control circuit of the device 10 as an origin. Then, since the position of the alignment member 1228 relative to the various slide destinations (input/output carousel disk, storage locations, and load lock chamber) are both static and known, all the other robot positions can be derived from that origin position using a defined set or table of nominal offset values.

Figure 13E:
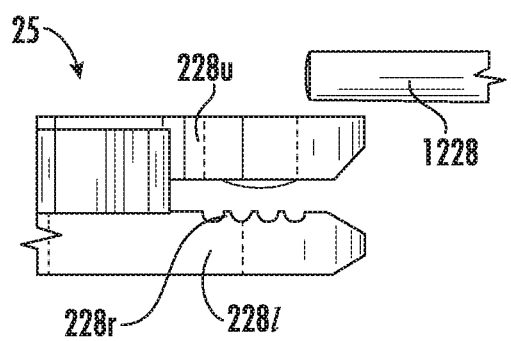
FIG. 13E is an enlarged partial side view of the devices shown in FIG. 13C with the alignment member outside the alignment notch.
Figure 13F:
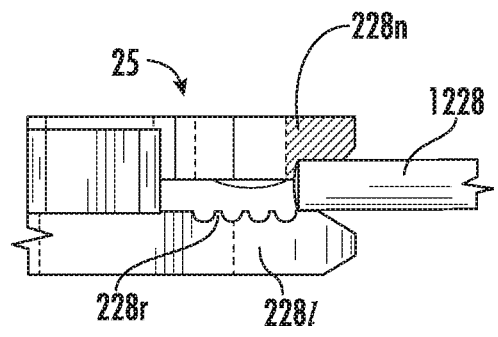
FIG. 13F is an enlarged partial side view of the devices shown in FIG. 13E with the alignment member in the alignment notch according to embodiments of the present invention.
Figure 13G:
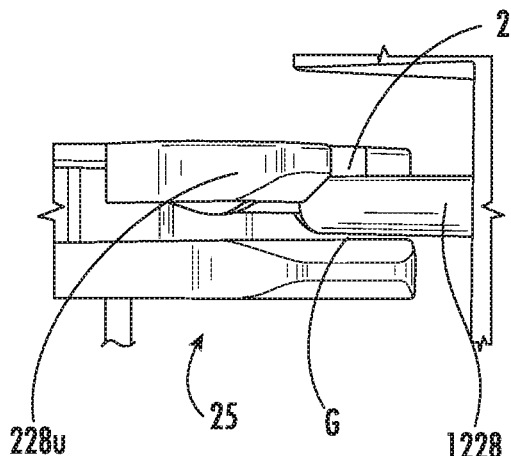
FIG. 13G is a bottom, side perspective view of the devices shown in FIG. 13F but illustrating an undesired gap indicating the gripper is not in the proper origin position.
Figure 13H:
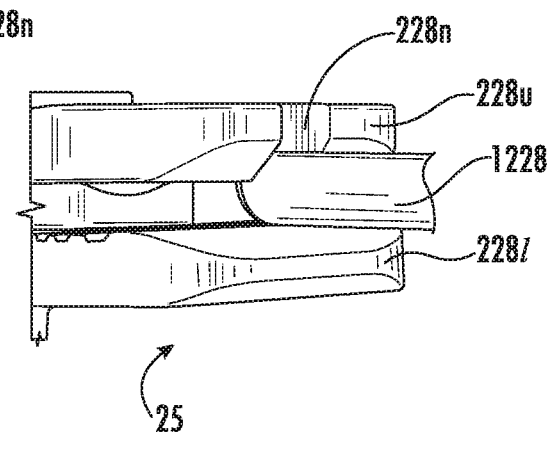
FIG. 13H is a bottom, side perspective view of the devices shown in FIG. 13F illustrating a proper origin position with no gap between the alignment member and lower grip member according to embodiments of the present invention.

FIG. 13E shows the gripper 25g below the statically mounted alignment member 1228. FIG. 13F shows the gripper translated upward with the alignment member 1228 in the notch 228n of the upper jaw member 228u. FIG. 13C shows a top view of the alignment position which can optionally define a gap 228g residing between a front end of the alignment member 1228 and the notch 228 in an origin position. In other embodiments, the front end of the alignment member 1228 can abut the laterally extending perimeter cross wall segment of the notch 228n in the origin position (not shown). FIG. 13G shows an undesired gap "G" under the alignment member 1228 and over the lower jaw 228l, inside the notch 228n, indicating the origin position has not yet been met. FIG. 13H shows the alignment member 1228 in the notch 228n and abutting an upper surface of the lower jaw 228l indicating a proper origin position for defining a location in the housing 10h in X, Y and Z coordinates. The notch 228n can be configured to snugly slidably receive the alignment member 1228 with a width of the notch 228n corresponding to a width of the alignment member 1228 plus a nominal distance, such as +0.005 inches or less.

FIG. 14A illustrates that the PCB 225 can include a control circuit 225c with a signal processor that receives input from the three sensors 25s, shown as inputs S1, S2, S3, to control the grip and release actions of the gripper 25g.

The sensors 25s can include a home sensor $25s_1$ (sensor 1), a slide presence sensor $25s_2$ (sensor 2), and a slide gripped sensor $25s_3$ (sensor 3). Each sensor 25s can be an electro-optical proximity sensor. However, other sensor types may be used. The gripper 25g can be configured to retain a fully gripped state, even upon loss of power. The grip force of the gripper jaws 228u, 228l, when closed against a slide S, can be between 0.25-10 pounds which can be adjusted or selected based on load springs and the like. The interconnect PCB 225 can include a Z e-chain input, a grip motor 25m and sensors $25s_1$, $25s_2$, $25s_3$. The slide gripped sensor $25s_3$ (sensor 3) can be coupled to the arm 226 attached to the lower jaw 228l. The home sensor $25s_1$ (sensor 1) and the slide presence sensor $25s_2$ (sensor 2) can be coupled to the other arm 227 and upper jaw 228u.

FIGS. 14A and 14B illustrate a first configuration of the sensor gripper 25g with the jaws 228u, 228l of the gripper open and home sensor 1 ($25s_1$)-closed, grip sensor-2 ($25s_2$) open and slide presence sensor-3 ($25s_3$) open. Motor power can be used to overcome the grip spring force until sensor 1 ($25s_1$) is closed and sensor 2 ($25s_2$) is checked for open. The arm 226 can be held at a slight angle upward with a low spring force. Sensor 3 can always be open without a slide (the end of the arm 226 adjacent the sensor $25s_3$ does not activate that sensor).

FIGS. 15A and 15B illustrate a second configuration of the sensor gripper 25g with the jaws 228u, 228l of the gripper closed against a slide S and home sensor 1 ($25s_1$)- open, grip sensor-2 (25$s_2$) closed and slide presence sensor-3 (25$s_3$) closed. The gripper motor 25m can be used to close the gripper arm 227 until sensor 2 (25$s_2$) is triggered closed (the adjacent end of this arm next to the sensor rises relative to the position in FIG. 14A). Home sensor, sensor 1, 25$s_1$, is then checked for open (end of arm away from jaw 228 rises relative to position in FIG. 14A), motor 25m can then power to a lower current and can, optionally, rely on a spring force to hold the slide S. The arm 226 can be compressed to a horizontal orientation which triggers the grip sensor 2 (25$s_2$) closed.

Figure 16A:
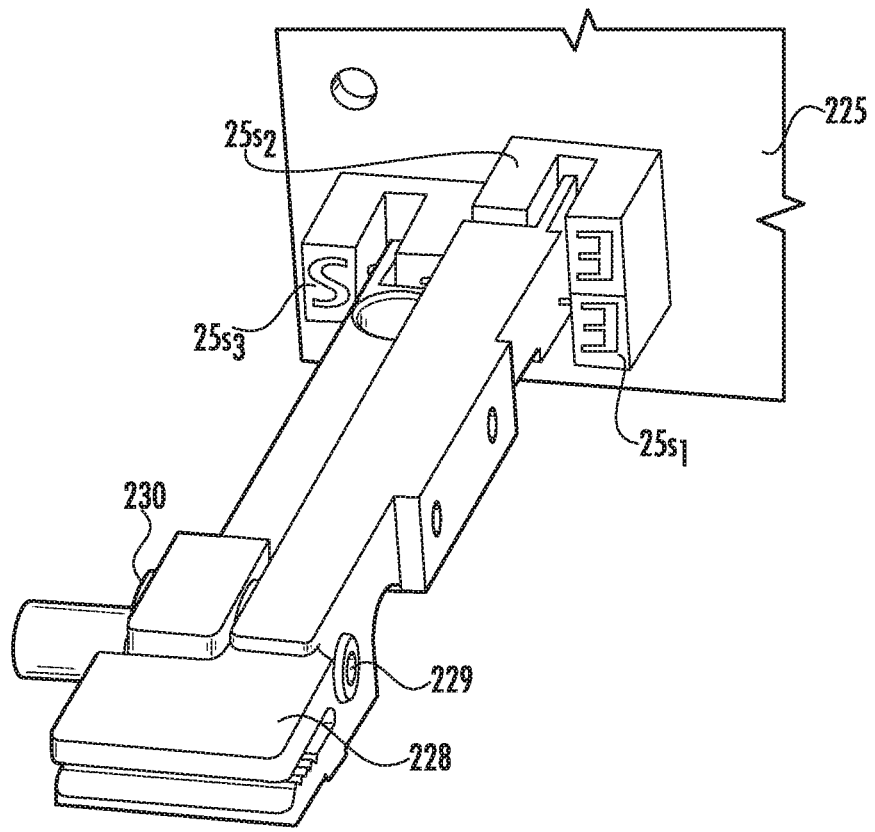
FIG. 16A is a side perspective view of components of the device shown in FIG. 12 with a third sensor status mode according to embodiments of the present invention.
Figure 16B:
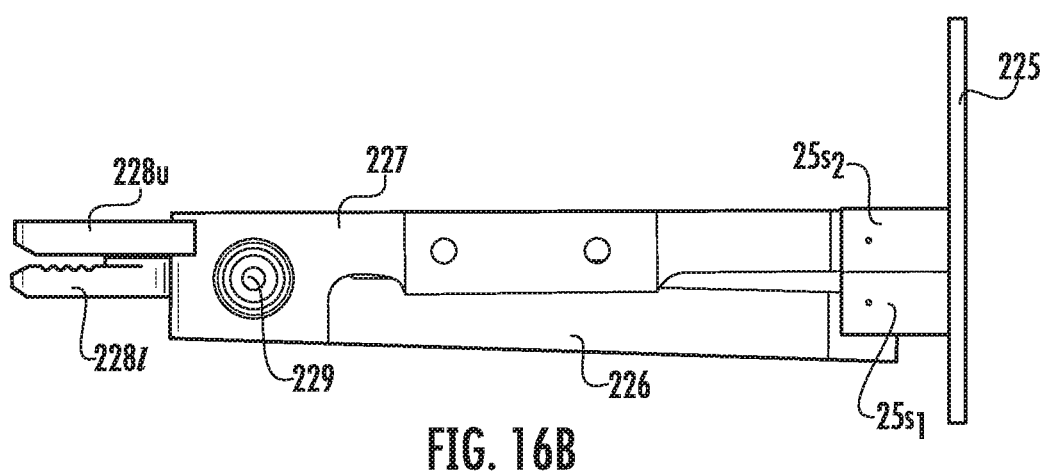
FIG. 16B is a side view of the components shown in FIG. 16A illustrating the associated gripper configuration.

FIGS. 16A and 16B illustrate a third configuration of the sensor gripper 25g with the jaws 228u, 228l of the gripper closed but no slide S is present with home sensor 1 (25$s_1$)-open, grip sensor-2 (25$s_2$) closed and slide presence sensor-3 (25$s_3$) open. When the jaws 228u, 228l are closed without a slide S therebetween, the arm 226 is not displaced and does not trigger sensor 3 which remains open.

As shown in FIGS. 13B, 14A, 15A and 16A, the (lower) arm 226 can also be pivotably attached to the second (upper) arm 227 with a bushing 230 that is concentric to the shaft 229. When a slide S is present, the jaw 228l can pivot the arm 226 relative to shaft 230 down to the horizontal position, raising the inner end of the arm adjacent the grip sensor 25$s_3$ to trigger the grip sensor 3-closed (FIG. 15A).

Figure 18A:
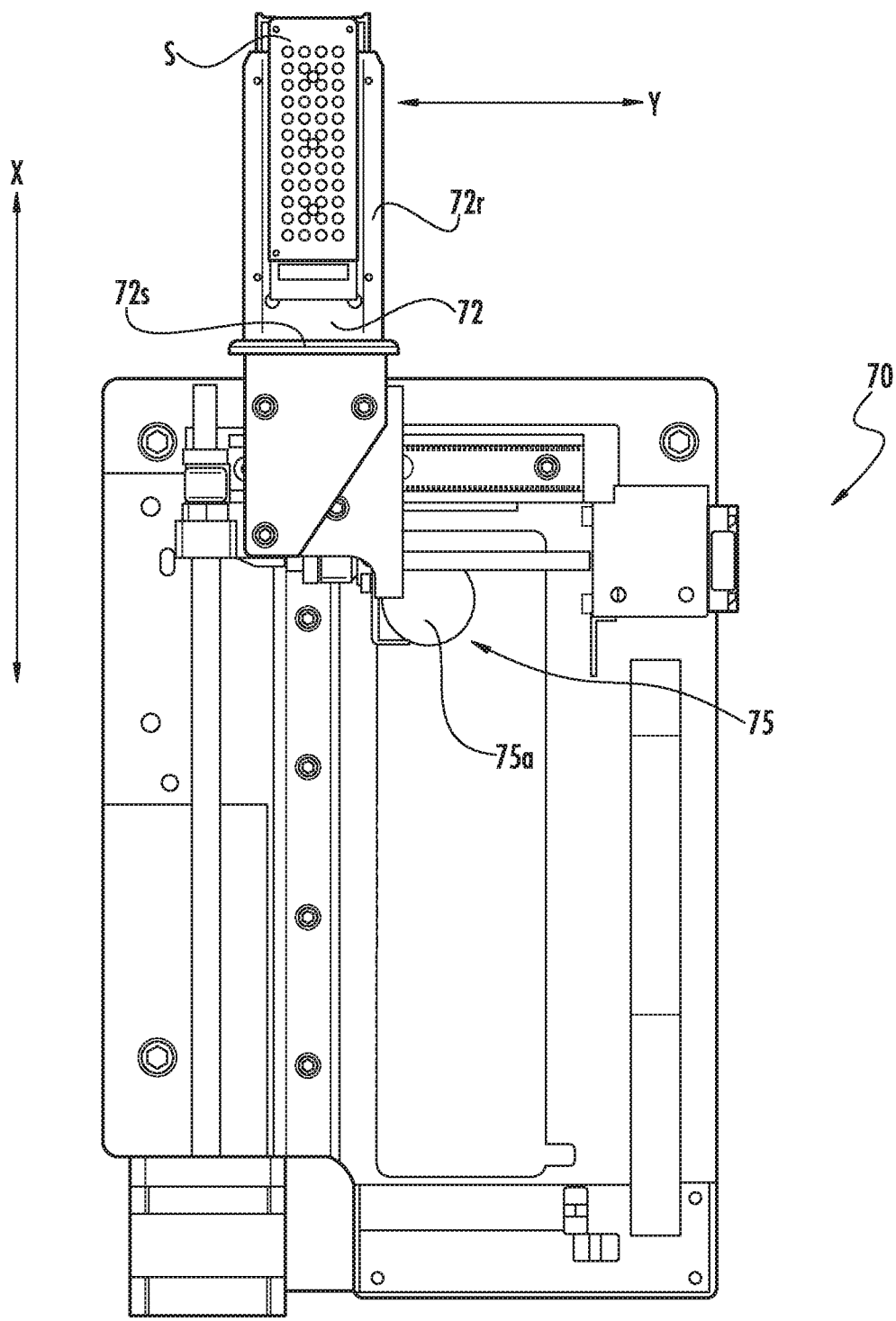
FIG. 18A is a top view of an X-Y stage according to embodiments of the present invention.
Figure 18B:
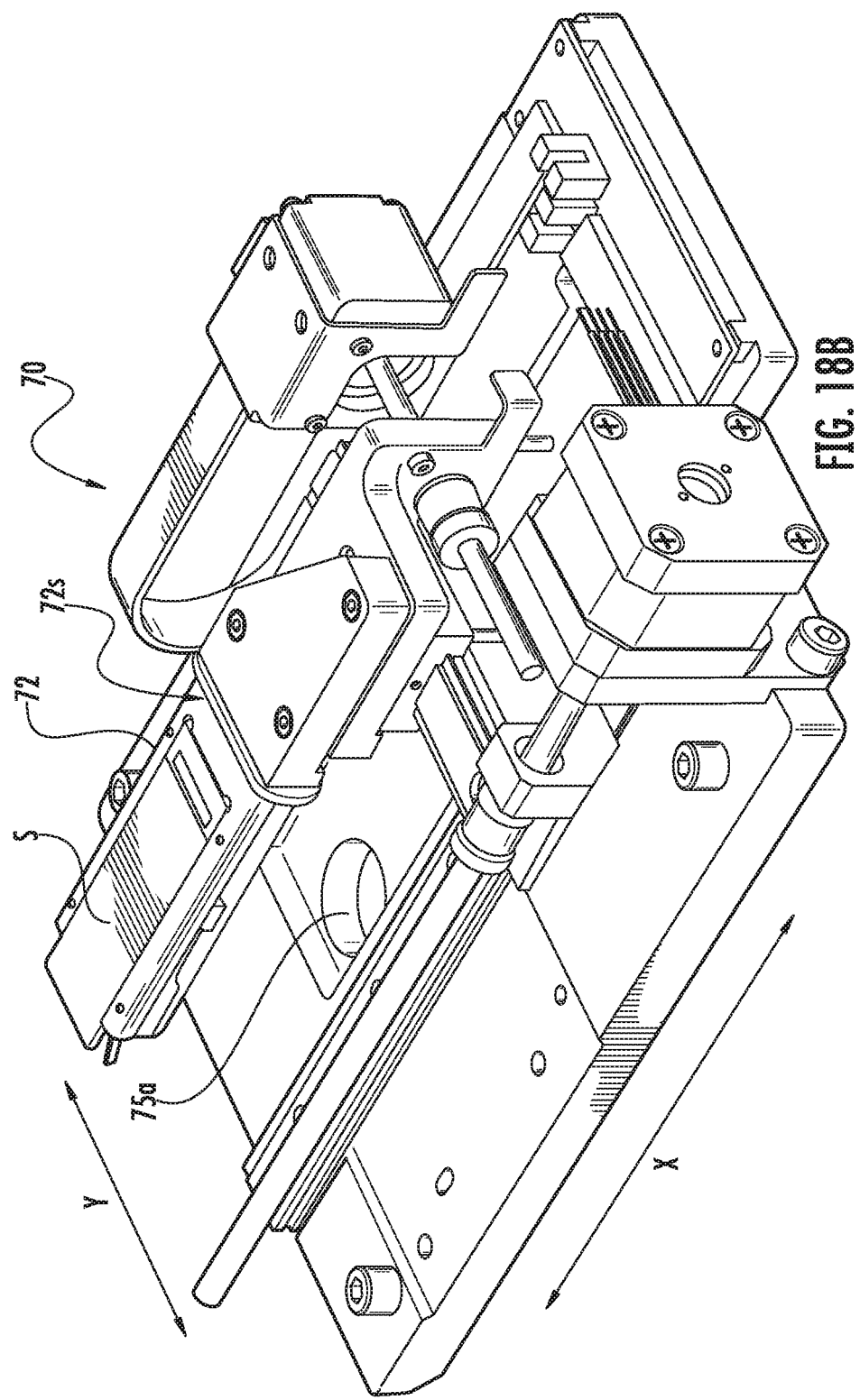
FIG. 18B is aside perspective view of the X-Y stage shown in FIG. 18A.
Figure 18C:
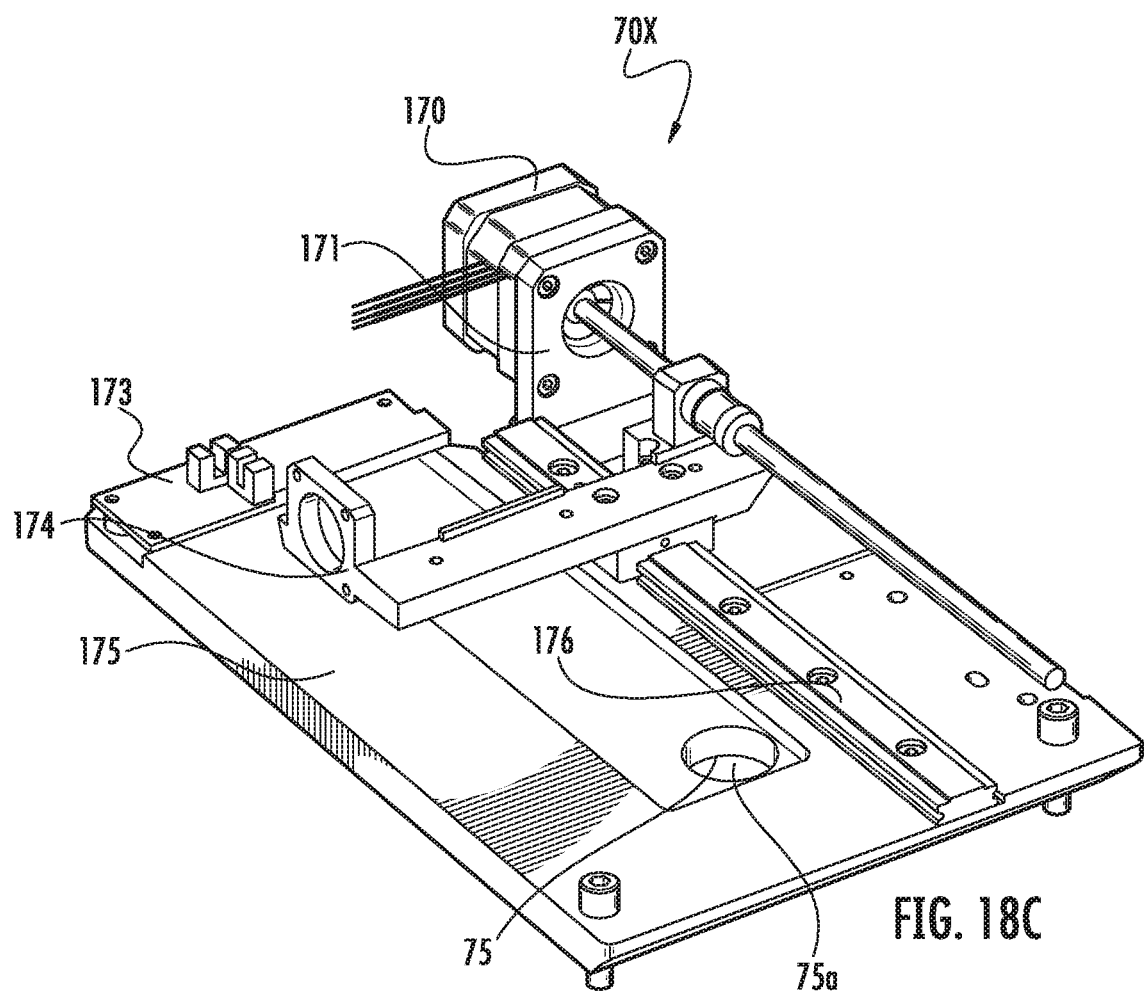
FIG. 18C is a top perspective view of the X-axis components of the X-Y stage shown in FIG. 18A according to embodiments of the present invention.

Referring now to FIGS. 18A-18C, exemplary X-Y stages and components thereof are shown. FIG. 18A illustrates the X-Y stage 70 at a load/lock/seal configuration with the slide holder 72 extended in the X-direction and moved laterally in the Y-direction relative to an aperture 75a associated with the scanning center location 75. FIG. 18B illustrates the slide holder 72 retracted in the X-direction and moved laterally closer to the aperture 75a of the scanning center 75 relative to the position shown in FIG. 18A. The (vacuum/load lock chamber) sealing surface 72s (also interchangeably described as a seal interface) can extend laterally about an entire perimeter of the slide holder 72 and can have radially extending opposing arcuate ends that are spaced apart in a lateral dimension. This full radius sealing surface 72s can reduce pressure needed to seal by eliminating sharp corner bulges in rectangular shaped sealing perimeters. The sealing surface 72s can reside longitudinally spaced apart a distance of between about 0.1 inches and about 1 inch from a recess region 72r of the slide holder 72 that holds an end of a respective slide S.

FIG. 18C illustrates exemplary X-stage components 70X of the X-Y stage 70. As shown, these include an X-stage (x-axis) stepper motor leadscrew drive 170, a motor mount 171, an X/Y sensor and interconnect PCB 173, an X-stage carriage 174, a baseplate 175, and an X-stage bearing and block 176.

Figure 18D:
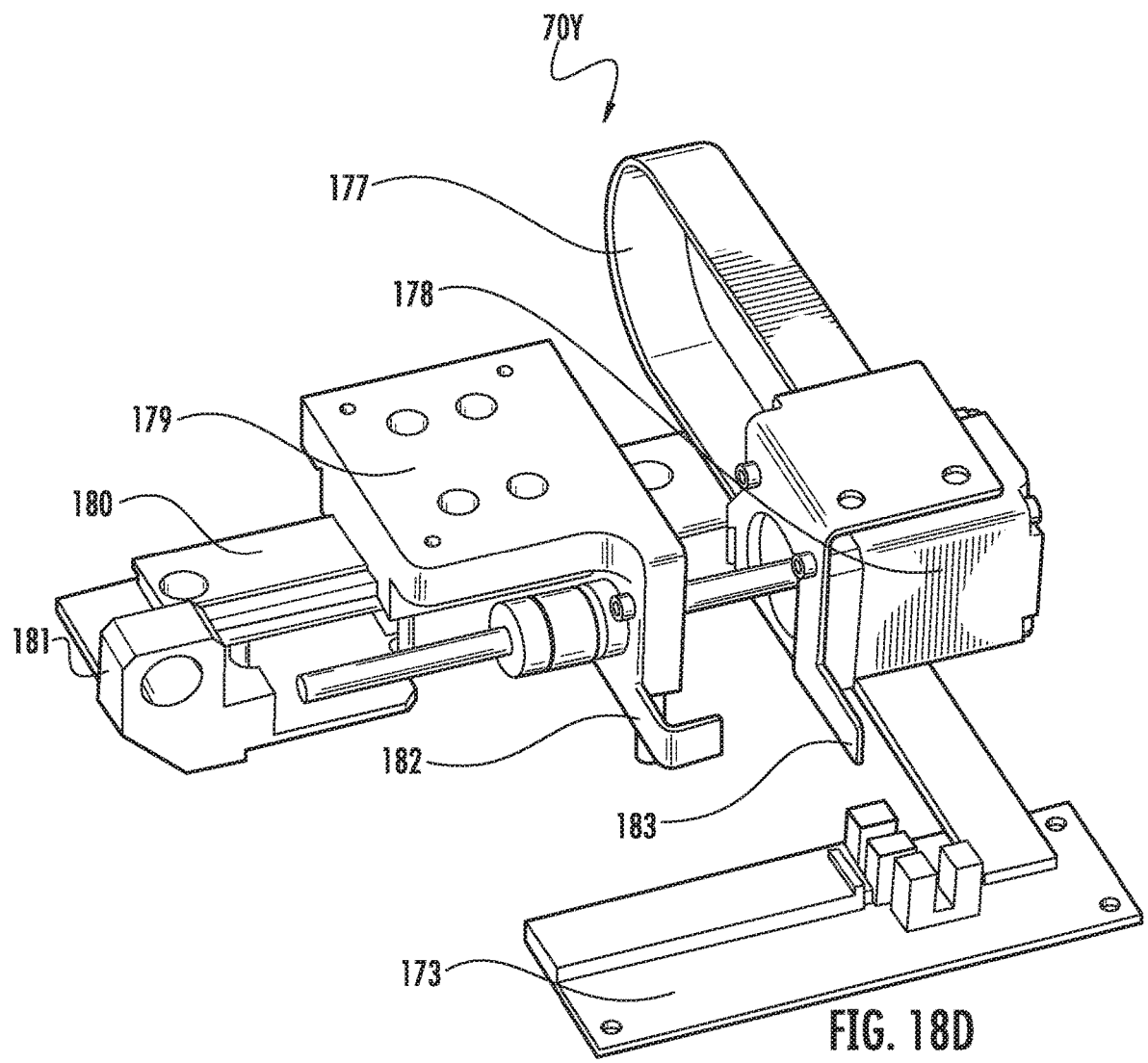
FIG. 18D is a side perspective view of the Y-axis components of the X-Y stage shown in FIG. 18A according to embodiments of the present invention.

FIG. 18D illustrates exemplary Y-stage components 70Y of the X-Y stage 70. As shown, these include a y-stage (y-axis) motor and ground flex cable 177, a y stepper motor leadscrew drive 178, a y-stage carriage 179, a y-stage bearing and block 180, an X-stage carriage member (with integrated Y motor mount) 181, a Y home flag 182, an X home flag 183 and the sensor and interconnect PCB 173.

FIG. 19 illustrates that the mass spectrometer system 10 can include an internal storage rack 10r that is inside the housing 10h (optionally adjacent the door 57) in an open internal space 160 for holding slides S before and/or after analysis. The storage rack 10r can provide a vertical column of compartments 11 for holding respective slides S. However, the storage rack 10r can be provided in any suitable configuration and is not required to have a vertical column of compartments and may be provided as a plurality of racks.

Figure 20A:
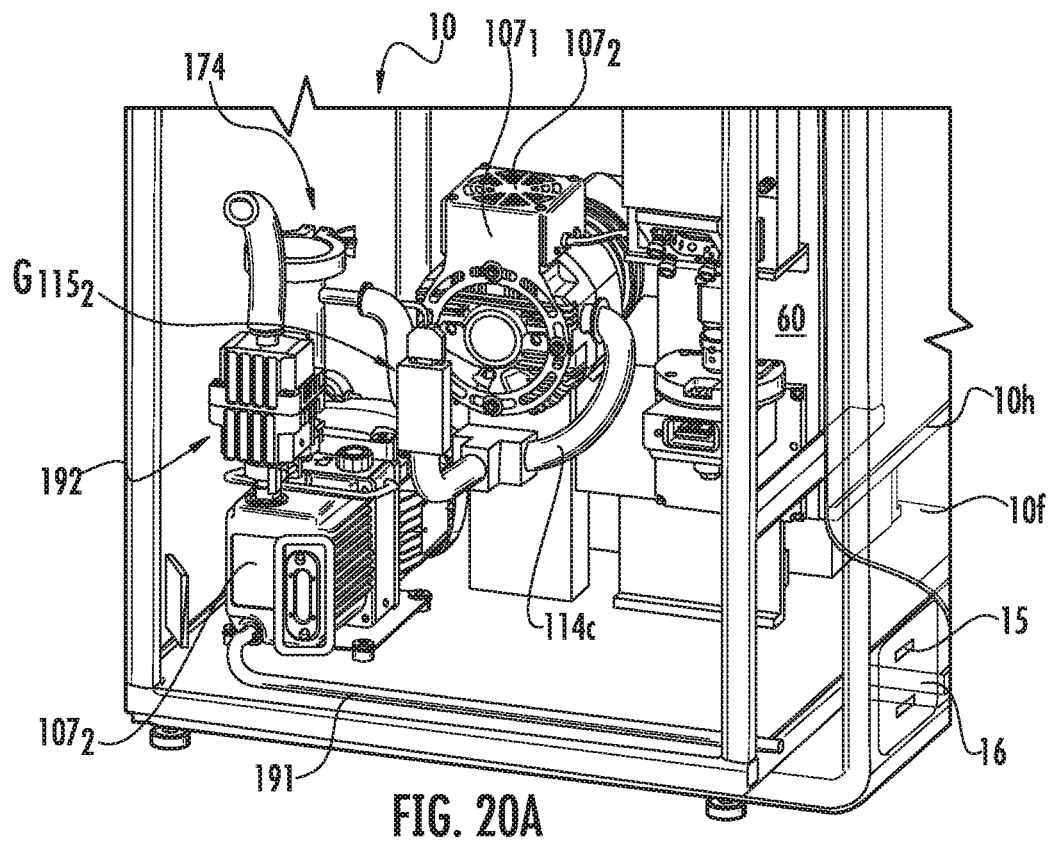
FIGS. 20A and 20B are side, perspective and partially transparent views of the instrument illustrating exemplary vacuum systems for the vacuum chamber and/or load lock chamber according to embodiments of the present invention.
Figure 20B:
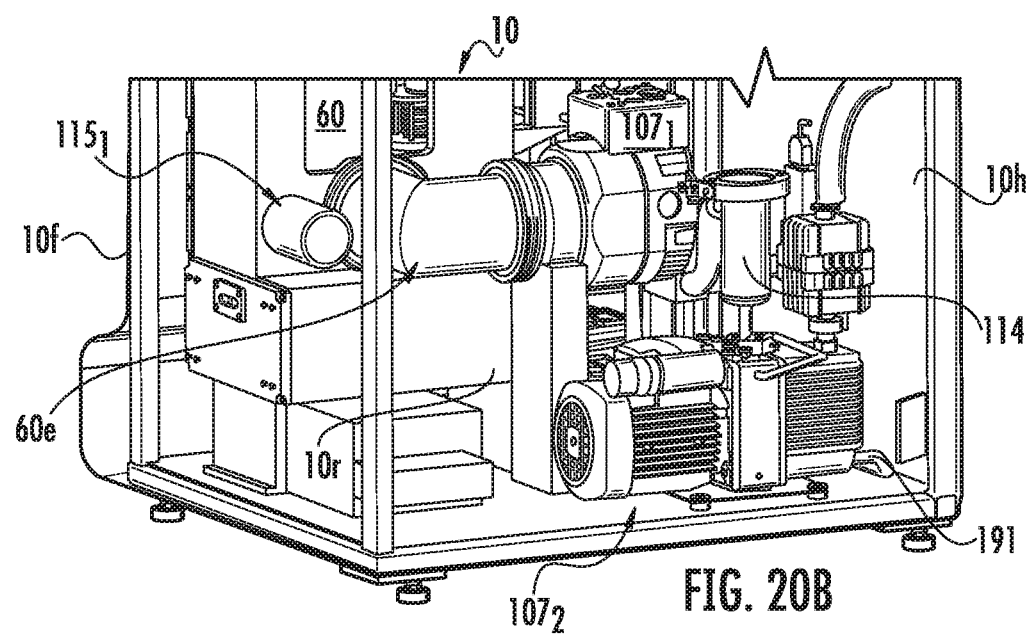

FIGS. 20A and 20B illustrate exemplary vacuum system configurations (shown without the plumbing to the load lock chamber 55). As shown, a roughing pump 107$_2$ in direct fluid communication with the load lock chamber 55 can be provided under a turbomolecular vacuum pump 107$_1$ which is in direct fluid communication with the acquisition vacuum chamber 60. The turbo pump 107$_1$ can be connected to the vacuum chamber 60 via an elbow 60e and may reside adjacent a back of the enclosure 10h (closer to the back 10r than the front 10h). The turbo pump 107$_1$ can be above the roughing pump 107$_2$ and placed so that there is an open air flow space above a top surface 107t thereof to have a clear air flow path thereacross. The turbo pump 107$_1$ can reside adjacent the high pressure acquisition-chamber vacuum gauge G/1151 (FIG. 20B). The enclosure 10h can include an oil drain line 191 leading from the roughing pump 107$_2$ to the front of the housing 10f. The system 10 can include a Foreline trap 114 between the roughing vacuum pump 1072 and the turbo vacuum pump 1071 and can also include an oil mist filter 192. A foreline gauge 115$_2$ (FIG. 20A) can be in fluid communication with the foreline conduit 114c.

Figure 21:
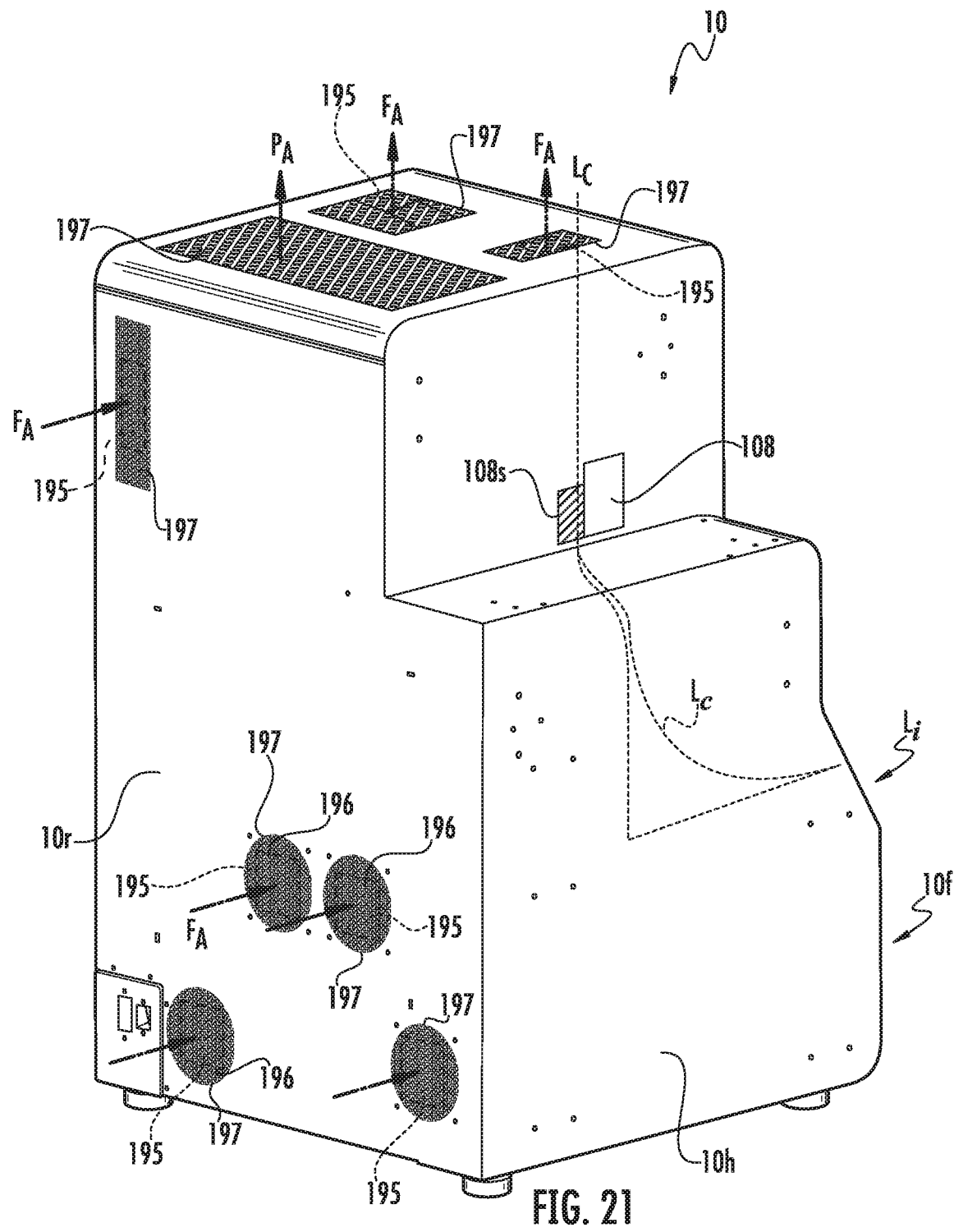
FIG. 21 is a rear, top perspective view of an instrument with a positive pressure configuration for controlling air flow according to embodiments of the present invention.

FIG. 21 is a rear side perspective view of the instrument 10 configured to provide a positive pressure interior (excluding the vacuum chamber 60 and load lock chamber 55 when under vacuum) relative to the external environment with an example air intake and outlet flow paths which can include forced or active fan-driven air flow paths $F_A$ (solid darker arrows) and passive air flow paths $P_A$ (lighter, broken line arrows). The rear 10r of the housing 10h can include a plurality of spaced apart air intake vents 197 under which are fans 195 with filters 196 which intake air based on the fans 195 (indicated by arrows $F_A$ pointing into the housing 10h). The top of the housing 10t can include vents 197 which output air as indicated by the arrows pointing out. The top 10t can include both passive airflow vent(s) and active or fan-driven airflow vents 197 which are in fluid communication with internal fans 195 that force air out. The outward flow fans may or may not also include filters. The vents 197 and fans 195 cooperate to provide a positive pressure inside the housing 10h.

Thus, for example, behind each of the four circular vent patterns 197 on the back can be a respective fan 195 (with a filter 196) pulling air in and behind the smaller square vent patterns 197 on the top 10t can be two or three fans 195 that draw/push air up and out. The intake fans on the back 10r can have a higher fan speed and/or a larger size than the outlet fans on the top 10t of the enclosure 10h. One of the vents 197 on the top 10t, shown as the vent 197 to the right side (viewed from the rear of the housing) can be an outlet of a cooling path Lc of a laser heat sink 108h coupled to the laser 108 with an inlet Li of the laser heat sink cooling path Lc at the front of the instrument 10f. The larger vent (rectangular) pattern on the top 10t can optionally be oversized relative to the fan-driven outlet vents 197.

Figure 22:
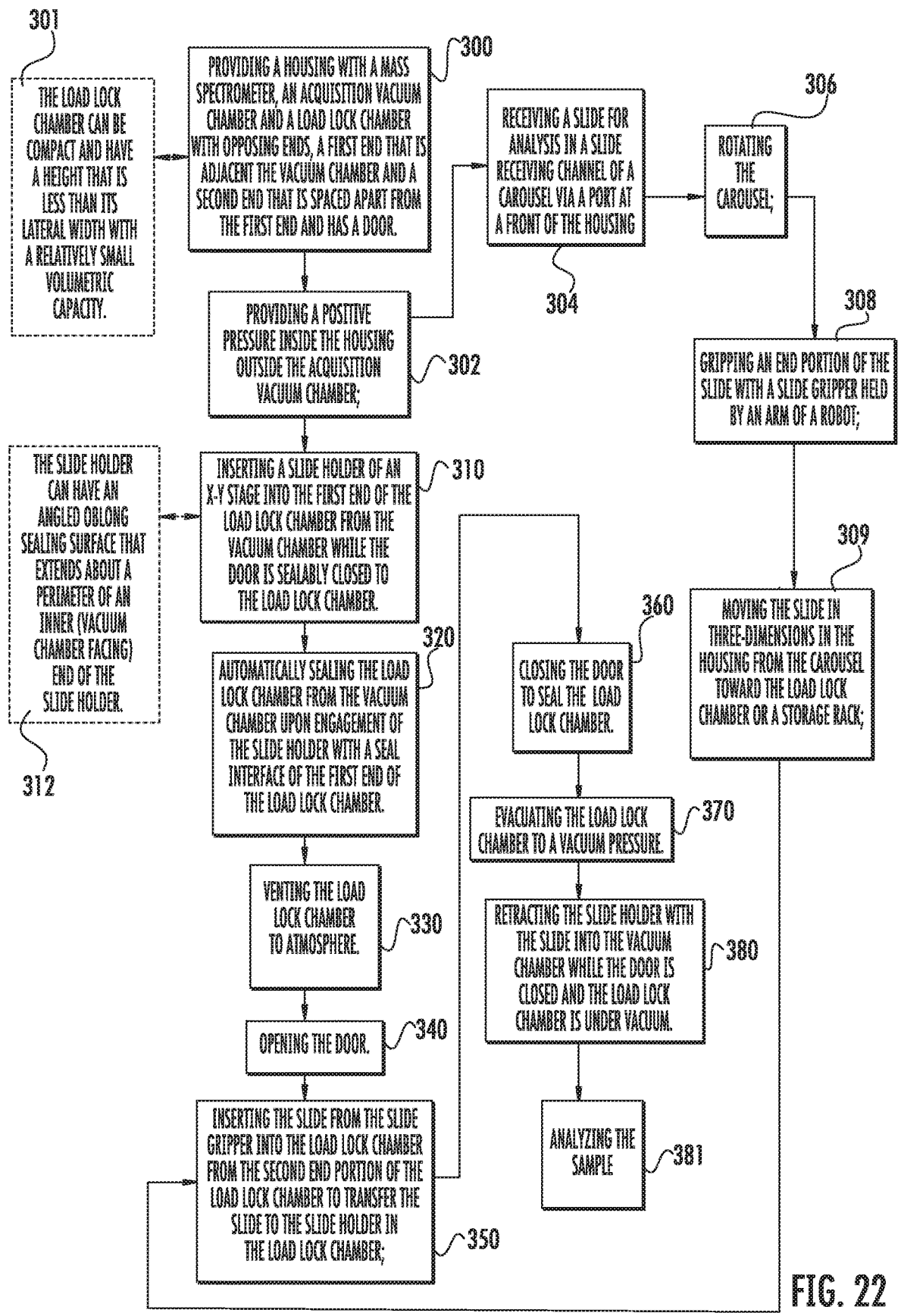
FIG. 22 is a flow chart of a method of handling a sample for analysis according to embodiments of the present invention.

FIG. 22 is a flow chart of exemplary actions for handling samples for analysis in a mass spectrometer. As shown, a housing with a mass spectrometer, a load lock chamber with opposing first and second end portions, and an acquisition vacuum chamber is provided. The first end portion of the load lock chamber is in or adjacent the acquisition vacuum chamber and the second end portion is spaced apart from the first end portion and has a sealably attachable door (block 300). A positive pressure inside the housing outside the acquisition vacuum chamber is provided/generated (block 302). A slide for analysis is received in a slide receiving channel of a carousel via a port at a front of the housing (block 304). The carousel is rotated (block 306). An end portion of the slide is gripped with a slide gripper held by an arm of a robot (block 308). The slide is movable in three-dimensions in the housing from the carousel toward the load lock chamber or a storage rack (block 309).

A slide holder of an X-Y stage is inserted into the first end of the load lock chamber from the vacuum chamber while the door is sealably closed to the load lock chamber (block 310). The load lock chamber is automatically sealed from the vacuum chamber upon engagement of the slide holder with a seal interface of the first end portion of the load lock chamber (block 320) The load lock chamber is then vented to atmosphere (block 330). The door is opened (block 340). A slide is inserted from the second end portion of the load lock chamber to engage the slide holder in the load lock chamber (block 350). The door is closed to seal the load lock chamber (block 360). The load lock chamber is evacuated to a vacuum pressure (block 370). The slide holder with the slide is retracted into the vacuum chamber while the door is closed and the load lock chamber is under vacuum (block 380). The sample is then analyzed in the vacuum chamber by the mass spectrometer (block 381).

The load lock chamber can be compact and have a height that is less than its lateral width with a small volumetric capacity that can be between about 1 cc to about 200 cc (empty), more typically between about 1 cc to about 100 cc, such as about 10 cc, about 15 cc, about 20 cc, about 25 cc, about 30 cc, about 35 cc, about 40 cc, about 45 cc, about 50 cc, about 55 cc, about 60 cc, about 65 cc, about 70 cc, about 75 cc, about 80 cc, about 85 cc, about 90 cc, about 95 cc and about 100 cc and the through channel can have an oblong perimeter shape (in a lateral dimension) (block 301).

The slide holder can have an angled oblong sealing surface that extends about a perimeter of an inner (vacuum chamber facing) end of the slide holder (block 312).

Figure 23A:
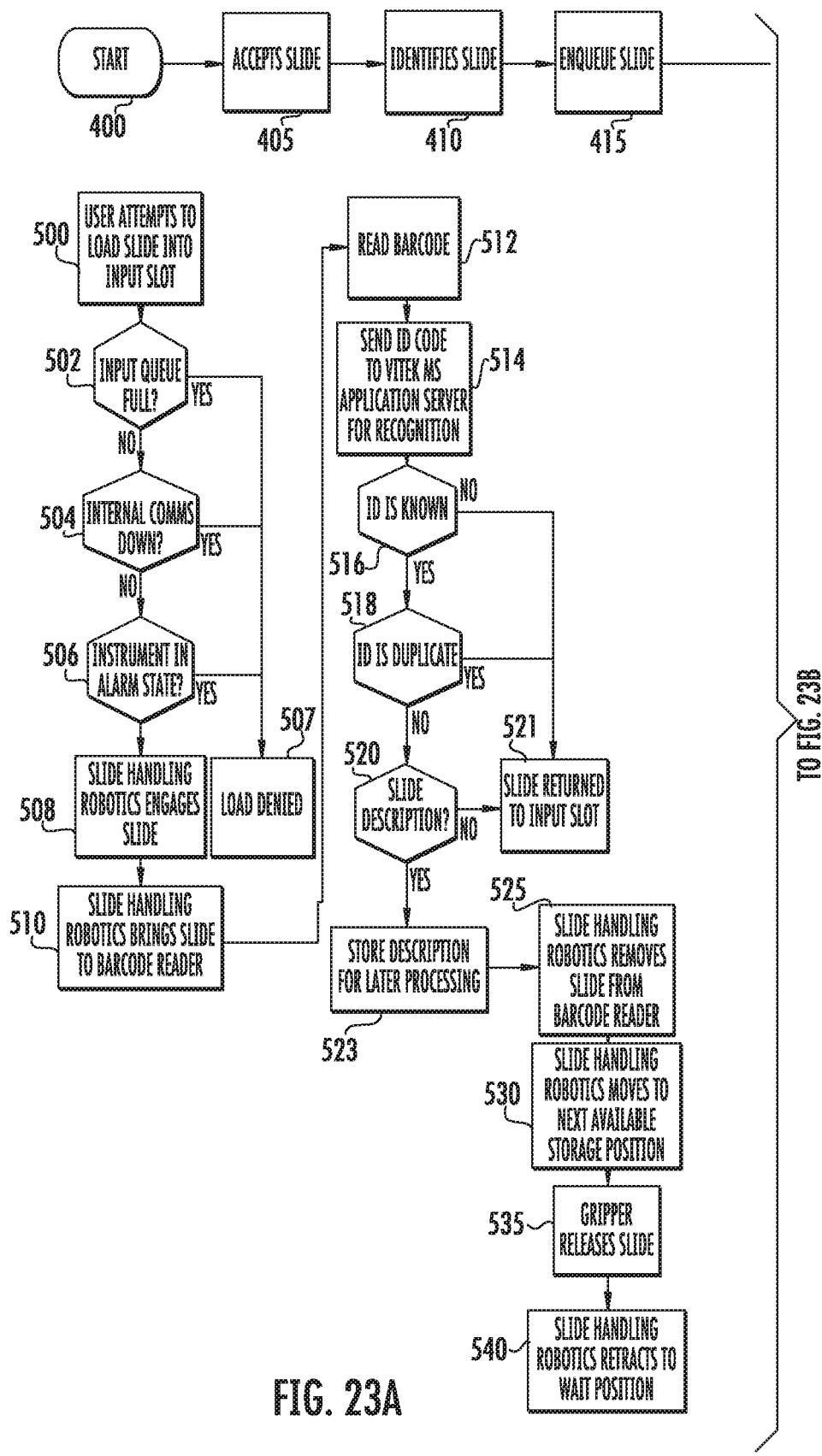
FIGS. 23A and 23B are flow charts of a method of handling a sample for analysis according to embodiments of the present invention.
Figure 23B:
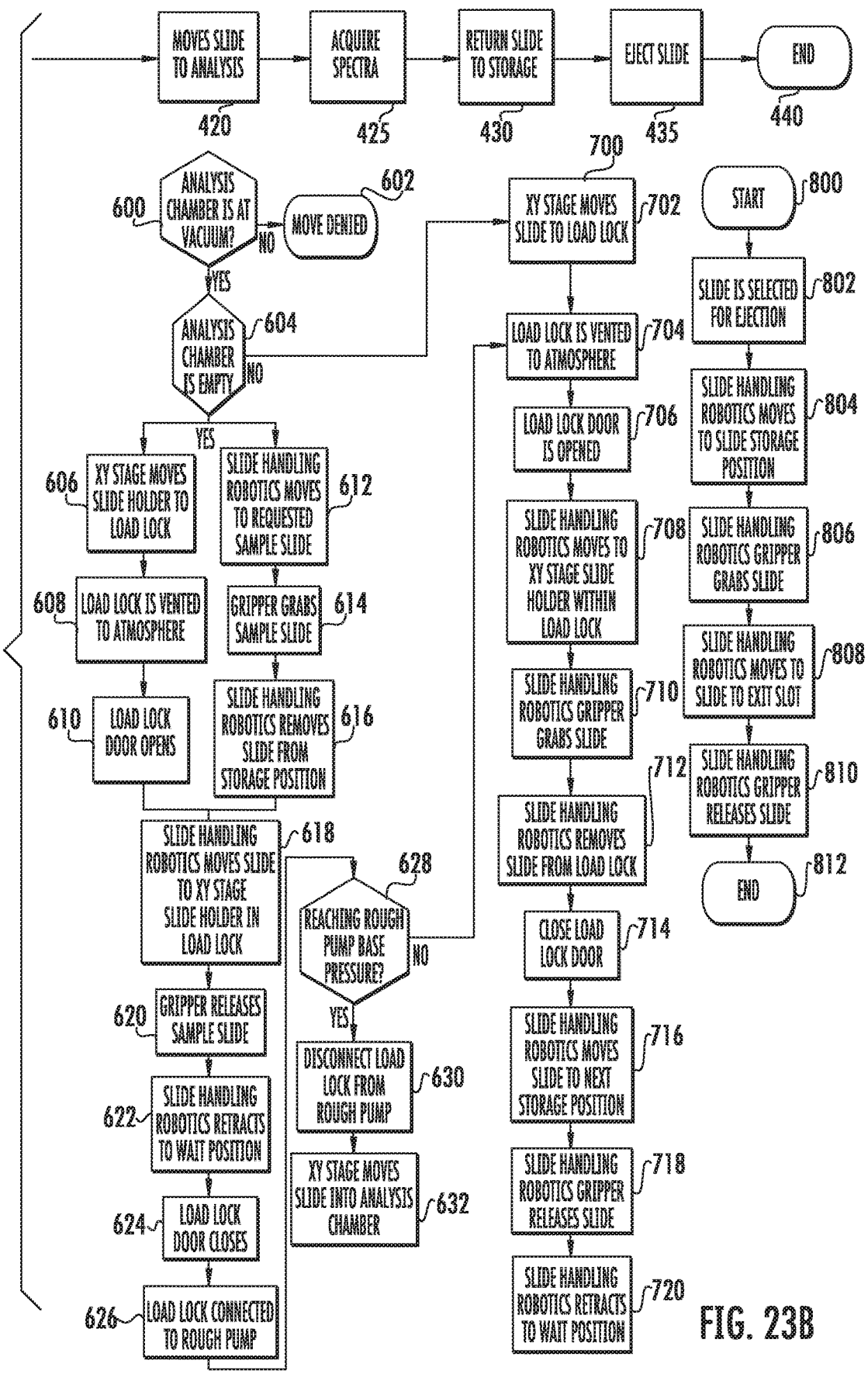

FIGS. 23A and 23B illustrate example actions that can be carried out by the instrument and sample handler according to embodiments of the present invention.

Start (block 400)
Accepts Slide (block 405)
Identifies Slide (block 410)
En queue slide (block 415)
Moves slide to analysis (block 420)
Acquire spectra (block 425)
Return slide to storage (block 430)
Eject Slide (block 435)
End (block 440)
User attempts to load slide into input slot (block 500)
Input queue full? (block 502)
Internal comms down? (block 504)
Instrument in Alarm state? (block 506)
Load denied (block 507)
Slide Handling Robotics engages slide (block 508)
Slide Handling Robotics brings slide to barcode reader (block 510)
Read Barcode (block 512)
Send ID code to Application Server for recognition (block 514)
ID is known (block 516)
ID is duplicate (block 518)
Slide Description? (block 520)
Slide returned to input slot (block 521)
Store description for later processing (block 523)
Slide Handling Robotics removes slide from barcode reader (block 525)
Slide Handling Robotics moves to next available storage position (block 530)
Gripper releases slide (block 535)
Slide Handling Robotics retracts to wait position (block 540)
Analysis chamber is at vacuum? (block 600)
Move denied (block 602)
Analysis chamber is empty (block 604)
XY stage moves slide holder to load lock (block 606)
Load lock is vented to atmosphere (block 608)
Load lock door opens (block 610)
Slide Handling Robotics moves to requested sample slide (block 612)
Gripper grabs sample slide (block 614)
Slide Handling Robotics moves slide from storage position (block 616)
Slide Handling Robotics moves slide to XY stage slide holder in load lock (block 618)
Gripper releases sample slide (block 620)
Slide Handling Robotics retracts to wait position (block 622)
Load lock door closes (block 624)
Load lock connected to rough pump (block 626)
Reaching rough pump base pressure? (block 628)
Disconnect load lock from rough pump (block 630)
XY stage moves slide into analysis chamber (block 632)
XY stage moves slide to load lock (block 700) (block 702)
Load lock is vented to atmosphere (block 704)
Load lock door is opened (block 706)
Slide Handling Robotics moves to XY stage slide holder within load lock (block 708)
Slide Handling Robotics gripper grabs slide (block 710)
Slide Handling Robotics removes slide from load lock (block 712)
Close load lock door (block 714)
Slide Handling Robotics moves slide to next storage position (block 716)
Slide Handling Robotics gripper releases slide (block 718)
Slide Handling Robotics retracts to wait position (block 720)
Start (block 800)
Slide is selected for ejection (block 802)
Slide Handling Robotics moves to slide storage position (block 804)
Slide Handling Robotics gripper grabs slide (block 806)
Slide Handling Robotics moves to slide to exit slot (block 808)
Slide Handling Robotics gripper releases slide (block 810)
End (block 812)

The mass spectrometry system 10 can be a MALDI-TOF MS system. MALDI-TOFMS systems are well known. See, e.g., U.S. Pat. Nos. 5,625,184; 5,627,369; 5,760,393; 6,002,127; 6,057,543; 6,281,493; 6,541,765; 5,969,348; and 9,536,726, the contents of which are hereby incorporated by reference as if recited in full herein. The majority of modern MALDI-TOF MS systems employ delayed extraction (e.g., time-lag focusing) to mitigate the negative spectral qualities of ion initial energy distribution.

In some embodiments, a sample (on a matrix slide) for analysis is introduced into a mass spectrometer system (optionally a MALDI-TOF MS system with a TOF flight tube in a vacuum chamber and comprising a laser). Laser pulses can be successively applied during analysis of a respective single sample to obtain mass spectra. A substance (e.g., constituent, biomolecule, microorganism, protein) in the sample is identified based on the obtained spectra. The TOF flight tube length can optionally be between about 0.4 m and about 1.0 m. However, longer or shorter flight tubes may be used in some embodiments.

The MS system 10 can optionally be a table top unit with TOF flight tube length about 0.8 m.

The sample can comprise a biosample from a patient and the identifying step can be carried out to identify if there is a defined protein or microorganism such as bacteria in the sample for medical evaluation of the patient.

The analysis can identify whether any of about 150 (or more) different defined species of bacteria and/or fungi is in a respective sample based on the obtained spectra. The target mass range can be between about 2,000-20,000 Daltons.

The mass spectrometer system 10 can include a patient record database and/or server that can include electronic medical records (EMR) with privacy access restrictions that are in compliance with HIPPA rules due to the client-server operation and privilege defined access for different users.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A slide sample handling and/or analysis system, comprising:
   a housing comprising a front wall with a slide port;
   an input/output module comprising at least one rotatable carousel comprising a slide receiving channel, wherein the carousel rotates between first and second positions, wherein the first position is a slide intake position that positions an open end of the slide receiving channel outward, aligned with the slide port to be able to slidably receive a slide, and wherein the second position places the open end of the slide channel facing into the housing;
   a robot with a robot arm that holds a slide gripper residing inside the housing in communication with the rotatable carousel, wherein the robot arm can move in three-dimensions in the housing;
   a load lock chamber having longitudinally opposing first and second end portions, a through channel, and a door sealably coupled to the second end portion; and
   an acquisition vacuum chamber with an X-Y stage and a slide holder with a vacuum seal interface that can extend into the load lock chamber to seal the first end portion of the load lock chamber and retract with a slide transferred to the slide holder from the slide gripper of the robot into the acquisition vacuum chamber, after the door of the load lock chamber is closed.

2. The system of claim 1, wherein the carousel is configured to have a single one of the slide receiving channel with a length that extends over greater than a major portion of a diameter of the carousel across a center of the carousel.

3. The system of claim 1, wherein the open end of the slide channel has a perimeter that is recessed inward relative to an outer diameter of the carousel.

4. The system of claim 1, wherein the slide gripper comprises first and second gripper arms that are parallel and side-by-side and pivotably held by a laterally extending shaft adjacent an upper jaw and lower jaw of the slide gripper, the first arm coupled to the upper jaw of the slide gripper and the second arm coupled to the lower jaw of the slide gripper.

5. The system of claim 4, wherein the system further comprises:
   a gripper motor coupled to the first and second gripper arms;
   a home sensor, a grip sensor and a slide presence sensor, each of the home sensor, grip sensor and slide presence sensor coupled to at least one of the first and second gripper arms; and
   a control circuit in communication with the gripper motor and the home sensor, the grip sensor and the slide presence sensor, wherein the control circuit receives sensor data from the home sensor, the grip sensor and the slide presence sensor to identify an open or closed state of the upper jaw and lower jaw, and, if the upper and lower jaw are in the closed state, to identify whether a slide is present.

6. The system of claim 5, wherein the home sensor and the grip sensor are separately triggerable by a position of a first end of the first arm, and wherein the slide presence sensor is triggerable by a position of a first end of the second arm.

7. The system of claim 4, wherein the first gripper arm resides adjacent to but at a height above the second gripper arm, and wherein the home sensor and the grip sensor are aligned, one above another on a printed circuit board coupled to an end of the first gripper arm.

8. The system of claim 7, wherein an end of the second gripper arm is coupled to the slide presence sensor, and wherein the slide presence sensor is held by the printed circuit board adjacent but spaced apart from the home sensor and the grip sensor.

9. The system of claim 7, wherein the printed circuit board is attached to a pivotable arm segment of the robot arm of the robot.

10. The system of claim 4, wherein the upper jaw of the slide gripper comprises a notch configured to receive an alignment member with the notch residing above the lower jaw.

11. The system of claim 1, further comprising a first vacuum pump connected to the acquisition vacuum chamber and a second vacuum pump connected to the load lock chamber, wherein the first vacuum pump resides above the second vacuum pump in the housing.

12. The system of claim 1, further comprising a removable bezel face plate providing the slide port, and wherein the bezel face plate is held by a bevel bracket with an open window that is coupled to an upper bracket member that resides inside the housing and angles inwardly at an angle between 5-45 degrees from a location adjacent the bezel face plate to an upper segment thereof.

13. The system of claim 12, wherein the removable bezel face plate is attached to an internal bezel bracket plate that has an upper bracket member that holds a camera, wherein the upper bracket member extends inwardly from a segment proximate the bezel face plate to an upper segment thereof at an angle between 5-45 degrees, and wherein the camera has a field of view that covers at least an end portion of the slide when the carousel is in the second position.

14. The system of claim 12, wherein the input/output module comprises a drive motor coupled to a drive shaft under the carousel that rotates the carousel between the first and second positions, and wherein when the removable bezel face plate is detached from the housing to expose an access window, the carousel can be removed from the access window of the housing for cleaning.

15. The system of claim 12, wherein the bezel face plate has a width between 4-6 inches and a height between 6-10 inches.

16. The system of claim 12, wherein the housing is a table-top housing configured with a width, length and height of about: 0.7 m×0.7 m×1.1 m.

17. The system of claim 12, wherein the housing includes an internal sample storage space with a width of about 0.25 m, a length that is about 0.3 m and a height that is about 0.3 m.

18. The system of claim 1, further comprising a plurality of spaced apart intake vents in fluid communication with intake fans with filters on a back of the housing and a plurality of output vents in fluid communication with output fans on a top of the housing, wherein the intake and output fans cooperate to provide a positive pressure inside the housing with at least one of passive and/or fan-driven airflow out of the housing to inhibit contaminants from entering the housing.

19. The system of claim 18, further comprising a laser coolant path that extends from an inlet on a front of the housing to an outlet on top of the housing.

20. The system of claim 1, wherein the robot has a base that is mounted to a floor of the housing, and wherein the input/output module has a base that is mounted to the floor of the housing adjacent the robot base and closer to the front of the housing than the robot base.

21. The system of claim 1, wherein the port is oblong in a lateral dimension with laterally opposing arcuate ends.

22. The system of claim 1, wherein the through channel of the load lock chamber has a lateral width that is greater than a height and a volume that is between 1 cc and 100 cc.

23. A method of operating a slide gripper assembly comprising:
providing a slide gripper assembly with first and second adjacent arms, one attached to a lower jaw and one attached to a cooperating upper jaw; and
electronically directing a closing and opening of the upper and lower jaws whereby a state of one or more of a first home sensor, a second grip sensor and a third slide presence sensor correlates to a position of the gripper jaws.

24. The method of claim 23, wherein, for the electronically directing step, the first home sensor and the second grip sensor are separately triggerable by a position of a first end of the first arm, and wherein the third slide presence sensor is triggerable by a position of a first end of the second arm.

25. The method of claim 23, wherein the first arm is an upper arm that is above the second arm and is attached to the lower jaw, wherein the first and second arms are attached together by a laterally extending shaft adjacent the upper and lower jaws, and wherein the method further comprises pivoting the lower shaft to have a horizontal orientation only when a slide is present between the upper and lower jaws which then triggers the third slide presence sensor to identify a slide present state for the electronically directing step.

26. A method of handling a sample for analysis, comprising:
providing a housing with a mass spectrometer, a load lock chamber with opposing first and second end portions, and an acquisition vacuum chamber, wherein the first end portion of the load lock chamber is in or adjacent the acquisition vacuum chamber and the second end portion is spaced apart from the first end portion and has a sealably attachable door;
providing a positive pressure inside the housing outside the acquisition vacuum chamber;
receiving a slide for analysis in a slide receiving channel of a carousel via a port at a front of the housing;
rotating the carousel;
gripping an end portion of the slide with a slide gripper held by an arm of a robot;
moving the slide in three-dimensions in the housing from the carousel toward the load lock chamber or a storage rack;
inserting a slide holder of an X-Y stage into the load lock chamber from the vacuum chamber while the door is sealably closed to the second end portion of the load lock chamber;
automatically sealing the first end portion of the load lock chamber from the vacuum chamber upon engagement of the slide holder with a seal interface of the first end portion of the load lock chamber;
venting the load lock chamber to atmosphere;
opening the door;
inserting the slide from the slide gripper into the load lock chamber from the second end portion of the load lock chamber to transfer the slide to the slide holder in the load lock chamber;
closing the door to seal the load lock chamber;
evacuating the load lock chamber to a vacuum pressure; and
retracting the slide holder with the slide into the vacuum chamber while the door is closed and the load lock chamber is under vacuum.

27. The method of claim 26, further comprising analyzing a sample in or on the slide, wherein the sample is analyzed to identify one or more microorganisms by analyzing a mass range between about 2000 to about 20,000 Dalton.

28. The method of claim 26, further comprising translating the slide gripper to an alignment member held by a fixed structure in the housing and slidably inserting or receiving the alignment member in the slide gripper to define an X, Y, Z calibrated position in the housing for use in automatic robotic movement of the slide holder through operational positions in the housing including movement to and from the carousel and into the load lock chamber.

29. The method of claim 28, wherein the fixed structure is the storage rack.

30. The method of claim 26, further comprising generating a laser coolant air flow path from a front of the housing over a heat sink of a laser then and up and out of the top of housing.

31. The method of claim 26, further comprising removing a detachable bezel plate from a front wall of the housing which holds the port on the front of the housing, then removing the carousel through the front of the housing.

* * * * *